United States Patent
Takae et al.

(10) Patent No.: US 10,070,373 B2
(45) Date of Patent: Sep. 4, 2018

(54) INFORMATION PROCESSING APPARATUS, COMMUNICATION SYSTEM AND CONTROL METHOD OF INFORMATION PROCESSING APPARATUS

(75) Inventors: Shinji Takae, Tokyo (JP); Katsutoshi Itoh, Tokyo (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/343,463

(22) PCT Filed: Jul. 19, 2012

(86) PCT No.: PCT/JP2012/068331
§ 371 (c)(1),
(2), (4) Date: Mar. 7, 2014

(87) PCT Pub. No.: WO2013/046876
PCT Pub. Date: Apr. 4, 2013

(65) Prior Publication Data
US 2014/0220939 A1 Aug. 7, 2014

(30) Foreign Application Priority Data
Sep. 30, 2011 (JP) ................................ 2011-215976

(51) Int. Cl.
H04W 48/16 (2009.01)
H04W 12/08 (2009.01)
(Continued)

(52) U.S. Cl.
CPC ............ *H04W 48/16* (2013.01); *H04M 3/38* (2013.01); *H04W 4/60* (2018.02); *H04W 4/70* (2018.02);
(Continued)

(58) Field of Classification Search
CPC ....... H04W 48/18; H04W 48/08; H04W 4/00; H04W 88/10
See application file for complete search history.

(56) References Cited

U.S. PATENT DOCUMENTS 8,228,870 B1 * 7/2012 Sigg et al. .................... 370/331
9,414,346 B2 * 8/2016 Takae .................... H04L 63/105
(Continued)

FOREIGN PATENT DOCUMENTS

JP 2000-082990 3/2000
JP 2006-203329 * 8/2006 ............. H04L 12/28
(Continued)

OTHER PUBLICATIONS

3GPP TR 33.812 V9.2.0 (Jun. 2010) Technical Report. 3rd Generation Partnership Project; Technical Specification Group Services and System Aspects; Feasibility study on the security aspects of remote provisioning and change of subscription for Machine to Machine (M2M) equipment (Release 9). Jun. 2010.

*Primary Examiner* — Matthew C Sams
(74) *Attorney, Agent, or Firm* — Chip Law Group

(57) ABSTRACT

Provided is an information processing apparatus including a determination unit and a control unit. The determination unit is configured to determine whether a predetermined condition for performing a communication process related to a specific service provided by a service provider between an information processing system related to the service provider and a wireless communication apparatus is satisfied. The control unit is configured to perform control when the predetermined condition is satisfied in a manner that a connection right of connecting to a predetermined network using wireless communication is set in the wireless communication apparatus, the wireless communication apparatus connects to the network based on the set connection (Continued)

right, and the communication process is performed with the information processing system.

17 Claims, 29 Drawing Sheets

(51) Int. Cl.
    *H04M 3/38*     (2006.01)
    *H04W 12/06*     (2009.01)
    *H04W 4/60*     (2018.01)
    *H04W 4/70*     (2018.01)
    *H04L 29/06*     (2006.01)

(52) U.S. Cl.
    CPC .......... *H04W 12/06* (2013.01); *H04W 12/08* (2013.01); *H04L 63/101* (2013.01); *H04L 2463/101* (2013.01); *H04M 2203/6081* (2013.01); *H04M 2207/18* (2013.01)

(56) References Cited

U.S. PATENT DOCUMENTS

| | | | | |
|---|---|---|---|---|
| 2004/0148343 | A1* | 7/2004 | Mottes | H04W 4/00 709/203 |
| 2005/0174967 | A1* | 8/2005 | Morvan et al. | 370/329 |
| 2008/0085707 | A1* | 4/2008 | Fadell | H04W 8/065 455/435.3 |
| 2009/0149220 | A1* | 6/2009 | Camilleri | H04W 8/183 455/558 |
| 2009/0191857 | A1* | 7/2009 | Horn | H04W 4/70 455/419 |
| 2010/0017861 | A1* | 1/2010 | Krishnaswamy et al. | 726/7 |
| 2010/0248690 | A1* | 9/2010 | Biggs | H04W 36/385 455/411 |
| 2011/0044245 | A1* | 2/2011 | Hasegawa et al. | 370/328 |
| 2011/0179168 | A1* | 7/2011 | Nylander et al. | 709/225 |
| 2012/0173743 | A1* | 7/2012 | Yu | 709/228 |
| 2013/0065578 | A1* | 3/2013 | Raleigh | H04L 41/0806 455/419 |
| 2013/0217361 | A1* | 8/2013 | Mohammed | H04W 12/06 455/411 |
| 2014/0086177 | A1* | 3/2014 | Adjakple | H04W 12/08 370/329 |
| 2014/0171080 | A1* | 6/2014 | Takae et al. | 455/435.3 |
| 2016/0373426 | A1* | 12/2016 | Takae | H04L 63/105 |

FOREIGN PATENT DOCUMENTS

| | | |
|---|---|---|
| JP | 2006-217196 | 8/2006 |
| JP | 2011-070678 | 4/2011 |
| WO | WO 2010/039074 | 4/2010 |

\* cited by examiner

FIG. 1
WIRELESS COMMUNICATION EXAMPLE BASED ON MCIM
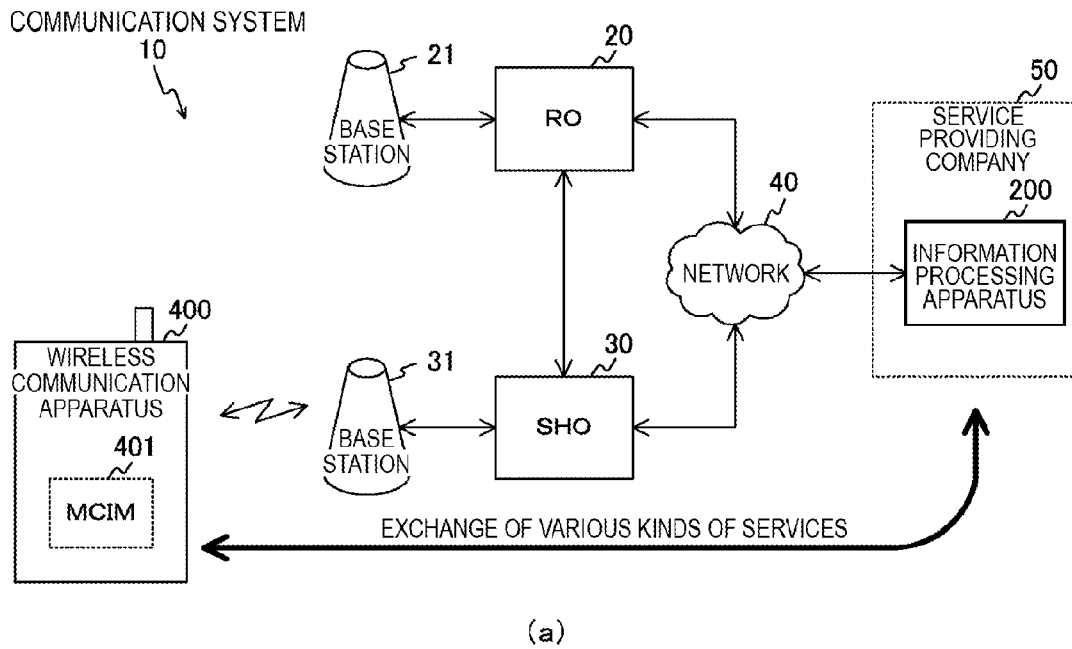
(a)
WIRELESS COMMUNICATION EXAMPLE BASED ON PCID
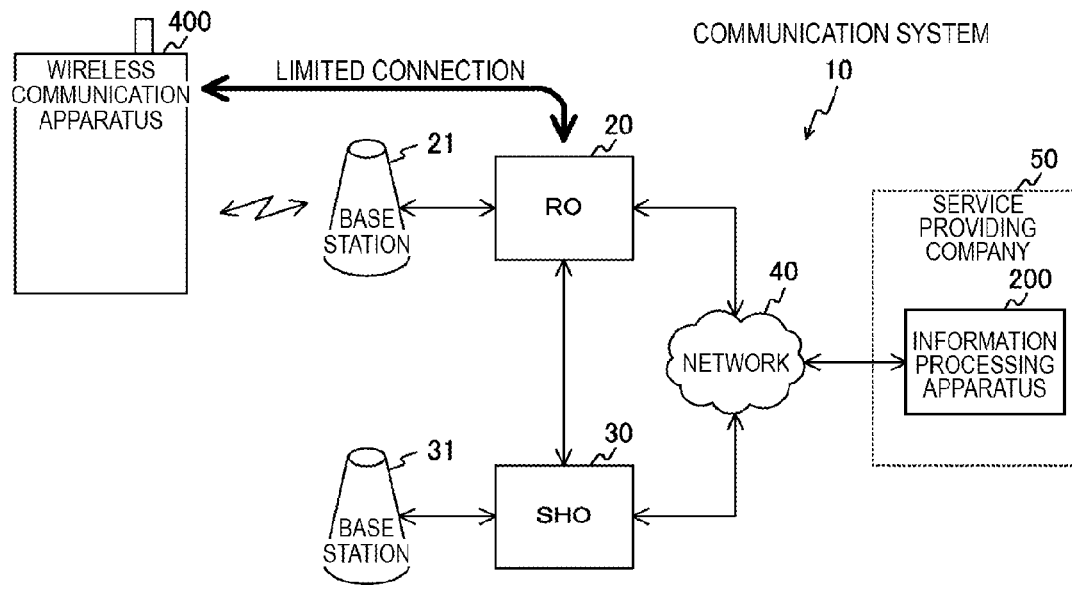
(b)

FIG. 4

SERVICE MANAGEMENT DATABASE
240

| | SERVICE IDENTIFI- CATION INFORMATION 241 | SERVICE INFORMATION 242 | SERVICE ID 243 | SERVICE PASSWORD 244 | TERMINAL IDENTIFICATION INFORMATION 245 | RELEVANT INFORMATION 246 |
|---|---|---|---|---|---|---|
| 1 | G0001 | STORAGE OF IMAGE CONTENT | 1452 | 2233 | 121231234567890 | WITHIN 100 MB |
| | | | | | 121231234567891 | WITHIN 10 MB |
| | | | | | ⋮ | ⋮ |
| 2 | G0002 | ELECTRONIC BOOK (MONTHLY PENCHAN) DELIVERY | ... | ... | ... | DELIVERY AT END OF MONTH |
| | | | | | ... | |
| | | | | | ⋮ | |
| ⋮ | ⋮ | ⋮ | ⋮ | ⋮ | ⋮ | ⋮ |
| S | ... | ... | ... | ... | ... | ... |

FIG. 6

DEVICE MANAGEMENT DATABASE
330

| | SERVICE IDENTIFICATION INFORMATION 331 | TERMINAL IDENTIFICATION INFORMATION 332 | PCID 333 | MCIM ALLOCATION INFORMATION 334 |
|---|---|---|---|---|
| 1 | — | — | — | — |
| 2 | — | — | — | — |
| ⋮ | ⋮ | ⋮ | ⋮ | ⋮ |

(a)

DEVICE MANAGEMENT DATABASE
330

| | SERVICE IDENTIFICATION INFORMATION 331 | TERMINAL IDENTIFICATION INFORMATION 332 | PCID 333 | MCIM ALLOCATION INFORMATION 334 |
|---|---|---|---|---|
| 1 | G0001 | 121231234567890 | 123456789012345 | UNALLOCATED |
| 2 | — | — | — | — |
| ⋮ | ⋮ | ⋮ | ⋮ | ⋮ |

(b)

DEVICE MANAGEMENT DATABASE
330

| | SERVICE IDENTIFICATION INFORMATION 331 | TERMINAL IDENTIFICATION INFORMATION 332 | PCID 333 | MCIM ALLOCATION INFORMATION 334 |
|---|---|---|---|---|
| 1 | G0001 | 121231234567890 | 123456789012345 | 123450000000001 |
| 2 | — | — | — | — |
| ⋮ | ⋮ | ⋮ | ⋮ | ⋮ |

MCIM MANAGEMENT DATABASE
340

| | MCIM IDENTIFICATION INFORMATION 341 | TERMINAL IDENTIFICATION INFORMATION 342 |
|---|---|---|
| 1 | 123450000000001 | Not Used |
| 2 | 123450000000002 | Not Used |
| 3 | 123450000000003 | Not Used |
| 4 | 123450000000004 | Not Used |
| 5 | 123450000000005 | Not Used |
| ⋮ | ⋮ | ⋮ |
| K | ... | ... |

(a)

MCIM MANAGEMENT DATABASE
340

| | MCIM IDENTIFICATION INFORMATION 341 | TERMINAL IDENTIFICATION INFORMATION 342 |
|---|---|---|
| 1 | 123450000000001 | 121231234567890 |
| 2 | 123450000000002 | Not Used |
| 3 | 123450000000003 | Not Used |
| 4 | 123450000000004 | Not Used |
| 5 | 123450000000005 | Not Used |
| ⋮ | ⋮ | ⋮ |
| K | ... | ... |

(b)

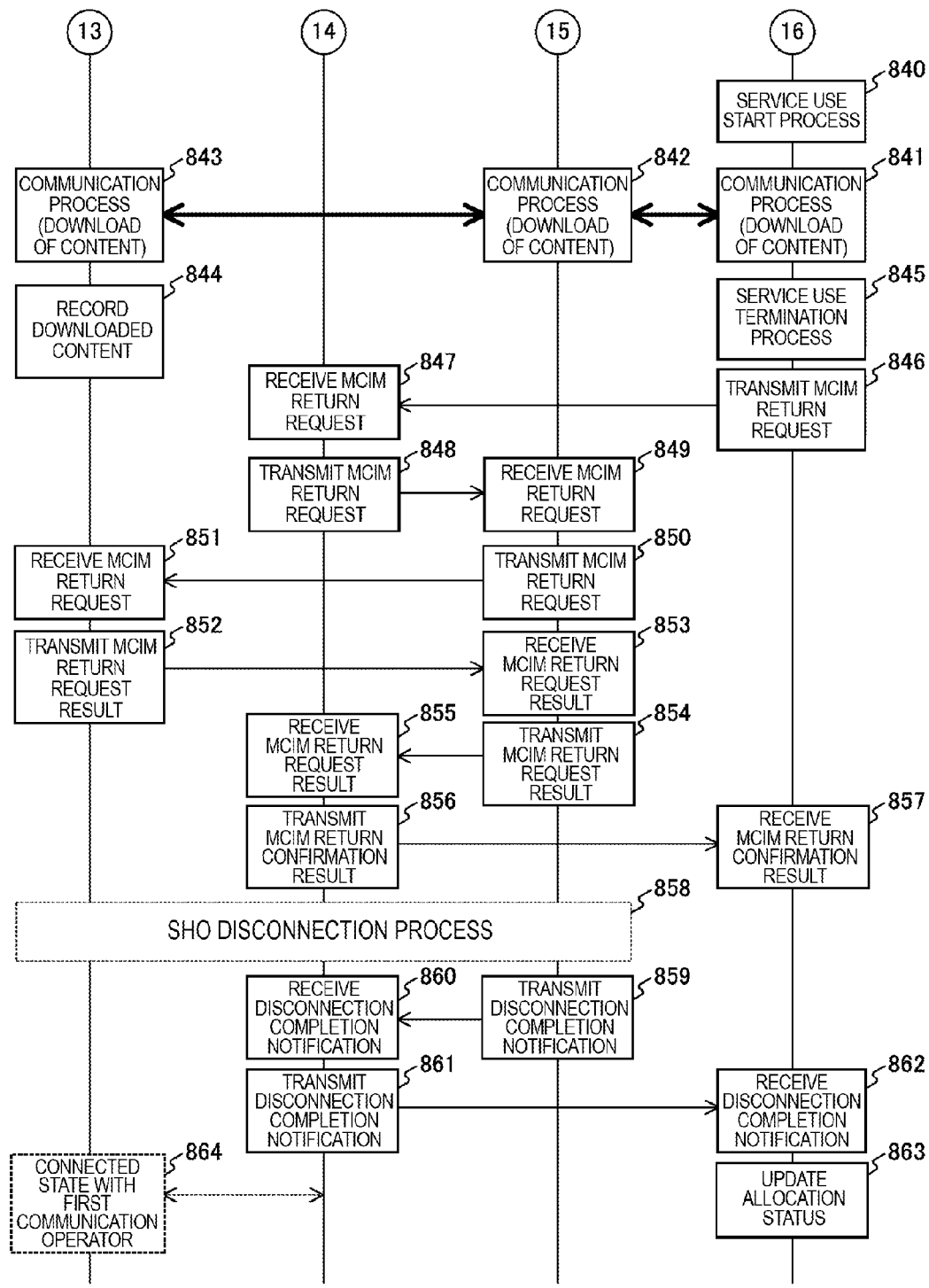

INFORMATION PROCESSING APPARATUS, COMMUNICATION SYSTEM AND CONTROL METHOD OF INFORMATION PROCESSING APPARATUS

TECHNICAL FIELD

The present technology relates to an information processing apparatus. More specifically, the present technology relates to an information processing apparatus connected to a network, a communication system including the apparatus, and a control method of a wireless communication apparatus.

BACKGROUND ART

Currently, 3GPP (3rd Generation Partnership Project) drawing up technical specifications of public wireless communication networks is working on a function extension (see, for example, Non-Patent Literature 1).

According to the function expansion (called Machine to Machine Equipment), a method of flexibly using information indicating that a service is available can be realized. The information indicating that the service is available is contract authentication information (for example, a rewritable access right). For example, the contract authentication information can be downloaded from a network or can be interrupted temporarily or resumed.

Currently, it is necessary to store the contract authentication information in a physical device called a SIM (Subscriber Identity Module) card. However, a flexible storage method can also be realized by treating the contract authentication information as software.

CITATION LIST

Non-Patent Literature

Non-Patent Literature 1: 3GPP TR 33.812 V9.2.0 (2010-06)

SUMMARY OF INVENTION

Technical Problem

By using the above-described function expansion, a method of using contract authentication information different from that of the related art can be conceived.

For example, when a wireless communication apparatus possessed by a user can easily receive a desired communication service from an operator that provides various kinds of communication services, it is convenient for the user. Also, it is possible to increase the opportunities for the operator to provide the various kinds of communication services.

It is desirable to receive a communication service preferred by a user with ease.

Solution to Problem

The present technology has been provided in order to solve the issues mentioned above, and according to an embodiment of the present technology, there are provided an information processing apparatus, a control method thereof, and a program for causing a computer to execute the method, the information processing apparatus including a determination unit configured to determine whether a predetermined condition for performing a communication process related to a specific service provided by a service provider between an information processing system related to the service provider and a wireless communication apparatus is satisfied, and a control unit configured to perform control when the predetermined condition is satisfied in a manner that a connection right of connecting to a predetermined network using wireless communication is set in the wireless communication apparatus, the wireless communication apparatus connects to the network based on the set connection right, and the communication process is performed with the information processing system. Accordingly, an action of setting the connection right in the wireless communication apparatus, connecting the wireless communication apparatus to the network based on the set connection right, and performing the communication process with the information processing system when the predetermined condition is satisfied is realized.

According to a first embodiment of the present technology, when the wireless communication apparatus is registered to receive the specific service, the determination unit may determine that the predetermined condition is satisfied. Accordingly, an action of determining that the predetermined condition is satisfied when the wireless communication apparatus is registered to receive the specific service is realized.

According to the first embodiment of the present technology, the connection right may be a right of connecting to a base station operated by a communication operator contracted with the service provider based on contract authentication information for connecting to the base station and a given number of connection rights are ensured by the service provider. The determination unit may determine whether the predetermined condition is satisfied, based on a database configured to manage a use status of the connection right by the registered wireless communication apparatus for each wireless communication apparatus. Accordingly, an action of determining whether the predetermined condition is satisfied based on the database (for example, a device management database) configured to manage the use status of the connection right by the registered wireless communication apparatus is realized.

According to the first embodiment of the present technology, when all of the given number of connection rights are used, the determination unit may determine that the predetermined condition is not satisfied. Accordingly, an action of determining that the predetermined condition is not satisfied when all of the connection rights are used among the given number of connection rights is realized.

According to the first embodiment of the present technology, the control unit may update the use status related to each wireless communication apparatus in the database when the connection right is set in the wireless communication apparatus and the connection right is released from the wireless communication apparatus in which the connection right is set. Accordingly, an action of updating the use status related to the wireless communication apparatus in the database when the connection right is set in the wireless communication apparatus and the connection right is released from the wireless communication apparatus in which the connection right is set is realized.

According to the first embodiment of the present technology, the database may be included in at least one of an RO (registration operator) and the information processing system. Accordingly, an action of performing determination using the database included in at least one of the RO and the information processing system is realized.

According to the first embodiment of the present technology, the information processing apparatus may be the wireless communication apparatus. When an operation unit receives a predetermined operation or a predetermined timing arrives, the determination unit may determine that the predetermined condition is satisfied. When the predetermined condition is satisfied, the control unit may perform control in a manner that a setting request made to set the connection right in the wireless communication apparatus is performed to an RO, and the communication process is performed with the information processing system after connection to the network based on the connection right set by an SHO (Selected Home Operator) in response to the setting request. Accordingly, an action of performing the setting request made to set the connection right in the wireless communication apparatus to the RO and performing the communication process with the information processing system after the connection to the network based on the connection right set by the SHO in response to the setting request when the predetermined condition is satisfied is realized.

According to the first embodiment of the present technology, when the connection right is set in the wireless communication apparatus and the wireless communication apparatus is connected to the network, the RO notifies the information processing system that the connection right is set in the wireless communication apparatus and the wireless communication apparatus is connected to the network. Accordingly, an action in which the RO notifies the information processing system that the connection right is set in the wireless communication apparatus and the wireless communication apparatus is connected to the network when the connection right is set in the wireless communication apparatus and the wireless communication apparatus is connected to the network is realized.

According to the first embodiment of the present technology, when the connection right set in the wireless communication apparatus is invalidated, the RO notifies the information processing system that the connection right is invalidated. Accordingly, an action in which the RO notifies that the connection right is invalidated when the connection right set in the wireless communication apparatus is invalidated is realized.

According to the first embodiment of the present technology, the information processing apparatus may be the information processing system. When a predetermined operation is received in the wireless communication apparatus or a predetermined timing arrives, the determination unit may determine that the predetermined condition is satisfied. When the predetermined condition is satisfied, the control unit may perform control in a manner that a setting request made to set the connection right in the wireless communication apparatus is performed to an RO, the wireless communication apparatus is connected to the network based on the connection right set in the wireless communication apparatus by an SHO in response to the setting request, and the communication process is subsequently performed with the wireless communication apparatus. Accordingly, an action of performing the setting request made to set the connection right in the wireless communication apparatus to the RO, connecting the wireless communication apparatus to the network based on the connection right set in the wireless communication apparatus by the SHO in response to the setting request, and subsequently performing the communication process with the wireless communication apparatus when the predetermined condition is satisfied is realized.

According to the first embodiment of the present technology, the connection right may include a limitation in a manner that only the communication process is performed between the information processing system and the wireless communication apparatus. Accordingly, an action of setting the connection right on which limitation is input in the wireless communication apparatus is realized.

According to the first embodiment of the present technology, the determination unit may determine whether a predetermined condition for invalidating the set connection right is satisfied. When it is determined that the predetermined condition for invalidation is satisfied, the control unit may perform control for invalidating the connection right set in the wireless communication apparatus. Accordingly, an action of invalidating the connection right set in the wireless communication apparatus when the predetermined condition for the invalidation is satisfied is realized.

According to the first embodiment of the present technology, when the communication process performed between the information processing system and the wireless communication apparatus is terminated, the control unit may perform control in a manner that an invalidation process of invalidating the connection right set in the wireless communication apparatus is performed. Accordingly, an action in which the control unit performs control such that the invalidation process of invalidating the connection right set in the wireless communication apparatus when the communication process performed between the information processing system and the wireless communication apparatus is terminated is realized.

According to the first embodiment of the present technology, the connection right may be a right of connecting to a base station operated by a communication operator contracted with the service provider based on contract authentication information for connecting to the base station. The wireless communication apparatus may be a wireless communication apparatus that is able to download and use the contract authentication information. Accordingly, an action of setting the connection right in the wireless communication apparatus by downloading the contract authentication information is realized.

According to a second embodiment of the present technology, there are provided a communication system, a control method thereof and a program for causing a computer to execute the method, the communication system including an information processing system configured to perform a communication process related to a specific service provided by a service provider, a wireless communication apparatus configured to perform wireless communication, a determination unit configured to determine whether a predetermined condition for performing the communication process between the information processing system and the wireless communication apparatus is satisfied, and a control unit configured to perform control when the predetermined condition is satisfied in a manner that a connection right of connecting to a predetermined network using wireless communication is set in the wireless communication apparatus, the wireless communication apparatus connects to the network based on the set connection right, and the communication process is performed with the information processing system. Accordingly, an action of setting the connection right in the wireless communication apparatus, connecting the wireless communication apparatus to the network based on the set connection right, and performing the communication process with the information processing system when the predetermined condition is satisfied is realized.

Advantageous Effects of Invention

According to the present technology, an excellent effect of being able to easily receive a communication service preferred by a user can be accomplished.

BRIEF DESCRIPTION OF DRAWINGS

FIG. 1 is a block diagram showing a system configuration example of a communication system 10 according to the first embodiment of the present technology.

FIG. 4 is a diagram schematically illustrating a service management database 240 according to the first embodiment of the present technology.

FIG. 6 is a diagram schematically illustrating a device management database 330 according to the first embodiment of the present technology.

FIG. 7 is a diagram schematically illustrating an MCIM management database 340 according to the first embodiment of the present technology.

FIG. 29 is a sequence chart illustrating a communication process example among the respective apparatuses included in the communication system 101 according to the fourth embodiment of the present technology.

DESCRIPTION OF EMBODIMENTS

Figure 2:
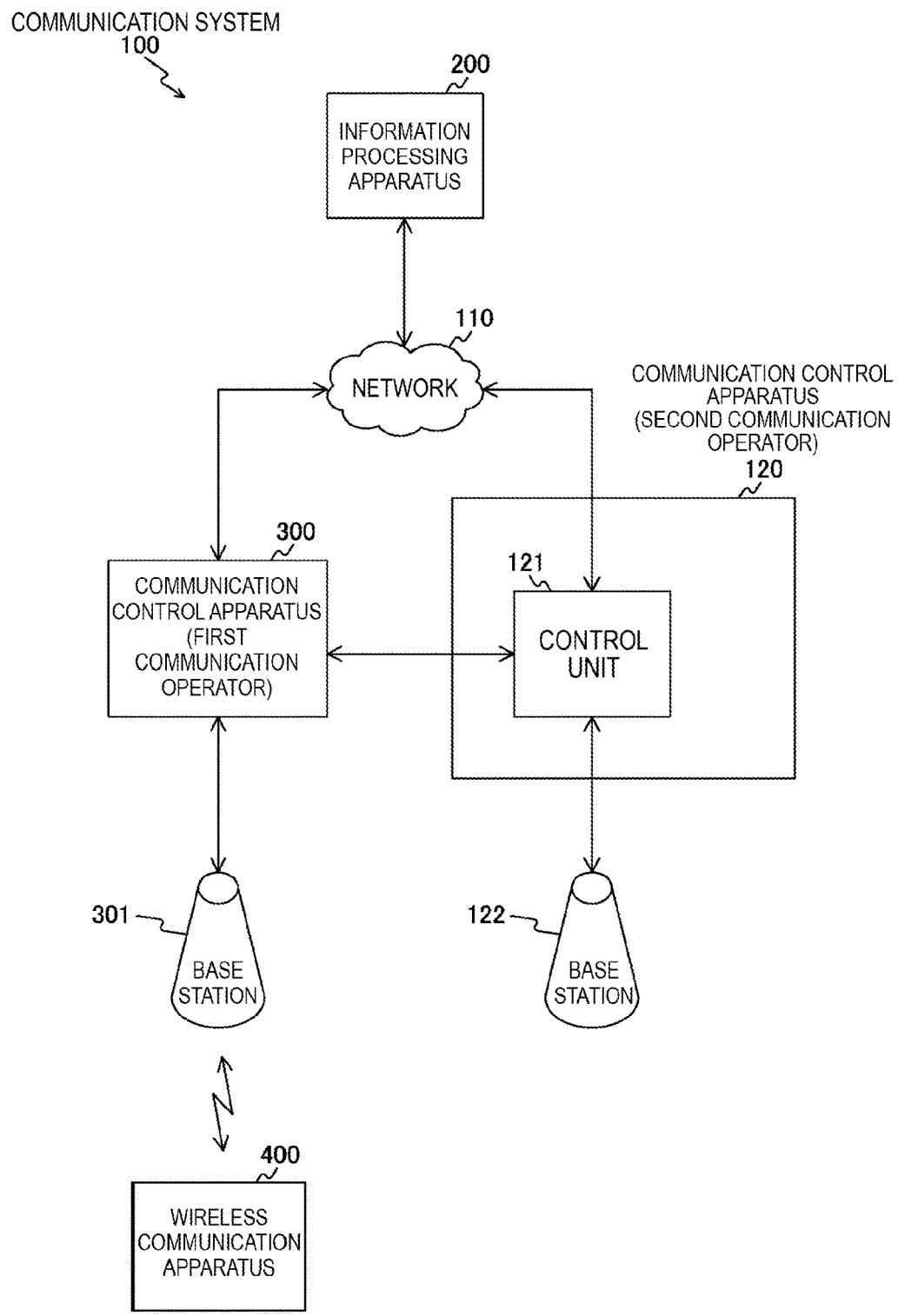
FIG. 2 is a block diagram showing a system configuration example of a communication system 100 according to the first embodiment of the present technology.

Modes for carrying out the present technology (hereinafter referred to as embodiments) will be described below. The description will be made in the following order.

1. First embodiment (communication control: an example in which communication processing is performed by setting MCIM contracted by a service providing company as a wireless communication apparatus based on determination of the wireless communication apparatus, using a database managed on an RO (Registration Operator) side)

2. Second embodiment (communication control: an example in which communication processing is performed by setting MCIM contracted by a service providing company as a wireless communication apparatus based on determination of the service providing company, using a database managed on an RO side)

3. Third embodiment (communication control: an example in which communication processing is performed by setting MCIM contracted by a service providing company as a wireless communication apparatus based on determination of the wireless communication apparatus, using a database managed on a service providing company side)

4. Fourth embodiment (communication control: an example in which communication processing is performed by setting MCIM contracted by a service providing company as a wireless communication apparatus based on determination of the service providing company, using a database managed on a service providing company side)

5. Modification examples

1. First Embodiment

[Configuration Example of Communication System]

FIG. 1 is a block diagram showing a system configuration example of a communication system 10 according to the first embodiment of the present technology. FIG. 1 shows a configuration example of a communication system when a network configuration includes an SHO (Selected Home Operator) and an RO (Registration Operator) (for example, see Non-Patent Literature 1).

FIG. 1(a) shows a wireless communication example of a case in which a wireless communication apparatus 400 is holding valid MCIM (Machine Communication Identity Module) (rights of using MCIM) 401. Also, FIG. 1(b) shows a wireless communication example of a case in which the wireless communication apparatus 400 is not holding the valid MCIM (rights of using MCIM) 401.

Here, MCIM is an example of contract authentication information, and contract authentication information is information including telephone subscriber information and information on an authentication key (authentication). MCIM is, for example, contract authentication information (a so-called soft SIM) that is not limited to a specific communication operator (a mobile phone operator) upon purchase of a device, and in which a communication operator can be flexibly set after the purchase. Rewriting of MCIM on a network facilitates separation between sales of mobile phones and selection of communication operators, and also facilitates sharing of subscriber authentication information between a plurality of wireless communication apparatuses. A case of not holding rights of using MCIM implies, for example, a case of not holding the MCIM itself, or a case of only holding MCIM invalidated by MCIM invalidation processing.

For example, rights of using MCIM can be understood as a connection right to connect to a network 40 using wireless communication (a network connection right). In other words, a connection right is a right to connect to a base station operated by a communication operator based on MCIM (contract authentication information) for connecting to the base station. Also, for example, the presence/absence of a connection right corresponds to the presence/absence of rights of using MCIM.

Here, an RO and an SHO indicate logical roles, and may be assumed to be operated by different operators, or may be assumed to be operated by the same operator. Also, it is assumed that there are a plurality of each of ROs and SHOs. Further, each of an RO and an SHO may be integrally constituted as an information processing apparatus, or may be constituted of a plurality of apparatuses. Here, RO and SHO denote relative roles when a wireless communication apparatus having valid MCIM is regarded as a reference. For this reason, an equivalent of an RO for one wireless communication apparatus also has the possibility to be equivalent to an SHO for another wireless communication apparatus.

The communication system 10 includes an RO 20, an SHO 30, base stations 21 and 31, a network 40, an information processing apparatus 200, and the wireless communication apparatus 400.

The wireless communication apparatus 400 is, for example, a mobile phone apparatus (for example, a smartphone having call functions and data communication functions). The wireless communication apparatus 400 is an example of an information processing apparatus capable of using a software-downloadable SIM (Subscriber Identity Module). Also, the wireless communication apparatus can be applied to other wireless communication apparatuses capable of using a software-downloadable SIM. For example, the wireless communication apparatus can be applied to a capturing apparatus having wireless communication functions (for example, a digital still camera and a digital video camera (a camera-integrated recorder)), and an audio output apparatus having wireless communication functions (for example, a portable music player). Also, the wireless communication apparatus can be applied to a display apparatus having wireless communication functions (for example, a digital photo frame), and an e-book display apparatus having wireless communication functions. In addition, the wireless communication apparatus can be applied to an information processing apparatus that can perform wireless communication when wireless communication equipment is installed (for example, a personal computer that does not have wireless communication functions).

As shown in FIG. 1(a), when the wireless communication apparatus 400 holds valid MCIM (rights of using MCIM) 401, the wireless communication apparatus 400 is able to connect to the SHO 30 via the base station 31 based on the MCIM 401. On the other hand, when the wireless communication apparatus 400 does not hold the valid MCIM (rights of using MCIM) 401 as shown in FIG. 1(b), the wireless communication apparatus 400 is not able to connect to the SHO 30. However, in this case, the wireless communication apparatus 400 is able to connect to the RO 20 via the base station 21 based on provisional connectivity identity (PCID).

Here, PCID is an identifier for connecting to an RO, and is given to a wireless communication apparatus (device) having the mechanism of a software-downloadable SIM.

The network 40 is a network such as a telephone network, the Internet, or the like (for example, public network). Also, the network 40 and the SHO 30 are connected via a gateway (not shown). Likewise, the network 40 and the RO 20 are connected via a gateway (not shown).

The RO 20 is a communication control apparatus that is managed by a wireless operator providing service such as initial connection registration and the like. The RO 20 corresponds to, for example, a wireless operator providing a wireless connection service (for example, a mobile phone operator). Also, the RO 20 includes a control unit (corresponding to a control unit 320 shown in FIG. 5).

The control unit of the RO 20 performs authentication control of a wireless communication apparatus connected via the base station 21. For example, the control unit of the RO 20 performs authentication based on PCID for a wireless communication apparatus connected via the base station 21.

Then, the RO 20 provides service such as initial connection registration and the like to an authenticated wireless communication apparatus. Also, the control unit of the RO 20 is connected to the SHO 30 and exchanges various kinds of information with the SHO 30.

The base station 21 is a mobile communication base station (NodeB) that connects the wireless communication apparatus 400 and the RO 20 via a wireless line.

The SHO 30 is a communication control apparatus that is managed by a wireless operator providing a wireless connection service. The SHO 30 provides Internet services and the like, and corresponds to a wireless operator providing a wireless connection service (for example, a mobile phone operator). Also, the SHO 30 includes a control unit (corresponding to a control unit 121 shown in FIG. 2).

The control unit of the SHO 30 performs authentication control of a wireless communication apparatus connected via the base station 31. For example, the control unit of the SHO 30 authenticates a wireless communication apparatus holding valid MCIM (contract authentication information) of the SHO 30 among wireless communication apparatuses connected via the base station 31. Then, the SHO 30 connects the authenticated wireless communication apparatus to the network 40 via the gateway (not shown).

Also, the control unit of the SHO 30 is connected to the RO 20 and exchanges various kinds of information with the RO 20. Here, a wireless communication apparatus that does not hold valid MCIM (contract authentication information) can connect (limited connection) to the RO 20 via the SHO 30 based on PCID of the wireless communication apparatus.

The base station 31 is a mobile communication base station (NodeB) that connects the wireless communication apparatus 400 and the SHO 30 via a wireless line.

A service providing company 50 is a company that provides various kinds of communication services (SP (Service Provider)), such as mail-order selling, online games, content storage services, content delivery services, and the like. The service providing company 50 has the information processing apparatus 200 for providing these communication services. The information processing apparatus 200 is connected to the RO 20 and the SHO 30 via the network 40. Here, an operator performing various kinds of communication services is assumed to be a communication operator providing a wireless connection service, an MVNO (Mobile Virtual Network Operator) (an operator of a business model known as a virtual communication operator), or the like.

The information processing apparatus 200 is an information processing apparatus providing various kinds of communication services via the network 40, and provides the various kinds of communication services to the wireless communication apparatus 400 using wireless communication. For example, the information processing apparatus 200 provides communication services such as web services, data download services, data upload services, online gaming, and the like.

For example, as shown in FIG. 1(a), when the wireless communication apparatus 400 holds the valid MCIM 401, the wireless communication apparatus 400 is connected to the base station 31 via a wireless line based on the MCIM 401 to be connected to the SHO 30 via the base station 31. In this case, the wireless communication apparatus 400 can be connected to the SHO 30 via the base station 31 and receive various kinds of services (for example, download of content) from the information processing apparatus 200. Also, when the wireless communication apparatus 400 holding the valid MCIM 401 is connected to the RO 20, the wireless communication apparatus 400 is connected to the RO 20 via the SHO 30.

As shown in FIG. 1(b), when the wireless communication apparatus 400 does not hold the valid MCIM 401, the wireless communication apparatus 400 can be connected (limitedly connected) to the RO 20 via the base station 21 based on the held PCID. In this case, the wireless communication apparatus 400 is connected (limitedly connected) to the RO 20 via the base station 21, but can perform only limited communication (for example, download of the MCIM, validation/invalidation of the MCIM).

Also, when the wireless communication apparatus 400 does not hold the valid MCIM 401, the wireless communication apparatus 400 can be connected to any of the base stations 21 and 31 according to a position at which the wireless communication apparatus 400 is being used and is connected to the RO 20 via such a base station.

In this way, the wireless communication apparatus 400 not holding the valid MCIM 401 is not able to be provided with various kinds of services by the information processing apparatus 200. In other words, a wireless communication apparatus having no rights of using MCIM can be understood as a device (RO connected device) connected to limited services. On the other hand, a wireless communication apparatus holding rights of using MCIM can be understood as a device (SHO connected device) connected to services (normal connection). A wireless communication apparatus not holding rights of using MCIM can connect to the SHO 30 by acquiring rights of using MCIM via the RO 20 (for example, MCIM download or MCIM validation).

Therefore, when a user who has the wireless communication apparatus 400 has no MCIM contract with a communication operator that operates the SHO 30, the user is not able to receive various kinds of services from the information processing apparatus 200.

However, even when the user has no MCIM contract with the communication operator that operates the SHO 30, a case in which the user who has the wireless communication apparatus 400 wants to be temporarily provided with various kinds of services from the information processing apparatus 200 can also be assumed. Also, it can be assumed that the service providing company 50 wants to provide various kinds of services to a user who wants to receive the services from the information processing apparatus 200 even by bearing a communication fee relating to the provision of the services.

Thus, the first embodiment of the present technology shows an example in which a user who has no MCIM contract with a communication operator that operates an SHO can be easily provided with various kinds of services from the information processing apparatus 200.

[Configuration Example of Communication System]

FIG. 2 is a block diagram showing a system configuration example of a communication system 100 according to the first embodiment of the present technology.

The communication system 100 includes a network 110, base stations 122 and 301, a communication control apparatus (first communication operator) 300, a communication control apparatus (second communication operator) 120, an information processing apparatus 200, and a wireless communication apparatus 400.

Here, the communication system 100 is a system corresponding to the communication system 10 shown in FIG. 1. Specifically, the communication control apparatus (second communication operator) 120 corresponds to the SHO 30 shown in FIG. 1, the communication control apparatus (first communication operator) 300 corresponds to the RO 20 shown in FIG. 1, and the information processing apparatus 200 corresponds to the information processing apparatus 200 shown in FIG. 1. Therefore, in this example, description of common parts to the communication system 10 shown in FIG. 1 will be partially omitted.

The network 110 is a network (for example, a public network) such as a telephone network or the Internet. Also, the network 110 and the communication control apparatus (second communication operator) 120 are connected via a gateway (not shown). Likewise, the network 110 and the communication control apparatus (first communication operator) 300 are connected via a gateway (not shown).

The communication control apparatus (second communication operator) 120 is a communication control apparatus managed by a wireless operator that provides a wireless connection service, and corresponds to the SHO 30 shown in FIG. 1. That is, the communication control apparatus (second communication operator) 120 provides Internet services and the like and corresponds to, for example, a wireless operator that provides a wireless connection service (for example, a mobile phone operator). Also, the communication control apparatus (second communication operator) 120 includes a control unit 121.

The control unit 121 performs authentication control of wireless communication apparatuses connected via the base station 122. For example, the control unit 121 authenticates a wireless communication apparatus holding valid MCIM (contract authentication information) of the communication control apparatus (second communication operator) 120 among wireless communication apparatuses connected via the base station 122. Then, the communication control apparatus 120 connects the authenticated wireless communication apparatus to the network 110 via the gateway (not shown).

Also, the control unit 121 is connected to the communication control apparatus (first communication operator) 300 and exchanges various kinds of information with the communication control apparatus (first communication operator) 300. Here, a wireless communication apparatus that does not hold valid MCIM (contract authentication information) can be connected (limitedly connected) to the communication control apparatus (first communication operator) 300 via the base station 301 based on PCID of the wireless communication apparatus. Also, when the control unit 121 receives an MCIM setting request from the wireless communication apparatus 400 and the information processing apparatus 200, the control unit 121 transmits a setting instruction in accordance with the MCIM setting request to the communication control apparatus (first communication operator) 300.

The base station 122 is a mobile communication base station (NodeB) that connects the wireless communication apparatus 400 and the communication control apparatus (second communication operator) 120 via a wireless line.

The communication control apparatus (first communication operator) 300 is a communication control apparatus managed by a wireless operator that provides services such as initial connection registration, and corresponds to the RO 20 shown in FIG. 1. The communication control apparatus (first communication operator) 300 corresponds to, for example, a wireless operator (for example, a mobile phone operator) providing a wireless connection service. Also, the communication control apparatus (first communication operator) 300 includes the control unit 320 (shown in FIG. 5).

The control unit 320 performs various kinds of control relating to a wireless communication apparatus connected directly or via the communication control apparatus (second communication operator) 120. For example, the control unit 320 performs authentication control of a wireless communication apparatus connected via the base station 301. For example, the control unit 320 authenticates a wireless communication apparatus connected via the base station 301 based on PCID. Then, the control unit 320 provides services, such as initial connection registration, to the authenticated wireless communication apparatus. Also, the control unit 320 is connected to the communication control apparatus (second communication operator) 120 to exchange various kinds of information with the communication control apparatus (second communication operator) 120.

For example, in the communication system 100, a wireless communication apparatus holding valid MCIM is connected to the base station 122 via a wireless line and is connected to the communication control apparatus (second communication operator) 120 via the base station 122. When a wireless communication apparatus holding valid MCIM is connected to the communication control apparatus (first communication operator) 300, the wireless communication apparatus is connected to the communication control apparatus (first communication operator) 300 via the communication control apparatus (second communication operator) 120.

Also, a wireless communication apparatus not holding valid MCIM can be connected (limitedly connected) to the communication control apparatus (first communication operator) 300 via the base station 301 based on PCID of the wireless communication apparatus. A wireless communication apparatus not holding valid MCIM can be connected to any of the base stations 301 and 122 according to a position at which the wireless communication apparatus is being used, and is connected to the communication control apparatus (first communication operator) 300 via such a base station.

Here, an example of setting valid MCIM (rights of using MCIM) in the communication system 100 (an example of setting a network connection right) is described. For example, MCIM is caused to be held in each wireless communication apparatus. Then, based on an instruction from the control unit 320 (shown in FIG. 5), the communication control apparatus (second communication operator) 120 performs validation/invalidation of the MCIM held in each wireless communication apparatus, and thereby can set the rights of using the MCIM. Validation/invalidation of the MCIM held in each wireless communication apparatus can also be performed on the side of the communication control apparatus (first communication operator) 300. For this reason, the rights of using the MCIM may be set by the control unit 320 performing validation/invalidation of the MCIM held in each wireless communication apparatus.

Also, rights of using MCIM may be set by transmitting the MCIM itself instead of causing the MCIM to be held in each wireless communication apparatus. For example, setting information (including the MCIM) is transmitted from the communication control apparatus (second communication operator) 120 to a wireless communication apparatus via the control unit 320 (shown in FIG. 5). By causing the MCIM included in the setting information to be held in a wireless communication apparatus, valid MCIM is set in the wireless communication apparatus. Here, transmission of the setting information (including the MCIM) to each wireless communication apparatus can also be performed on the side of the communication control apparatus (first communication operator) 300. For this reason, the rights of using the MCIM may be set by the control unit 320 transmitting the setting information (including the MCIM) to each wireless communication apparatus.

The information processing apparatus 200 is an information processing apparatus providing various kinds of communication services via the network 110 (for example, a content server), and provides the various kinds of communication services to each wireless communication apparatus using wireless communication. The information processing apparatus 200 will be described in detail with reference to FIG. 3.

Accordingly, the communication system 100 is a wireless communication system having wireless communication apparatuses (devices), contract authentication information on which can be rewritten via a network.

[Configuration Example of Information Processing Apparatus]

Figure 3:
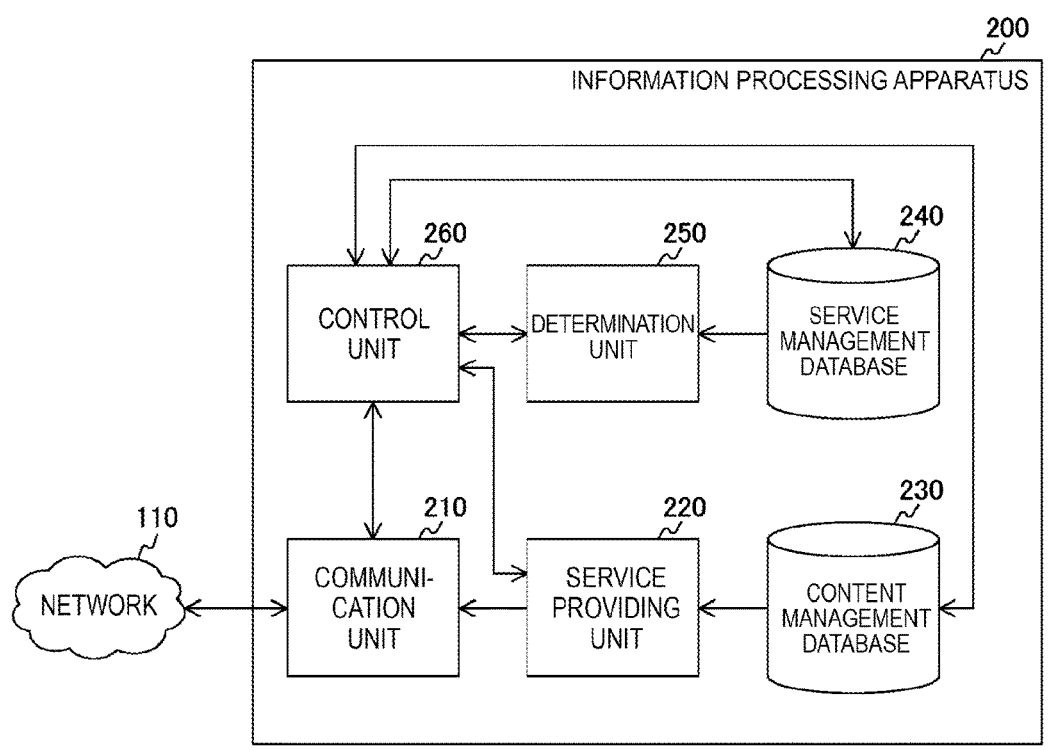
FIG. 3 is a block diagram showing a functional configuration example of an information processing apparatus 200 according to the first embodiment of the present technology.

FIG. 3 is a block diagram showing a functional configuration example of the information processing apparatus 200 according to the first embodiment of the present technology.

The information processing apparatus 200 includes a communication unit 210, a service providing unit 220, a content management database 230, a service management database 240, a determination unit 250, and a control unit 260. Also, the information processing apparatus 200 is an example of an information processing apparatus and an information processing system described in the claims.

The communication unit 210 is connected to the network 110 and performs communication performed between respective wireless communication apparatuses connected via the network 110 under control of the control unit 260. For example, the communication unit 210 receives information (for example, various kinds of notifications) transmitted from each wireless communication apparatus via the network 110 and outputs all of the received information to the control unit 260. Also, the communication unit 210 transmits various kinds of content output from the service providing unit 220 to each wireless communication apparatus via the network 110.

The service providing unit 220 provides various kinds of services to a wireless communication apparatus connected via the network 110 in response to a request from the wireless communication apparatus under control of the control unit 260. Also, the service providing unit 220 uses various kinds of data stored in the content management database 230 when the service providing unit 220 provides the various kinds of communication services. For example, when a content download request is received from the wireless communication apparatus 400, the service providing unit 220 acquires content (for example, electronic book content) relating to the request from the content management database 230. Then, the service providing unit 220 transmits the acquired content to the wireless communication apparatus 400 via the communication unit 210.

The content management database 230 is a database that stores various kinds of data when the service providing unit 220 provides various kinds of communication services or data transmitted from a wireless communication apparatus. The content management database 230 stores, for example, content (for example, image content) uploaded from a wireless communication apparatus or content for providing content (for example, electronic book content or a web site) to be downloaded.

The service management database 240 is a database that stores various kinds of data used when the information processing apparatus 200 provides various kinds of communication services. Also, the service management database 240 will be described in detail with reference to FIG. 4.

The determination unit 250 determines whether a predetermined condition for performing a communication process between the information processing apparatus 200 and the wireless communication apparatus 400 is satisfied, and outputs the determination result to the control unit 260. Also, for example, the determination unit 250 determines whether a predetermined condition (for example, an end of a month) for performing a communication process relating a specific service provided by the service providing company 50 between the information processing apparatus 200 and the wireless communication apparatus 400 is satisfied. Also, the determination unit 250 determines whether a predetermined condition (for example, communication termination of a specific service) for invalidating the connection right (rights of using MCIM) set in the wireless communication apparatus 400 is satisfied, and outputs the determination result to the control unit 260. The predetermined condition will be described in detail with reference to FIGS. 21 and 22.

The control unit 260 performs control relating to communication performed between respective wireless communication apparatuses connected via the network 110. For example, the control unit 260 performs control for performing a content providing process, an upload process, or a download process (communication processes). In addition, the content providing process is a communication process (for example, Web site browsing) of providing content from the information processing apparatus 200 to the wireless communication apparatus 400. The upload process is a communication process of uploading content from the wireless communication apparatus 400 to the information processing apparatus 200. The download process is a communication process of downloading content from the information processing apparatus 200 to the wireless communication apparatus 400.

For example, when the determination unit 250 determines that the predetermined condition is satisfied, the control unit 260 performs control to set the connection right (rights of using MCIM) in the wireless communication apparatus 400. Then, the control unit 260 performs control such that the wireless communication apparatus 400 connects to the network 110 based on the set connection right and performs a communication process with the information processing apparatus 200. Thereafter, when the determination unit 250 determines that the predetermined condition for invalidation is satisfied, the control unit 260 performs control to invalidate the connection right set in the wireless communication apparatus 400. That is, when the communication process performed between the information processing apparatus 200 and the wireless communication apparatus 400 is terminated, the control unit 260 performs control to perform an invalidation process of invalidating the connection right set in the wireless communication apparatus 400. Such control will be described in detail with reference to FIGS. 21 and 22.

[Configuration Example of Service Management Database]

FIG. 4 is a diagram schematically illustrating the service management database 240 according to the first embodiment of the present technology.

The service management database 240 stores service identification information 241, service information 242, a service ID 243, a service password 244, terminal identification information 245, and relevant information 246 in association therewith. For example, such information is updated sequentially by the control unit 260 based on a registration correction request from the service providing company 50. For example, when a user 60 of the wireless communication apparatus 400 executes a contract for receiving a predetermined service with the service providing company 50, the contract contents are reflected and registered in the service management database 240.

Identification information for identifying each service is stored in the service identification information 241.

Information regarding a kind or the like of service receivable by each wireless communication apparatus is stored in the service information 242. For example, when the wireless communication apparatus 400 is contracted to receive a service for storing image content, the fact that wireless the wireless communication apparatus 400 is contracted to receive the service for storing image content is stored in the service information 242.

An ID of a service (a service received using a wireless communication apparatus) contracted between a user of the wireless communication apparatus and the service providing company 50 is stored in the service ID 243.

A password of a service (a service received using a wireless communication apparatus) contracted between a user of the wireless communication apparatus and the service providing company 50 is stored in the service password 244.

Terminal identification information for identifying each wireless communication apparatus is stored in the terminal identification information 245. The terminal identification information is identification information (for example, an apparatus unique ID) for identifying a wireless communication apparatus. For example, IMEI (International Mobile Equipment Identity) is stored in the terminal identification information 245. Also, since IMEI is represented by a number of 15 digits, "121231234567890" is shown as an example in FIG. 4. For example, "121231234567890" of the terminal identification information 245 is assumed to correspond to the wireless communication apparatus 400.

Information (relevant information) relating to a service received by each wireless communication apparatus is stored in the relevant information 246. For example, when an upper limit (within 100 MB) is set for a storage service of image content receivable by the wireless communication apparatus 400, the fact that the upper limit is set for the storage service of image content is stored in the relevant information 246.

[Configuration Example of Communication Control Apparatus]

Figure 5:
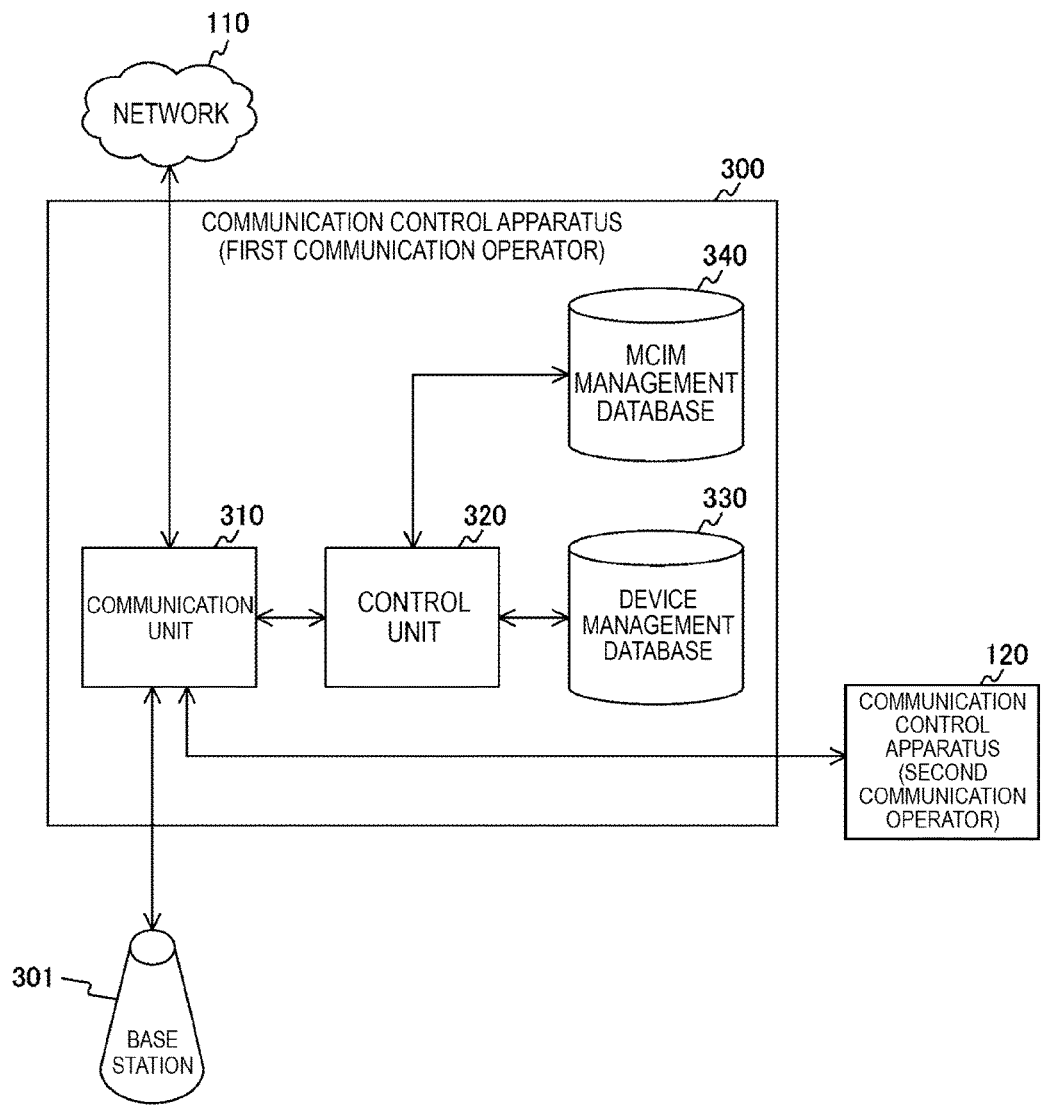
FIG. 5 is a block diagram illustrating a functional configuration example of a communication control apparatus (first communication operator) 300 according to the first embodiment of the present technology.

FIG. 5 is a block diagram illustrating a functional configuration example of the communication control apparatus (first communication operator) 300 according to the first embodiment of the present technology.

The communication control apparatus (first communication operator) 300 includes a communication unit 310, a control unit 320, a device management database 330, and an MCIM management database 340. Also, the communication control apparatus (first communication operator) 300 is an example of an information processing apparatus described in the claims.

The communication unit 310 is connected to the network 110, the communication control apparatus (second communication operator) 120, and the base station 301 and performs communication performed between respective wireless communication apparatuses connected via the base station 301 under control of the control unit 320.

As shown in FIG. 2, the control unit 320 performs various kinds of control relating to a wireless communication apparatus connected directly or via the communication control apparatus (second communication operator) 120.

For example, the control unit 320 determines that the predetermined condition is satisfied when the wireless communication apparatus 400 is registered in the device management database 330 to receive a specific service. Specifically, the control unit 320 determines whether the predetermined condition is satisfied based on the device management database 330 that manages the registered wireless communication apparatus and a use status of a connection right by this wireless communication apparatus for each wireless communication apparatus. Also, the control unit 320 determines that the predetermined condition is not satisfied when all of the connection rights are used among a given number of connection rights ensured by the service providing company 50.

For example, when the predetermined condition is satisfied, the control unit 320 performs control for setting a connection right (rights of using MCIM) in the wireless communication apparatus 400. Then, the control unit 320 performs control such that the wireless communication apparatus 400 connects to the network 110 based on the set connection right and performs a communication process with the information processing apparatus 200. Also, when the connection right is set in the wireless communication apparatus 400 and the connection right is released from the wireless communication apparatus 400 in which the connection right is set, the control unit 320 updates a use status relating the wireless communication apparatus 400 in the device management database 330. An update example is shown in FIG. 6. Also, when the communication process performed between the information processing apparatus 200 and the wireless communication apparatus 400 is terminated, the control unit 320 performs control such that an invalidation process of invalidating the connection right set in the wireless communication apparatus 400 is performed. The control unit 320 is an example of a determination unit and a control unit described in the claims.

The device management database 330 is a database that stores various kinds of information for managing each wireless communication apparatus (device) connected via the base station 301. Also, the device management database 330 will be described in detail with reference to FIG. 6. The device management database 330 is an example of a database described in the claims.

The MCIM management database 340 is a database that stores various kinds of information for managing MCIM set in each wireless communication apparatus (device) connected via the base station 301. Also, the MCIM management database 340 will be described in detail with reference to FIG. 7.

[Configuration Example of Device Management Database]

FIG. 6 is a diagram schematically illustrating the device management database 330 according to the first embodiment of the present technology.

The device management database 330 stores service identification information 331, terminal identification information 332, a PCID 333, and MCIM allocation information 334 in association therewith. For example, such information is sequentially updated by the control unit 320 based on a registration request or an MCIM acquisition request from each wireless communication apparatus. Also, transition examples of the update are shown in FIGS. 6(a) to 6(c). That is, FIG. 6(a) shows a state in which a registration process is not performed for even one wireless communication apparatus. FIG. 6(b) shows a state in which one wireless communication apparatus (wireless communication apparatus 400) is registered after the registration process. FIG. 6(c)

shows a state in which MCIM is allocated to one wireless communication apparatus (wireless communication apparatus 400).

Identification information for identifying each service is stored in the service identification information 331. Also, the service identification information 331 corresponds to the service identification information 241 shown in FIG. 4.

Terminal identification information for identifying each wireless communication apparatus is stored in the terminal identification information 332. Also, the terminal identification information 332 corresponds to the terminal identification information 245 shown in FIG. 4.

A PCID assigned to each wireless communication apparatus is stored in the PCID 333.

Information (MCIM allocation information) for managing whether MCIM is allocated to each wireless communication apparatus connected via the base station 301 is stored in the MCIM allocation information 334.

[Configuration Example of MCIM Management Database]

FIG. 7 is a diagram schematically illustrating the MCIM management database 340 according to the first embodiment of the present technology.

The MCIM management database 340 stores MCIM identification information 341 and terminal identification information 342 in association therewith. For example, such information is sequentially updated by the control unit 320 based on an MCIM acquisition request from each wireless communication apparatus. Also, transition examples of the update are shown in FIGS. 7(*a*) and 7(*b*).

As described above, the service providing company 50 is assumed to execute a contract with the second communication operator in advance and prepare a given number of MCIMs (that is, an MCIM pool) based on the contract. Therefore, when a user of a wireless communication apparatus uses a service provided by the service providing company 50, an unused MCIM can be allocated among the given number of MCIMs. Thus, the given number of MCIMs (that is, an MCIM pool) allocated to respective wireless communication apparatuses are managed by the MCIM management database 340.

MCIM identification information for identifying MCIM allocated to each wireless communication apparatus is stored in the MCIM identification information 341.

Terminal identification information for identifying each wireless communication apparatus is stored in the terminal identification information 342. Also, the terminal identification information 342 corresponds to the terminal identification information 245 shown in FIG. 4.

[Configuration Example of Wireless Communication Apparatus]

Figure 8:
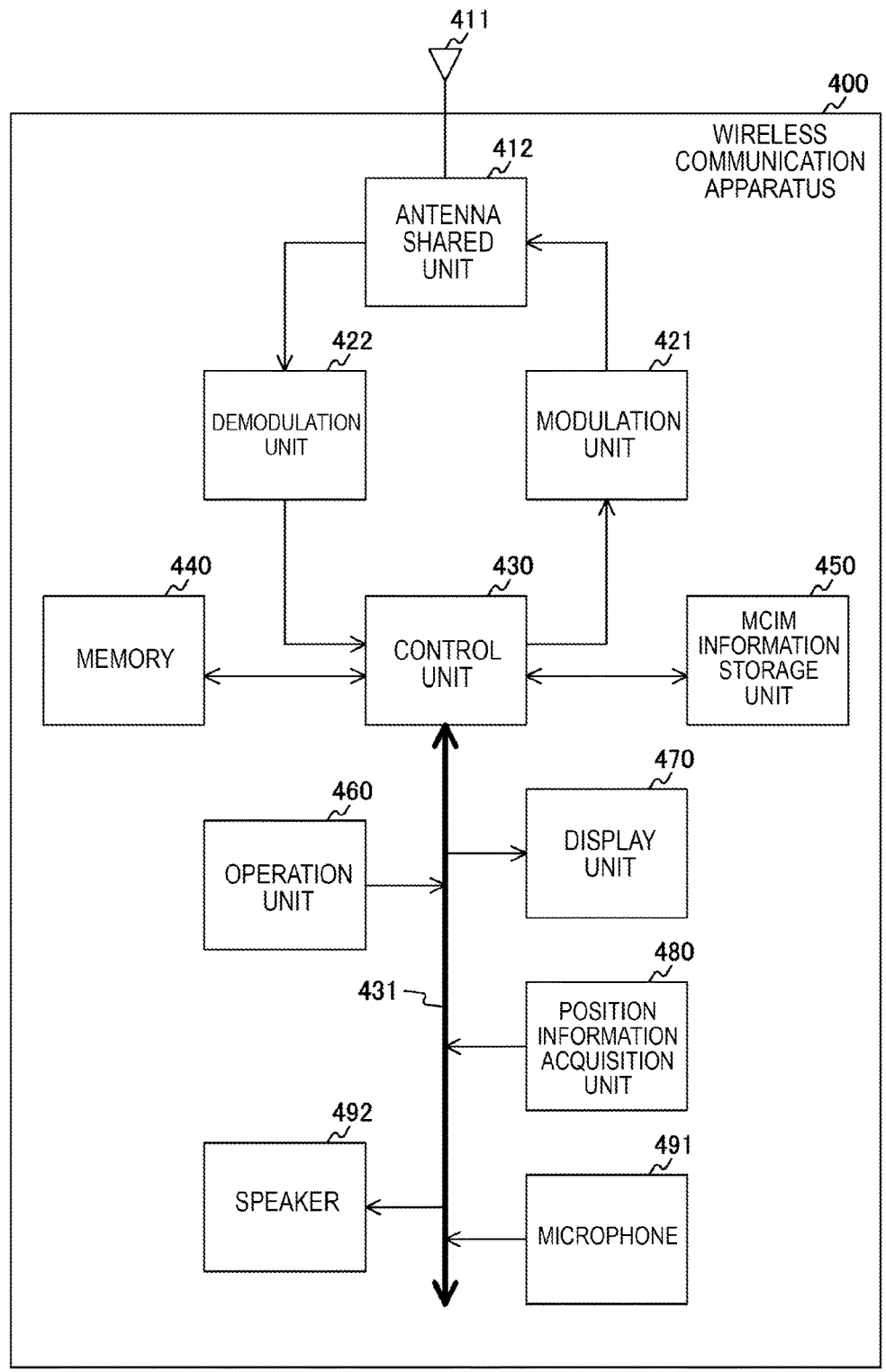
FIG. 8 is a block diagram illustrating an internal configuration example of a wireless communication apparatus 400 according to the first embodiment of the present technology.

FIG. 8 is a block diagram illustrating an internal configuration example of the wireless communication apparatus 400 according to the first embodiment of the present technology.

The wireless communication apparatus 400 includes an antenna 411, an antenna shared unit 412, a modulation unit 421, a demodulation unit 422, a control unit 430, a memory 440, and an MCIM information storage unit 450. In addition, the wireless communication apparatus 400 includes an operation unit 460, a display unit 470, a position information acquisition unit 480, a microphone 491, and a speaker 492. The respective units are connected by a bus 431. Here, the wireless communication apparatus 400 is an example of a wireless communication apparatus and an information processing apparatus described in the claims.

For example, when a reception process is performed, radio waves received by the antenna 411 are demodulated by the demodulation unit 422 via the antenna shared unit 412 and the demodulated received data is supplied to the control unit 430. When the reception process is a call reception process, the demodulated received data (audio data) is output as an audio from the speaker 492 via the control unit 430.

For example, when a transmission process is performed, transmitted data output by the control unit 430 is modulated by the modulation unit 421 and the modulated transmitted data is transmitted from the antenna 411 via the antenna shared unit 412. When the transmission process is a call transmission process, audio data input from the microphone 491 is modulated by the modulation unit 421 via the control unit 430 and the modulated transmitted data (audio data) is transmitted from the antenna 411 via the antenna shared unit 412.

The control unit 430 performs various kinds of control based on a control program stored in the memory 440. The control unit 430 includes, for example, a microprocessor. For example, the control unit 430 is connected to the modulation unit 421 and the demodulation unit 422, and transmits and receives various kinds of data with the communication control apparatus (second communication operator) 120 connected via the base station 122. Also, for example, the control unit 430 performs a connection process of connecting to the communication control apparatus (first communication operator) 300 via a wireless line by the limited connection based on the PCID without using MCIM. The control unit 430 is an example of a determination unit and a control unit described in the claims.

The memory 440 is a memory that stores a control program, transmitted data, received data, and the like used for the control unit 430 to perform various kinds of control. The memory 440 includes, for example, a ROM (Read-Only Memory) or a RAM (Random Access Memory). Also, the memory 440 stores terminal identification information (for example, IMEI) for specifying the wireless communication apparatus 400.

The MCIM information storage unit 450 is a memory that holds MCIM (contract authentication information). For example, as the MCIM information storage unit 450, a UICC (Universal Integrated Circuit) card may be used or a dedicated memory may be used to hold MCIM securely. When a UICC card is used as the MCIM information storage unit 450, a UICC card for which MCIM is not fixedly written but MCIM validation and invalidation processes can be performed is used. That is, a UICC card for which the control unit 430 can perform the MCIM validation and invalidation processes based on information (setting information and invalidation information) received from the antenna 411 and demodulated is used. Also, a UICC card for which an MCIM rewriting process can be performed is used. In addition, validation and invalidation processes defined by 3GPP (Third Generation Partnership Project) can be performed as the MCIM validation and invalidation processes. Also, by ensuring a secure area in the memory 440, the MCIM information storage unit 450 may be provided inside the memory 440.

The operation unit 460 is an operation reception unit that receives an operation input operated by a user and outputs a signal to the control unit 430 according to the received operation input. The operation unit 460 includes various kinds of keys such as numerical keys and alphabetic keys. Also, the operation unit 460 receives operations for executing various kinds of communication services with the information processing apparatus 200.

The display unit 470 is a display unit that displays various kinds of information (text information, visual information, and the like) based on control of the control unit 430. For example, the display unit 470 displays information (for example, a display screen shown in FIG. 9) for executing various kinds of communication services with the information processing apparatus 200. For example, a display panel such as an organic EL (Electro Luminescence) panel or an LCD (Liquid Crystal Display) panel can be used as the display unit 470. Also, the operation unit 460 and the display unit 470 may be integrally configured using a touch panel on which a user can execute an operation input by touching or approaching a display surface with his or her finger.

Here, for example, the control unit 430 determines whether a predetermined condition for performing a communication process relating to a specific service provided by the service providing company 50 between the information processing apparatus 200 and the wireless communication apparatus 400 is satisfied. Specifically, when the operation unit 460 receives a predetermined operation or a predetermined timing arrives, the control unit 430 determines that the predetermined condition is satisfied. Here, the predetermined operation is, for example, a service use starting operation (for example, a photographing instruction operation). The predetermined timing is, for example, a timing (for example, a timing at which a free capacity of the memory 440 is equal to or less than a given value) at which image content is uploaded.

When the predetermined condition is satisfied, the control unit 430 performs control such that a communication process with the information processing apparatus 200 is performed by setting the connection right (rights of using MCIM) in the wireless communication apparatus 400 and connecting the wireless communication apparatus 400 to the network 110 based on the connection right. Specifically, the control unit 430 performs a setting request (MCIM acquisition request) for making a request for setting the connection right in the wireless communication apparatus 400 on the communication control apparatus (first communication operator) 300. Then, the control unit 430 performs control such that a communication process with the information processing apparatus 200 is performed after the connection to the network 110 based on the connection right set by the communication control apparatus (second communication operator) 120 in response to the setting request. For example, the control unit 430 performs control such that a content providing process, an upload process, or a download process is performed, as described above.

Here, the connection right (network connection right) is a right of connecting to a base station based on the contract authentication information (for example, MCIM) for connecting to a base station operated by a communication operator (for example, the second communication operator) contracted by the service providing company 50. Also, a connection right including a limitation to perform only a specific communication process between the information processing apparatus 200 and the wireless communication apparatus 400 may be set as the connection right. For example, a limitation such that access is disabled outside of a domain of the information processing apparatus 200 can be included.

When the connection right is set in the wireless communication apparatus 400 and the wireless communication apparatus 400 is thus connected to the network 110, the communication control apparatus (first communication operator) 300 notifies the information processing apparatus 200 that the connection right is set in the wireless communication apparatus 400 and the wireless communication apparatus 400 is thus connected to the network 110.

The control unit 430 determines whether a predetermined condition (for example, when use of a service is terminated) for invalidating the set connection right is satisfied. When the control unit 430 determines that the predetermined condition for the invalidation is satisfied, the control unit 430 performs control such that the connection right set in the wireless communication apparatus 400 is invalidated.

When a communication process performed between the information processing apparatus 200 and the wireless communication apparatus 400 is terminated, the control unit 430 performs control such that an invalidation process of invalidating the connection right set in the wireless communication apparatus 400 is performed.

When the connection right set in the wireless communication apparatus 400 is invalidated, the communication control apparatus (first communication operator) 300 notifies the information processing apparatus 200 that the connection right is invalidated.

The position information acquisition unit 480 acquires position information indicating the position where the wireless communication apparatus 400 is located and outputs the acquired position information to the control unit 430. The position information acquisition unit 480 can be realized by a GPS (Global Positioning System) unit that calculates position information based on a GPS signal received by a GPS signal receiving antenna (not shown). The calculated position information includes each piece of data on the position such as the latitude, longitude, altitude and the like when the GPS signal is received. Alternatively, a position information acquisition apparatus that acquires position information by a different acquisition method of position method may be used. For example, a position information acquisition apparatus that acquires position information by deriving position information by using access point information by wireless LAN (Local Area Network) present therearound.

[Display Example of Registration Operation Screen]

Figure 9:
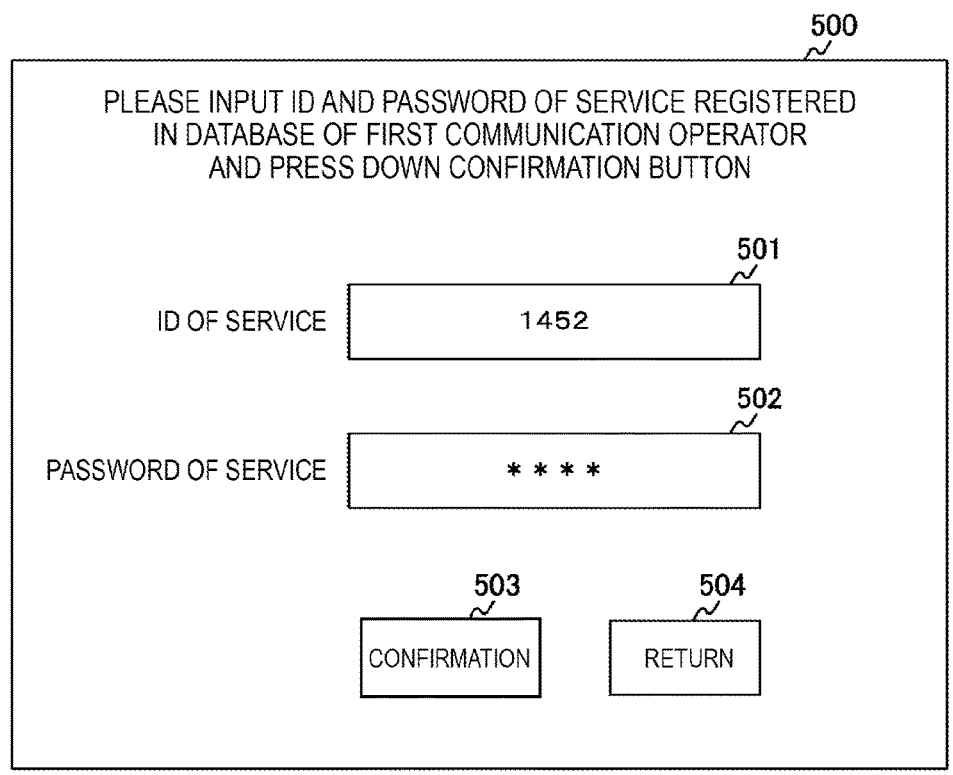
FIG. 9 is a diagram illustrating a display screen example (registration operation screen 500) displayed on a display unit 470 of the wireless communication apparatus 400 according to the first embodiment of the present technology.

FIG. 9 is a diagram illustrating a display screen example (registration operation screen 500) displayed on the display unit 470 of the wireless communication apparatus 400 according to the first embodiment of the present technology.

The registration operation screen 500 is the registration operation screen 500 for performing a registration operation of registering the wireless communication apparatus 400 in the device management database 330 (shown in FIG. 6) of the communication control apparatus (first communication operator) 300. The registration operation screen 500 includes a service ID input area 501, a service password input area 502, a confirmation button 503, and a return button 504.

The service ID input area 501 is an area in which an ID of a service (service received using the wireless communication apparatus 400) contracted with the service providing company 50 by the user of the wireless communication apparatus 400 is input.

The service password input area 502 is an area in which a password of a service (service received using the wireless communication apparatus 400) contracted with the service providing company 50 by the user of the wireless communication apparatus 400 is input. That is, the ID of the service contracted with the service providing company 50 by the user of the wireless communication apparatus 400 is input in the service ID input area 501 and the password of the service is input in the service password input area 502. Specifically, information stored in the service ID 243 shown in FIG. 4 is input in the service ID input area 501 and information stored in the service password 244 shown in FIG. 4 is input in the service password input area 502. Also, since the password is not displayed on the actual screen for the sake of security, the password is indicated by "**" in FIG. 9**.

The confirmation button 503 is a button pressed down when operation contents are confirmed after each of the above-described operations (input operations) is performed.

The return button 504 is, for example, a button pressed down to return to an immediately previously displayed display screen.

This example is an example in which a user manually inputs the ID and the password of a service acquired at the time of contract with the service providing company 50. However, the input of the ID and the password of the service may be omitted. For example, a case in which the wireless communication apparatus 400 is launched as a model that can use the service will be assumed. In this case, the ID and the password of the service at the time of the launch may be preinstalled in the wireless communication apparatus 400 so that the preinstalled ID and password of the service can be used. Also, when the user contracts with the service providing company 50, the ID and the password of the service may be transmitted from the information processing apparatus 200 to the wireless communication apparatus 400 to be stored for use. Thus, when the ID and the password of the service are stored in the wireless communication apparatus 400, display of the registration operation screen 500 can be omitted. Also, the ID and the password of the service stored in the wireless communication apparatus 400 may be displayed on the registration operation screen 500 so that the user can confirm the ID and the password of the service.

In the first embodiment of the present technology, the user of the wireless communication apparatus 400 is assumed to execute a contract regarding service use provided by the service providing company 50 in advance with the service providing company 50. Also, service use registration is assumed to be recorded in the service management database 240 of the information processing apparatus 200 (for example, "G0001" of the service identification information 241).

Also, the communication control apparatus (first communication operator) 300 is assumed to be able to confirm whether service use registration of the wireless communication apparatus performing a log-in request to the information processing apparatus 200 (service providing company 50) with the service providing company 50 is completed.

[Communication Example when Contract Service is Registered in First Communication Operator]

Figure 10:
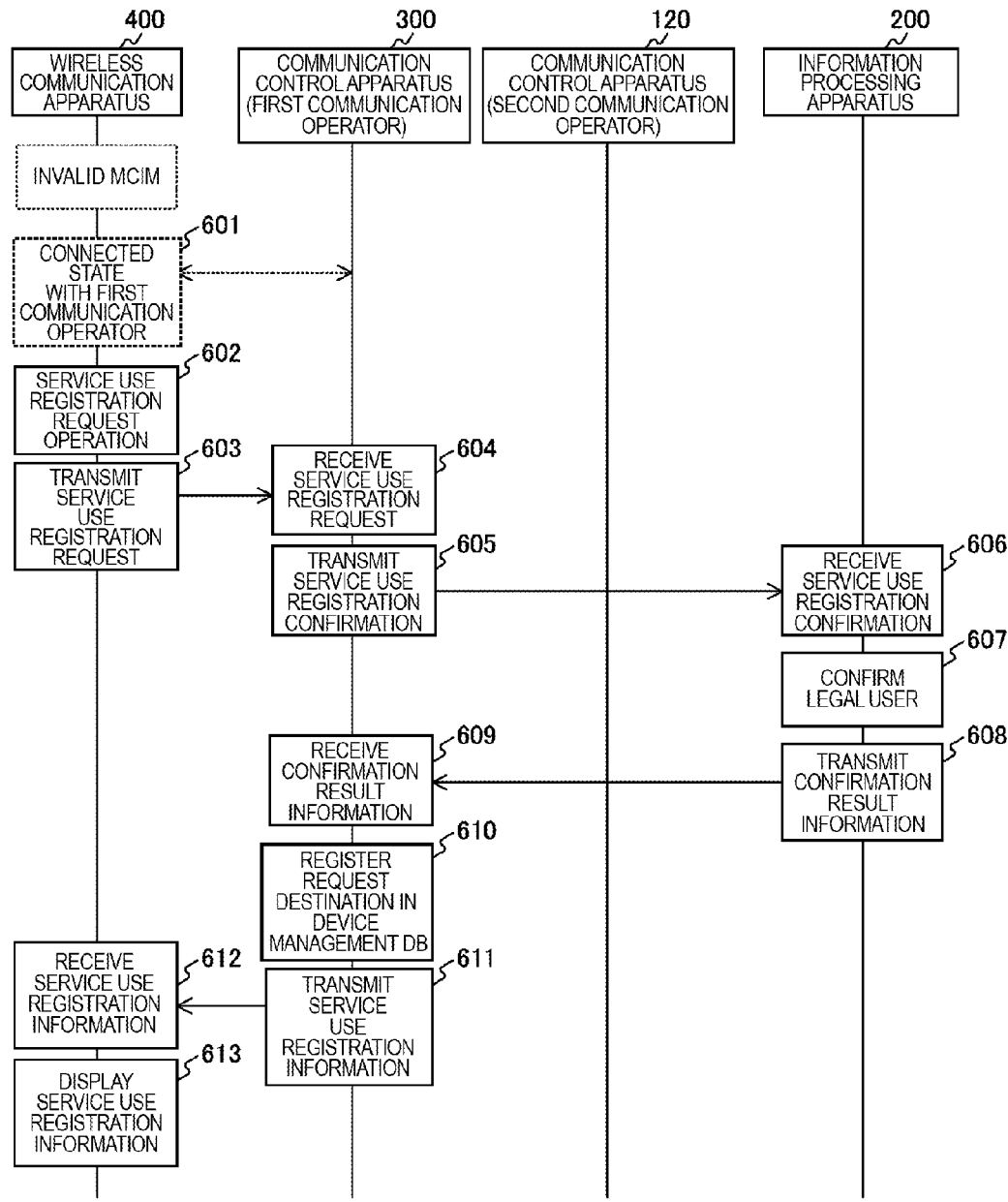
FIG. 10 is a sequence chart illustrating a communication process example between respective apparatuses included in the communication system 100 according to the first embodiment of the present technology.

FIG. 10 is a sequence chart illustrating a communication process example between the respective apparatuses included in the communication system 100 according to the first embodiment of the present technology.

In FIG. 10, an example in which a service contracted between the user of the wireless communication apparatus 400 and the service providing company 50 is registered (initially registered) in the communication control apparatus (first communication operator) 300 when the wireless communication apparatus 400 does not hold MCIM will be described. In FIG. 10, the wireless communication apparatus 400 is assumed to be in a connected state (601) with the communication control apparatus (first communication operator) 300. Also, FIG. 10 shows a communication process example when registration information regarding the service (for example, an image content storage service) contracted with the service providing company 50 is registered in the communication control apparatus (first communication operator) 300 by operating the wireless communication apparatus 400.

First, a log-in request is made from the wireless communication apparatus 400 to the communication control apparatus (first communication operator) 300 through a user's operation (602). Specifically, the display unit 470 of the wireless communication apparatus 400 is caused to display a display screen for registering the registration information regarding the service (for example, an image content storage service) contracted with the service providing company 50 in the first communication operator. For example, the registration operation screen 500 (here, a screen in which each input area is blank) shown in FIG. 9 is displayed on the display unit 470 of the wireless communication apparatus 400.

Here, on the registration operation screen 500 shown in FIG. 9, the ID and the password of the service contracted by the user of the wireless communication apparatus 400 are input to the service ID input area 501 and the service password input area 502, respectively (602). After the input operation is performed, the confirmation button 503 is pressed down (602).

Thus, when a service use registration operation is received (602), a service use registration request corresponding to the service use registration operation is transmitted from the wireless communication apparatus 400 to the communication control apparatus (first communication operator) 300 (603 and 604). Since the wireless communication apparatus 400 is in the connected state (601) with the communication control apparatus (first communication operator) 300, as described above, the service use registration request is directly transmitted from the wireless communication apparatus 400 to the communication control apparatus (first communication operator) 300 (603 and 604).

Here, the service use registration request includes information input on the registration operation screen 500 and the terminal identification information (terminal identification information (121, . . . ) stored in the memory 440) of the wireless communication apparatus performing the service use registration request. Information input on the registration operation screen 500 is, for example, the ID and the password of the service.

When the service use registration request is received (604), the control unit 320 of the communication control apparatus (first communication operator) 300 transmits a message of the service use registration confirmation to the information processing apparatus 200 (605 and 606). The service use registration confirmation is a message for confirming whether the wireless communication apparatus transmitting the service use registration request is the wireless communication apparatus of a legal user. Also, the service use registration confirmation includes information (for example, the ID and the password of the service and the terminal identification information of the wireless communication apparatus) included in the received service use registration request.

When the message of the service use registration confirmation is received (606), the control unit 260 of the information processing apparatus 200 performs a confirmation process of confirming whether the wireless communication apparatus related to the terminal identification information included in the service use registration confirmation is a wireless communication apparatus related to possession by the legal user (607). For example, it is confirmed whether information (the ID and the password of the service and the terminal identification information) included in the service use registration confirmation is identical with information stored in the service management database 240 of the information processing apparatus 200.

Subsequently, the control unit 260 of the information processing apparatus 200 transmits a result (confirmation result information) of the confirmation processing of the legal user to the communication control apparatus (first communication operator) 300 (608 and 609). Here, when the wireless communication apparatus transmitting the service use registration request is the wireless communication apparatus related to the possession by the legal user, confirmation result information (success notification) indicating confirmation success is transmitted. Conversely, when the wireless communication apparatus transmitting the service use registration request is not the wireless communication apparatus related to the possession by the legal user, confirmation result information (failure notification) indicating confirmation failure is transmitted.

When the confirmation result information (failure notification) indicating the confirmation failure is received (609), the control unit 320 of the communication control apparatus (first communication operator) 300 notifies the wireless communication apparatus transmitting the service use registration request that the service use registration is not performed.

Also, when the confirmation result information (success notification) indicating the confirmation success is received (609), the control unit 320 of the communication control apparatus (first communication operator) 300 performs a registration process (610). The registration process is a process of registering the wireless communication apparatus transmitting the service use registration request in the device management database 330. For example, the content of the device management database 330 is changed from the content shown in FIG. 6(a) to the content shown in FIG. 6(b).

Subsequently, the control unit 320 of the communication control apparatus (first communication operator) 300 transmits service use registration information indicating completion of the service use registration to the wireless communication apparatus transmitting the service use registration request (611 and 612).

When the wireless communication apparatus 400 receives the service use registration information (612), the service use registration information is displayed on the display unit 470 of the wireless communication apparatus 400 (613). For example, in response to the service use registration request, a registration result notification screen for notifying of the completion of the service use registration is displayed as the service use registration information (613).

Thus, by performing the registration process, the wireless communication apparatus 400 is registered in the device management database 330 held by the communication control apparatus (first communication operator) 300. Therefore, the wireless communication apparatus 400 is permitted to use MCIM.

[Use Example of Wireless Communication Apparatus]

Figure 11:
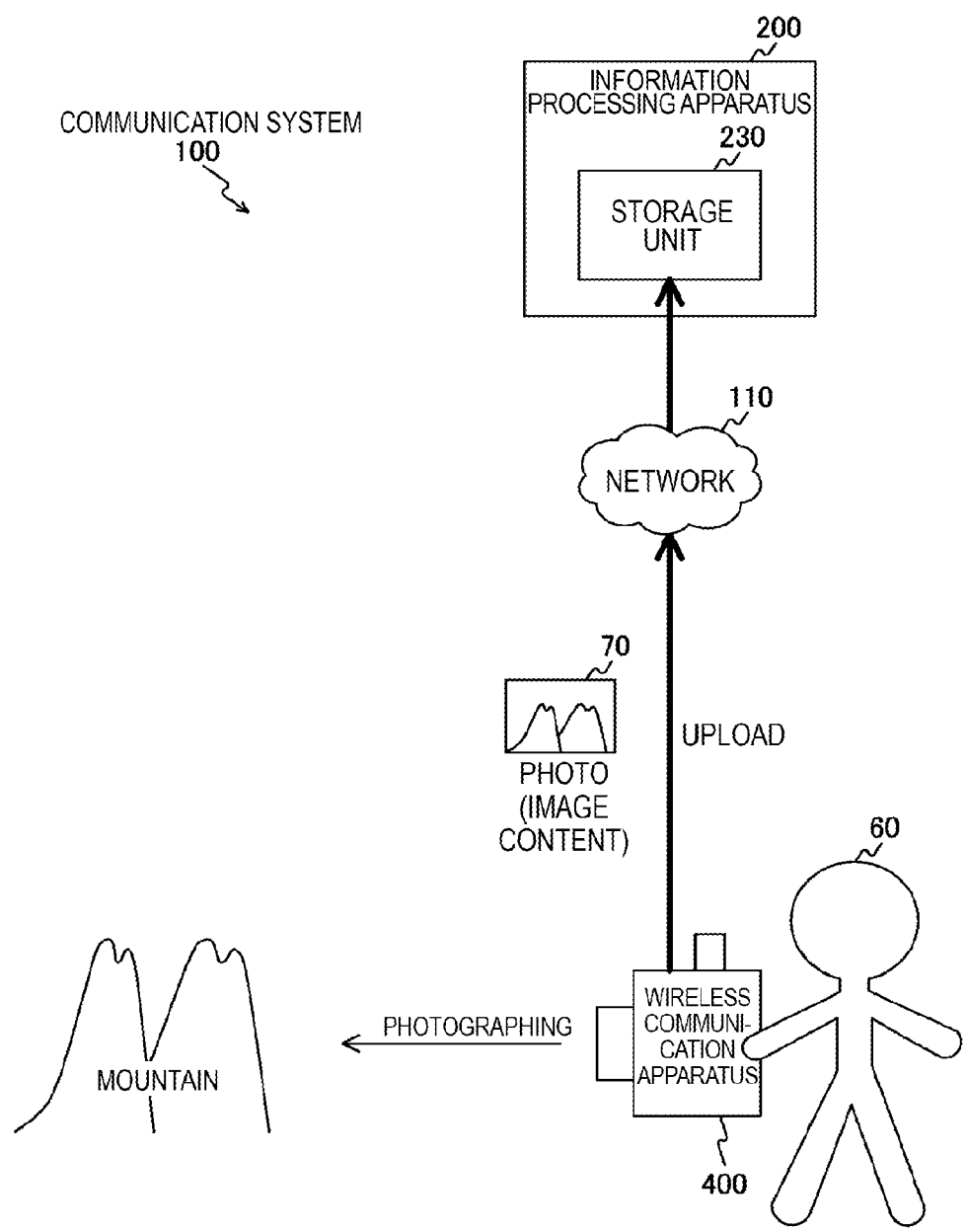
FIG. 11 is a diagram simply illustrating a use example of the wireless communication apparatus 400 according to the first embodiment of the present technology.

FIG. 11 is a diagram simply illustrating a use example of the wireless communication apparatus 400 according to the first embodiment of the present technology. FIG. 11 shows a state in which a photo is taken using the wireless communication apparatus 400.

In FIG. 11, a case in which the wireless communication apparatus 400 is an imaging apparatus (for example, a digital still camera or a digital video camera (camera-integrated recorder)) having a wireless communication function and uses a software downloadable SIM is assumed. Also, a case in which the information processing apparatus 200 is a content server capable of storing various kinds of content (image content and music content) is assumed.

Here, an example in which image content generated through a photographing process using the wireless communication apparatus 400 is uploaded to the information processing apparatus 200 to be stored will be described. For example, the wireless communication apparatus 400 is assumed to be set such that a photo (image content) is automatically stored in the information processing apparatus 200 at a predetermined timing (for example, immediately after photographing).

For example, the user 60 performs a full push operation on a shutter button 461 (shown in FIG. 12) while orienting a lens of the wireless communication apparatus 400 toward a subject (maintain). According to the full push operation on the shutter button 461, an imaging unit (not shown) of the wireless communication apparatus 400 performs an imaging process to generate image data. The image data generated in this way is recorded as image content (image file) in the memory 440 of the wireless communication apparatus 400. Thus, when the image content is recorded in the memory 440, the control unit 430 of the wireless communication apparatus 400 determines whether a predetermined condition for connecting to the network 110 and performing a predetermined communication process (image content upload process) is satisfied. This determination will be described in detail with reference to FIG. 13.

For example, a case in which the predetermined condition for connecting to the network 110 and performing the predetermined communication process (image content upload process) is satisfied is assumed. In this case, the wireless communication apparatus 400 can upload the photo (image content 70) to the information processing apparatus 200 using MCIM. For example, the photo (image content 70) recorded in the memory 440 of the wireless communication apparatus 400 is transmitted to the information processing apparatus 200 via the communication control apparatus (second communication operator) 120 and the network 110 and is recorded in the content management database 230 (shown in FIG. 3).

Thus, for example, when the photo (image content 70) is uploaded to the information processing apparatus 200 using wireless communication, it is necessary to set valid MCIM in the wireless communication apparatus 400. However, the wireless communication apparatus 400 (for example, a camera) is assumed to be connected to a network such as the Internet and perform a communication process relatively less frequently. Therefore, it is not necessary to connect the wireless communication apparatus 400 (for example, a camera) to be connected constantly to a network such as the Internet. For example, when a photo is taken at an event such as a sporting event, the wireless communication apparatus 400 (for example, a camera) is assumed to be connected to the network such as the Internet to upload the photo to the information processing apparatus 200.

That is, many devices such as the wireless communication apparatus 400 (for example, a camera) are treated in such a manner that the devices are in a limited connection state or a power-off state at normal times and temporarily use the rights of using MCIM when necessary. In this case, for example, when MCIM can be set only in a case in which a process (communication process) of uploading a photo (image content) recorded in the wireless communication apparatus 400 is performed, the user 60 may not execute the contract of MCIM for the wireless communication apparatus 400.

Accordingly, in the first embodiment of the present technology, an example in which MCIM is set only when a process (communication process) of uploading a photo (image content) recorded in the wireless communication apparatus 400 is performed will be described.

[Display Example of Setting Screen]

Figure 12:
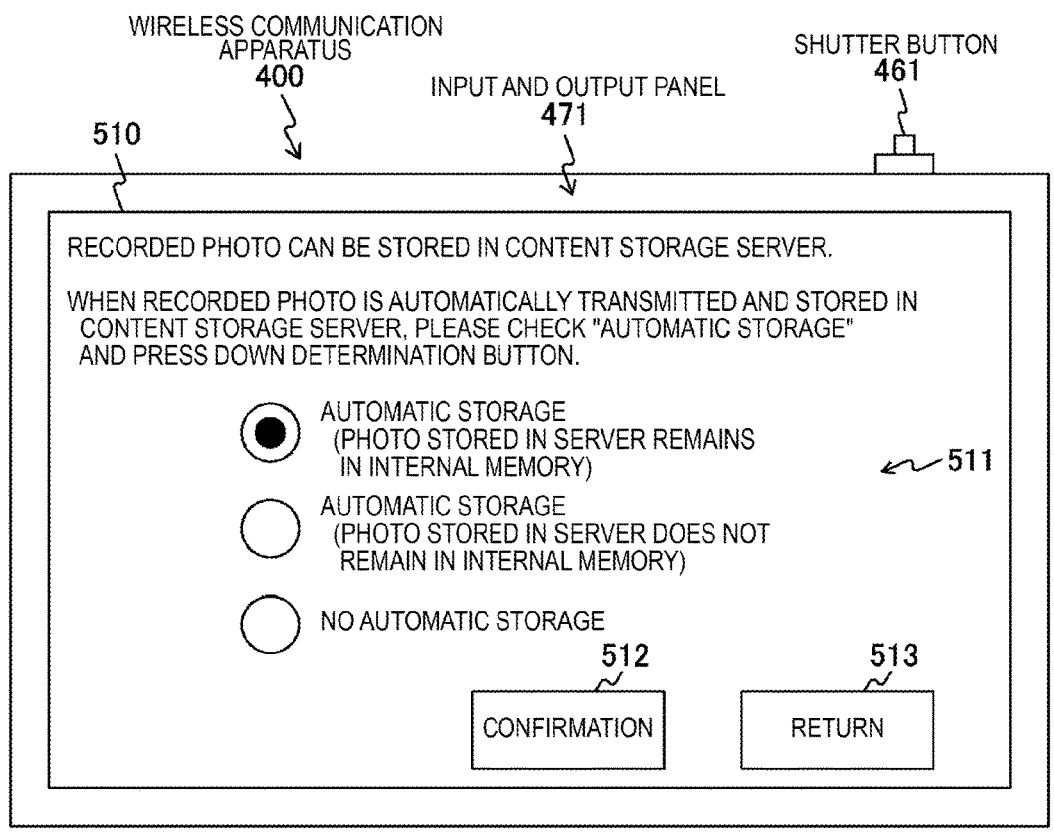
FIG. 12 is a diagram illustrating a display screen example (automatic storage necessity and non-necessity selection screen 510) displayed on the display unit 470 of the wireless communication apparatus 400 according to the first embodiment of the present technology.

FIG. 12 is a diagram illustrating a display screen example (automatic storage necessity and non-necessity selection screen 510) displayed on the display unit 470 of the wireless communication apparatus 400 according to the first embodiment of the present technology.

The automatic storage necessity and non-necessity selection screen 510 is a display screen for selecting whether a photo (image content) photographed using the wireless communication apparatus 400 is automatically stored in the information processing apparatus 200. Also, for example, the automatic storage necessity and non-necessity selection screen 510 is displayed according to a selection operation on a display screen (for example, a menu screen) for selecting a function of causing the wireless communication apparatus 400 to perform a process.

FIG. 12 also shows an example in which an input and output panel 471 in which the operation unit 460 and the display unit 470 are integrally configured is installed on a rear surface (that is, an opposite side to a surface on which a lens facing a subject is installed) side of the wireless communication apparatus 400.

The input and output panel 471 displays various kinds of images and receives an operation input from a user by detecting a touching operation on the input and output panel 471. The input and output panel 471 is realized by, for example, a touch panel.

The automatic storage necessity and non-necessity selection screen 510 includes an automatic storage necessity and non-necessity selection area 511, a confirmation button 512, and a return button 513.

In the automatic storage necessity and non-necessity selection area 511, radio buttons are displayed so as to select whether a photo (image content) photographed using the wireless communication apparatus 400 is automatically stored in the information processing apparatus 200. Also, when the photo is automatically stored, radio buttons are displayed so as to select whether the photo (image content) stored in the information processing apparatus 200 remains in the memory 440 of the wireless communication apparatus 400. When the photo (image content) stored in the information processing apparatus 200 also remains in the memory 440 of the wireless communication apparatus 400, a radio button on the top side is selected, as shown in FIG. 12.

The confirmation button 512 is a button that is pressed down when a selection operation of selecting necessity or non-necessity of automatic storage in the automatic storage necessity and non-necessity selection area 511 is confirmed after the selection operation is performed.

For example, the return button 513 is a button that is pressed down to return to the immediately previously displayed display screen.

[Communication Example when Image Content Upload Process is Performed]

Figure 13:
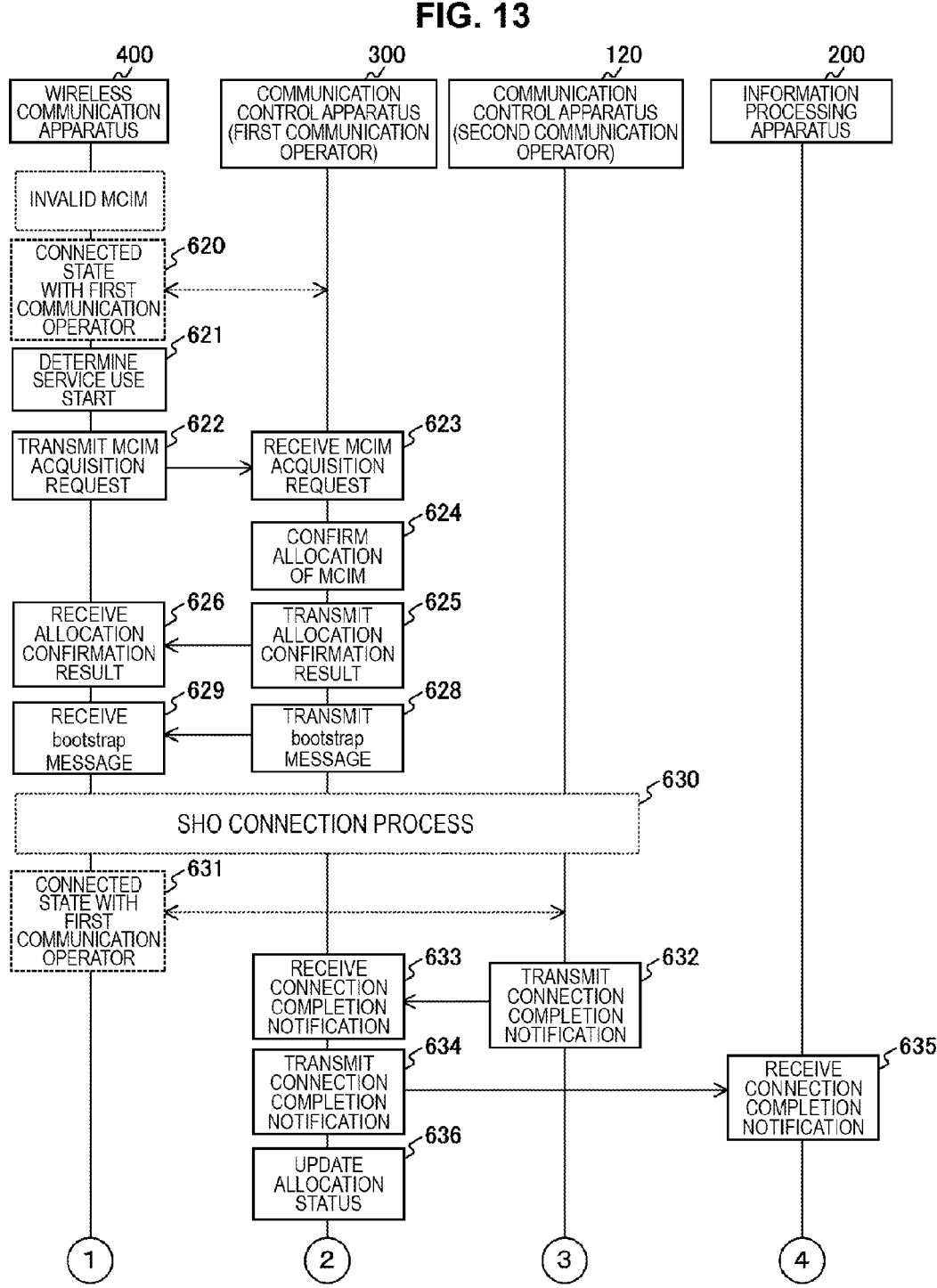
FIG. 13 is a sequence chart illustrating a communication process example among the respective apparatuses included in the communication system 100 according to the first embodiment of the present technology.
Figure 14:
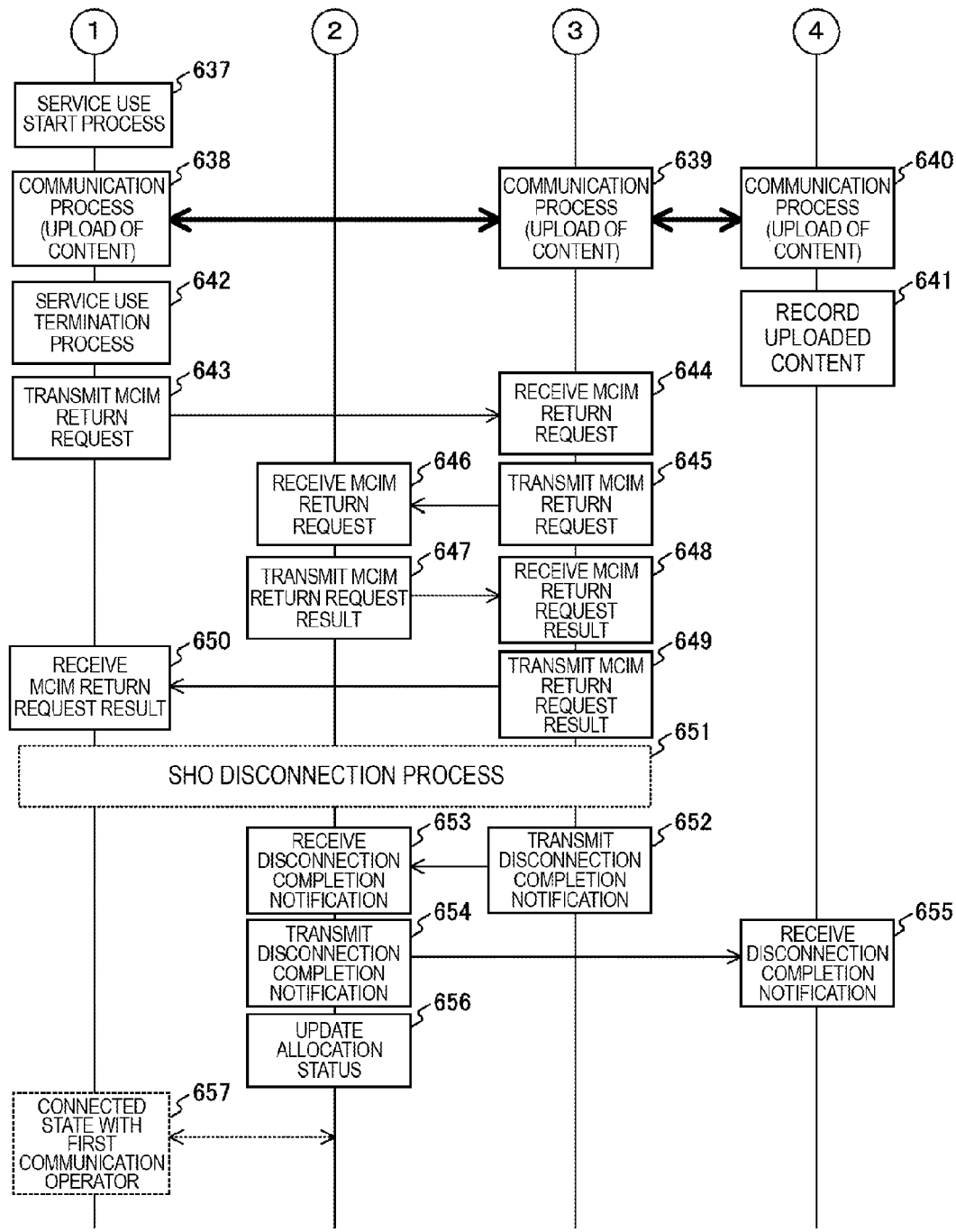
FIG. 14 is a sequence chart illustrating a communication process example among the respective apparatuses included in the communication system 100 according to the first embodiment of the present technology.

FIGS. 13 and 14 are sequence charts illustrating a communication process example among the respective apparatuses included in the communication system 100 according to the first embodiment of the present technology.

In FIGS. 13 and 14, an example in which the wireless communication apparatus 400 connects to the communication control apparatus (second communication operator) 120 using MCIM contracted by the service providing company 50 when the wireless communication apparatus 400 does not hold MCIM (MCIM by user contract) will be described. In FIGS. 13 and 14, the wireless communication apparatus 400 is assumed to be in a connected state (620) with the communication control apparatus (first communication operator) 300. Also, FIGS. 13 and 14 show an example in which an image content upload process is performed when a predetermined condition is satisfied in the wireless communication apparatus 400.

First, the control unit 430 of the wireless communication apparatus 400 determines whether a predetermined condition for starting use of an image content upload service is satisfied (621). For example, this predetermined condition can correspond to, for example, a case in which a free capacity of the memory 440 is equal to or less than a given value or a case in which an instruction to upload image content is given through a user's operation.

Here, whether the free capacity of the memory 440 is equal to or less than the given value is determined, for example, by automatically confirming the free capacity at the time of photography of a photo and using this confirmation result or by automatically activating the wireless communication apparatus 400 at every given interval and confirming the free capacity. Also, a user may manually confirm the free capacity of the memory 440 and give an instruction to upload image content through a manual operation of the user after confirming the free capacity.

When the instruction to upload the image content is given through the user's operation, for example, the intention is recorded in the memory 440 and a predetermined timing (for example, after 1 hour from power-off) at the time of power-off of the wireless communication apparatus 400 is determined to satisfy the predetermined condition.

When the predetermined condition is determined not to be satisfied in the service use start determination (621), the process is terminated without performing subsequent processes.

When the predetermined condition is determined to be satisfied in the service use start determination (621), the control unit 430 of the wireless communication apparatus 400 transmits an MCIM acquisition request to the communication control apparatus (first communication operator) 300 (622 and 623). The MCIM acquisition request is made to acquire MCIM.

Here, the MCIM acquisition request is transmitted based on information (for example, transmission destination information) preinstalled before shipment of the wireless communication apparatus 400. Also, the MCIM acquisition request is transmitted based on information (for example, transmission destination information) granted from the service providing company 50 when the user 60 of the wireless communication apparatus 400 executes an image content storage contract with the service providing company 50. For example, this information is input to the wireless communication apparatus 400 through a manual operation of the user 60. The MCIM acquisition request includes terminal identification information (for example, the terminal identification information 332 shown in FIG. 6) and service identification information (for example, the service identification information 331 shown in FIG. 6). The information is used when the communication control apparatus (first communication operator) 300 confirms allocation of MCIM (624).

When the MCIM acquisition request is received (623), the control unit 320 of the communication control apparatus (first communication operator) 300 confirms whether MCIM can be allocated to the wireless communication apparatus having transmitted the MCIM acquisition request (624).

Specifically, the control unit 320 performs an authentication process by comparing the service identification information 331 and the terminal identification information 332 (shown in FIG. 6) of the device management database 330 with the service identification information and the terminal identification information included in the received MCIM acquisition request (624). Through the authentication process, it is confirmed whether the wireless communication apparatus transmitting the MCIM acquisition request is a legal wireless communication apparatus completing registration.

Subsequently, when the wireless communication apparatus transmitting the MCIM acquisition request is the legal wireless communication apparatus completing the registration, the control unit 320 confirms whether unused MCIM is present (624). Specifically, the control unit 320 confirms whether unused MCIM is present with reference to the contents of the MCIM management database 340 (shown in FIG. 7) (624). For example, the MCIM management database 340 shown in FIG. 7(*a*) indicates a state in which all of the MCIMs are not used. Also, the MCIM management database 340 shown in FIG. 7(*b*) indicates a state in which only one MCIM is used. In such states, since unused MCIM is present, it is determined that MCIM is usable.

That is, when the wireless communication apparatus transmitting the MCIM acquisition request is the legal wireless communication apparatus completing the registration and unused MCIM is present, it is determined that MCIM is usable. Conversely, when the wireless communication apparatus transmitting the MCIM acquisition request does not complete the registration or unused MCIM is not present, it is determined that MCIM is unusable. Also, the confirmation process will be described in detail with reference to FIG. 15.

When it is determined through the confirmation process that MCIM is unusable (624), an allocation confirmation result (failure) indicating that MCIM is unusable is transmitted to the wireless communication apparatus (625 and 626) and the fact that MCIM is unusable is displayed. Then, the process is terminated without performing subsequent processes.

When it is determined through the confirmation process that MCIM is usable (624), the control unit 320 of the communication control apparatus (first communication operator) 300 transmits an allocation confirmation result (success) indicating that MCIM is usable to the wireless communication apparatus 400 (625 and 626). Also, when the allocation confirmation result is received (626), the control unit 430 of the wireless communication apparatus 400 may cause the display unit 470 to display the fact that MCIM is usable.

When it is determined through the confirmation process that MCIM is usable (624), the control unit 320 of the communication control apparatus (first communication operator) 300 transmits a Bootstrap message to the wireless communication apparatus 400 (628 and 629). Here, the Bootstrap message is triggered in order for the wireless communication apparatus to actually start the MCIM acquisition process (for example, see Non-Patent Literature 1 (5.1.3.6.3)).

When the Bootstrap message is received (629), the control unit 430 of the wireless communication apparatus 400 performs a process (SHO connection process) of connecting to the communication control apparatus (second communication operator) 120 (630). In the process (SHO connection process), the wireless communication apparatus 400 acquires MCIM and performs a process of connecting to the communication control apparatus (second communication operator) 120. The SHO connection process will be described in detail with reference to FIG. 16.

After the SHO connection process is completed (630), the control unit 121 of the communication control apparatus (second communication operator) 120 transmits a connection completion notification for notifying of connection of the wireless communication apparatus 400 to the communication control apparatus (first communication operator) 300 (632 and 633). The connection completion notification includes terminal identification information of the wireless communication apparatus (wireless communication apparatus 400) connected to the communication control apparatus (second communication operator) 120.

When the connection completion notification is received (633), the control unit 320 of the communication control apparatus (first communication operator) 300 transmits the connection completion notification to the information processing apparatus 200 (634 and 635). The connection completion notification is a notification indicating that the communication control apparatus (second communication operator) 120 and the wireless communication apparatus 400 are connected and includes terminal identification information of the wireless communication apparatus (wireless communication apparatus 400) connected to the communication control apparatus (second communication operator) 120.

When the connection completion notification is received (633), the control unit 320 of the communication control apparatus (first communication operator) 300 records the fact that MCIM is allocated to the wireless communication apparatus 400 in each database and updates each database (636). That is, the fact that MCIM is allocated to the wireless communication apparatus 400 is recorded and updated in the device management database 330 and the MCIM management database 340 (636). In the device management database 330, for example, the contents of the MCIM allocation information 334 are changed from the state (non-allocation) shown in FIG. 6(*b*) to the state (allocation) shown in FIG. 6(*c*). Also, in the MCIM management database 340, for example, the contents of the terminal identification information 342 are changed from the state shown in FIG. 7(*a*) to the state shown in FIG. 7(*b*).

After the SHO connection process is completed, the wireless communication apparatus 400 enters a connected state (631) with the communication control apparatus (second communication operator) 120. Therefore, the wireless communication apparatus 400 connects to the information processing apparatus 200 via the communication control apparatus (second communication operator) 120 and performs the communication process with the information processing apparatus 200 (638 to 640). That is, the wireless communication apparatus enters a state in which a communication (image content upload) is usable via the network (for example, the Internet) 110 (638 to 640).

In the connected state (631), the wireless communication apparatus 400 performs a service use start process to upload content (image file) stored in the memory 440 to the information processing apparatus 200 via the communication control apparatus (second communication operator) 120 (637). Then, after the wireless communication apparatus 400 is connected to the information processing apparatus 200, the control unit 430 of the wireless communication apparatus 400 performs an image content upload process (638 to 640). For example, as illustrated in FIG. 11, the control unit 430 of the wireless communication apparatus 400 performs control such that the image content 70 recorded in the memory 440 is transmitted to the information processing apparatus 200 and is recorded in the content management database 230 of the information processing apparatus 200 (641).

Here, when a sleep function (for example, a low-power-consumption function) is validly set in the wireless communication apparatus 400, for example, the network connection or interruption of a process is also assumed to be interrupted. Accordingly, to reliably succeed the upload process, for example, setting of invalidation of the sleep function in the wireless communication apparatus 400 may be performed during the upload process.

Subsequently, the control unit 430 of the wireless communication apparatus 400 determines whether the upload of the image content is terminated (642). Whether the upload of the image content is terminated can be determined using any of the following (1) to (4) as a determination condition.

(1) A case in which upload of all of the image content recorded in the memory 440 is completed.

(2) A case in which upload of all of the image content of which a photographing date is prior to a given value (for example, 9 Aug. 2011) among the image content recorded in the memory 440 is completed.

(3) A case in which upload of all of the image content designated by a user is completed. In this case, for example, when the wireless communication apparatus 400 is turned on, a designation operation is assumed to be performed through a manual operation by the user.

(4) A case in which a total number, a sum size, or the like of the image content uploaded to the information processing apparatus 200 reaches an upper limit. For example, a case in which the total number, the sum size, or the like of the image content reaches an upper value stored in the relevant information 246 shown in FIG. 4 can be set. In this case, the upper limit stored in the relevant information 246 may be acquired and determined by the control unit 430 of the wireless communication apparatus 400 or may be determined by a network side.

Here, when "PHOTO STORED IN SERVER DOES NOT REMAIN IN INTERNAL MEMORY" is set on the automatic storage necessity and non-necessity selection screen 510 shown in FIG. 12, the uploaded image content is deleted from the memory 440 after the termination of the image content upload process.

When the upload of the image content is determined to be terminated (642), the wireless communication apparatus 400 performs a service use termination process to terminate the upload process (642).

After the service use termination process (642), the control unit 430 of the wireless communication apparatus 400 transmits an MCIM return request to the communication control apparatus (first communication operator) 300 via the communication control apparatus (second communication operator) 120 (643 to 646). The MCIM return request is made to return MCIM. Also, the MCIM return request includes terminal identification information and service identification information used when an allocation status is updated by the communication control apparatus (first communication operator) 300 (656).

When the MCIM return request is received (646), the control unit 320 of the communication control apparatus (first communication operator) 300 confirms whether an MCIM return process is performed for the wireless communication apparatus having transmitted the MCIM return request.

Specifically, the control unit 320 extracts the wireless communication apparatus of which the information is identical with the service identification information and the terminal identification information included in the received MCIM return request in the device management database 330 (shown in FIG. 6). Then, it is confirmed whether MCIM is allocated to the extracted wireless communication apparatus. That is, when the wireless communication apparatus transmitting the MCIM return request is registered in the device management database 330 and MCIM is allocated, it is determined that the MCIM return process can be performed. Conversely, when the wireless communication apparatus transmitting the MCIM return request is not registered in the device management database 330 or MCIM is not allocated, it is determined that the MCIM return process may not be performed.

When it is determined through the confirmation process that the MCIM return process may not be performed, an MCIM return request result (failure) indicating that the MCIM return process may not be performed is transmitted to the wireless communication apparatus (647 to 650). In this case, the fact that the MCIM return process may not be performed may be displayed. Then, the process is terminated without performing subsequent processes.

When it is determined through the confirmation process that the MCIM return process can be performed, the control unit 320 of the communication control apparatus (first communication operator) 300 transmits an MCIM return request result (success) indicating that the MCIM return process can be performed to the wireless communication apparatus 400 (647 to 650).

When the MCIM return request result is received (650), the control unit 430 of the wireless communication apparatus 400 performs a process (SHO disconnection process) to disconnect the connection with the communication control apparatus (second communication operator) 120 and release MCIM (651). In the process (SHO disconnection process), the wireless communication apparatus 400 performs a process of invalidating MCIM and disconnecting the connection with the communication control apparatus (second communication operator) 120. The SHO disconnection process will be described in detail with reference to FIG. 17.

After the SHO disconnection process is completed (651), the control unit 121 of the communication control apparatus (second communication operator) 120 transmits a disconnection completion notification for notifying that the connection with the wireless communication apparatus 400 is disconnected to the communication control apparatus (first communication operator) 300 (652 and 653). The disconnection completion notification includes terminal identification information of the wireless communication apparatus (wireless communication apparatus 400) of which the connection with the communication control apparatus (second communication operator) 120 is disconnected.

When the disconnection completion notification is received (653), the control unit 320 of the communication control apparatus (first communication operator) 300 transmits the disconnection completion notification to the information processing apparatus 200 (654 and 655). The disconnection completion notification is a notification indicating that the connection between the communication control apparatus (second communication operator) 120 and the wireless communication apparatus 400 is disconnected and includes terminal identification information of the wireless communication apparatus (wireless communication apparatus 400) of which the connection with the communication control apparatus (second communication operator) 120 is disconnected.

When the disconnection completion notification is received (653), the control unit 320 of the communication control apparatus (first communication operator) 300 records the fact that MCIM is released from the wireless communication apparatus 400 for each database and updates each database (656). That is, the fact that MCIM is allocated to the wireless communication apparatus 400 is deleted and updated in the device management database 330 and the MCIM management database 340 (656). In the device management database 330, for example, the contents of the MCIM allocation information 334 are changed from the state (allocation) shown in FIG. 6(*c*) to the state (non-allocation) shown in FIG. 6(*b*). Also, in the MCIM management database 340, for example, the contents of the terminal identification information 342 are changed from the state shown in FIG. 7(*b*) to the state shown in FIG. 7(*a*).

In this way, the wireless communication apparatus 400 returns to the connected state with the communication control apparatus (first communication operator) 300 (657).

Thus, when the communication control apparatus (first communication operator) 300 holds the device management database 330, the wireless communication apparatus 400 can use the service using MCIM of the information processing apparatus 200 by a trigger from the side of the wireless communication apparatus 400.

Here, the communication control apparatus (first communication operator) 300 can determine whether MCIM is usable in order for the communication control apparatus (first communication operator) 300 to hold the device management database 330. Therefore, the transmission (632 and 633) of the connection completion notification from the communication control apparatus (second communication operator) 120 to the communication control apparatus (first communication operator) 300 can be omitted. Also, the transmission (634 and 635) of the connection completion notification from the communication control apparatus (first communication operator) 300 to the information processing apparatus 200 can be omitted. Likewise, the transmission (652 and 653) of the disconnection completion notification from the communication control apparatus (second communication operator) 120 to the communication control apparatus (first communication operator) 300 can also be omitted. Also, the transmission (654 and 655) of the disconnection completion notification from the communication control apparatus (first communication operator) 300 to the information processing apparatus 200 can be omitted.

Thus, when the transmission of the connection completion notification and the transmission of the disconnection completion notification are omitted, it is not necessary for the information processing apparatus 200 to be involved in the processes other than the process of providing an actual service. Therefore, addition of functions to the information processing apparatus 200 can be unnecessary (or minimized).

Thus, in the wireless communication apparatus 400 connectable to the network, for example, image content (image file) can automatically be uploaded to the information processing apparatus 200 when a free capacity of the memory 440 of the wireless communication apparatus 400 is conserved. Also, when the upload is completed and deletion of the uploaded image content (image file) is set, a free capacity of the memory 440 can easily be ensured.

[Operation Example of Communication Control Apparatus]

Figure 15:
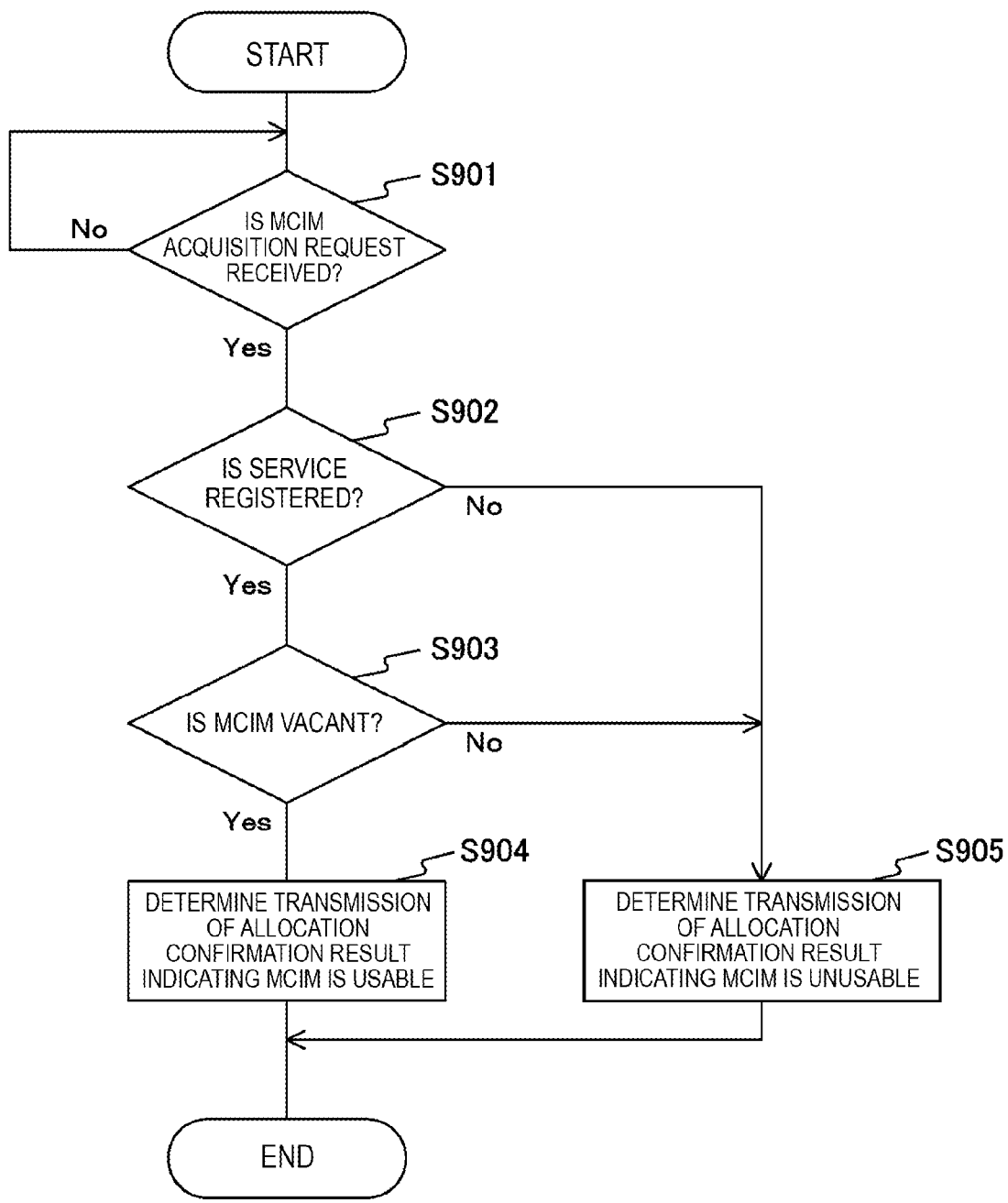
FIG. 15 is a flowchart illustrating an example of a processing order of an MCIM allocation confirming process by the communication control apparatus (first communication operator) 300 according to the first embodiment of the present technology.

FIG. 15 is a flowchart illustrating an example of a processing order of the allocation confirmation process of MCIM by the communication control apparatus (first communication operator) 300 according to the first embodiment of the present technology. Also, the allocation confirmation process is a process corresponding to the MCIM allocation confirmation process (624) shown in FIG. 13.

First, the control unit 320 determines whether MCIM acquisition request is transmitted from the wireless communication apparatus (step S901). When the MCIM acquisition request is not received, monitoring continues to be performed. When the MCIM acquisition request is received (step S901), the control unit 320 confirms whether the wireless communication apparatus transmitting the MCIM acquisition request is the registered legal wireless communication apparatus (step S902). That is, it is determined whether the service is registered for the wireless communication apparatus transmitting the MCIM acquisition request (step S902).

When the service is registered for the wireless communication apparatus transmitting the MCIM acquisition request (step S902), the control unit 320 confirms whether unused MCIM is present (step S903). That is, it is determined whether vacancy of MCIM is present (step S903).

When the vacancy of MCIM is present (step S903), the control unit 320 determines transmission of an allocation confirmation result (success) indicating that MCIM is usable (step S904).

Conversely, when the service is not registered for the wireless communication apparatus transmitting the MCIM acquisition request (step S902) or the vacancy of MCIM is not present (step S903), the control unit 320 determines transmission of an allocation confirmation result (failure) (step S905). Also, steps S902 to S905 are examples of a determination sequence described in the claims.

[Communication Example when SHO Connection Process is Performed]

Figure 16:
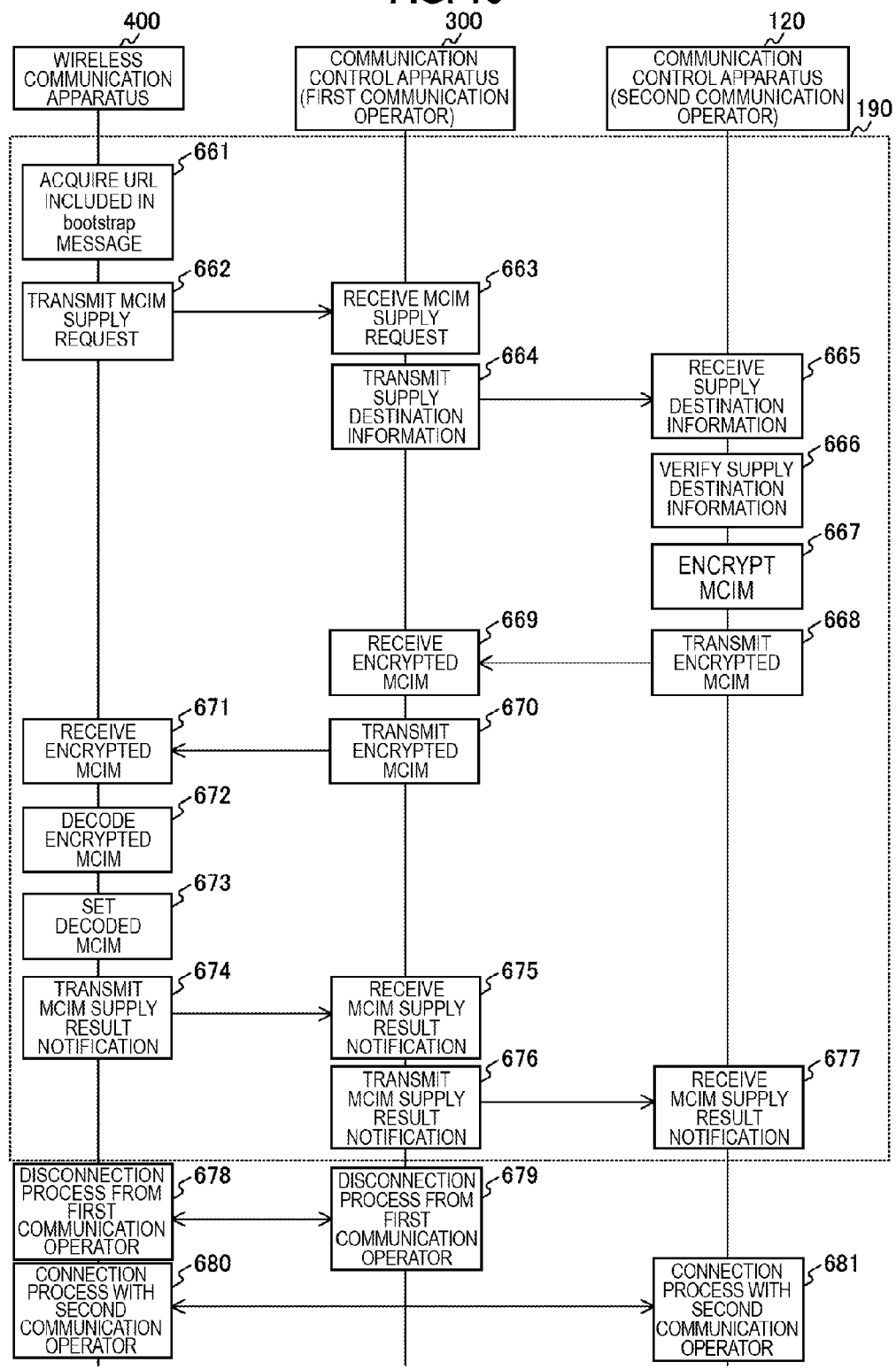
FIG. 16 is a sequence chart illustrating a communication process example among the respective apparatuses included in the communication system 100 according to the first embodiment of the present technology.

FIG. 16 is a sequence chart illustrating a communication process example among the respective apparatuses included in the communication system 100 according to the first embodiment of the present technology. The communication process example shown in FIG. 16 is a process corresponding to the SHO connection process (630) shown in FIG. 13. That is, this process indicates the communication process example when the wireless communication apparatus 400 acquires MCIM and connects to the communication control apparatus (second communication operator) 120. Also, a communication process surrounded by a rectangular dotted line 190 is a process corresponding to Non-Patent Literature 1 (5.1.3.6.3).

The control unit 430 of the wireless communication apparatus 400 receiving the Bootstrap message acquires a URL (Uniform Resource Locator) included in the received Bootstrap message (661). Subsequently, the control unit 430 accesses the communication control apparatus (first communication operator) 300 using the acquired URL and transmits an MCIM supply request (662 and 663). The MCIM supply request is made to set MCIM and includes the terminal identification information of the wireless communication apparatus 400.

When the MCIM supply request is transmitted (663), the control unit 320 of the communication control apparatus (first communication operator) 300 transmits supply destination information to the communication control apparatus (second communication operator) 120 (664 and 665). The supply destination information is, for example, information (for example, terminal identification information) regarding the wireless communication apparatus transmitting the MCIM supply request.

When the supply destination information is received (665), the control unit 121 of the communication control apparatus (second communication operator) 120 verifies the wireless communication apparatus specified by the received supply destination information (666). In this verification, for example, it is verified whether a device is legally justified. For example, it is verified whether a device is a stolen device or is officially registered. When it is determined through this verification that MCIM may not be supplied to the wireless communication apparatus specified by the received supply destination information, a notification indicating that MCIM may not be supplied is transmitted to the communication control apparatus (first communication operator) 300.

Conversely, when it is determined through the verification that MCIM can be supplied to the wireless communication apparatus specified by the received supply destination information (666), the control unit 121 encrypts MCIM to be supplied to the wireless communication apparatus (667). Subsequently, the control unit 121 transmits encrypted MCIM information to the communication control apparatus (first communication operator) 300 (668 and 669).

When the encrypted MCIM information is received (669), the control unit 320 of the communication control apparatus (first communication operator) 300 transmits the encrypted MCIM information to the wireless communication apparatus (wireless communication apparatus 400) having transmitted the MCIM supply request (670 and 671).

When the encrypted MCIM information is received (671), the control unit 430 of the wireless communication apparatus 400 decodes the encrypted MCIM information (672). Subsequently, the control unit 430 sets the decoded MCIM (673). That is, the control unit 430 stores the decoded MCIM in the MCIM information storage unit 450 and enables the decoded MCIM to be usable (provisioning) (673).

Subsequently, the control unit 430 transmits an MCIM supply result notification (provisioning result) to the communication control apparatus (first communication operator) 300 (674 and 675). When the MCIM supply result notification (provisioning result) is received (675), the control unit 320 of the communication control apparatus (first communication operator) 300 transmits an MCIM supply result notification to the communication control apparatus (first communication operator) 300 (676 and 677).

After the decoded MCIM is set (673), the control unit 430 of the wireless communication apparatus 400 performs a disconnection process of disconnecting connection with the communication control apparatus (first communication operator) 300 (678 and 679). At the time of the disconnection process, the wireless communication apparatus 400 may notify the communication control apparatus (first communication operator) 300 of the terminal identification information of the wireless communication apparatus 400.

Subsequently, after the disconnection process between the wireless communication apparatus 400 and the communication control apparatus (first communication operator) 300 is terminated (678 and 679), the control unit 430 of the wireless communication apparatus 400 performs a connection process of establishing connection with the communication control apparatus (second communication operator) 120 (680 and 681). At the time of the connection process, the wireless communication apparatus 400 may notify the communication control apparatus (second communication operator) 120 of the terminal identification information of the wireless communication apparatus 400.

[Communication Example when SHO Disconnection Process is Performed]

Figure 17:
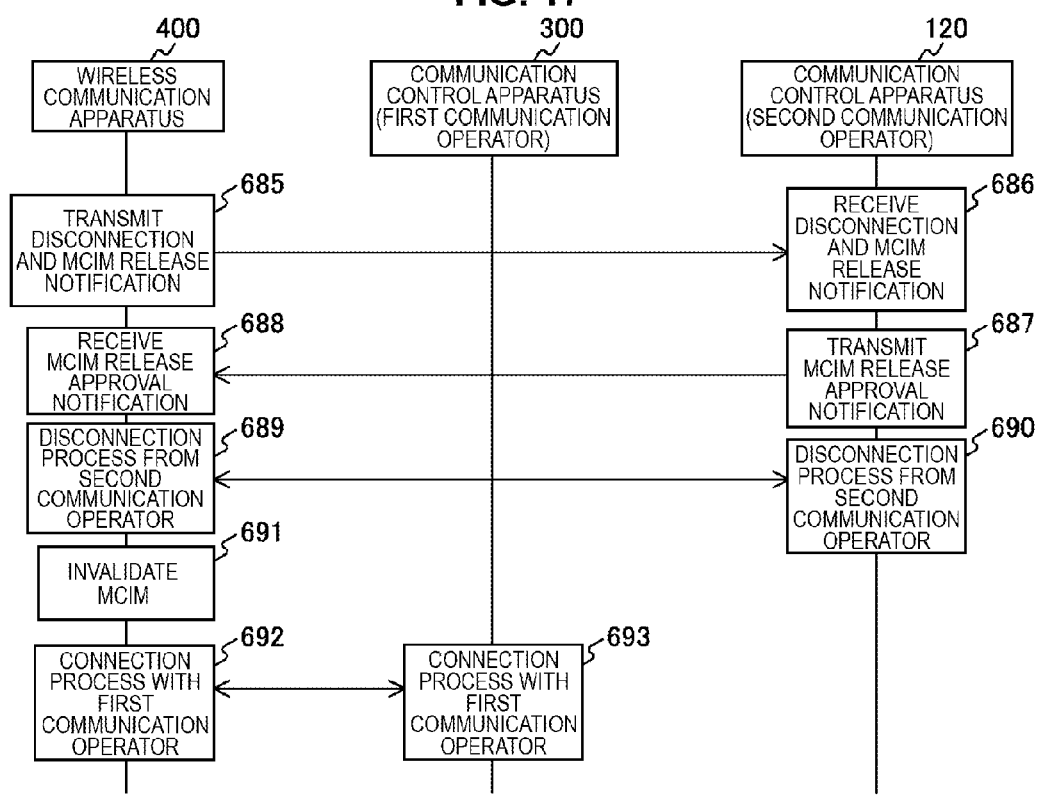
FIG. 17 is a sequence chart illustrating a communication process example among the respective apparatuses included in the communication system 100 according to the first embodiment of the present technology.

FIG. 17 is a sequence chart illustrating a communication process example among the respective apparatuses included in the communication system 100 according to the first embodiment of the present technology. The communication process example shown in FIG. 17 is a process corresponding to the SHO disconnection process (651) shown in FIG. 14. That is, this process indicates a communication process example when the wireless communication apparatus 400 disconnects the connection with the communication control apparatus (second communication operator) 120.

The control unit 430 of the wireless communication apparatus 400 disconnects the connection with the communication control apparatus (second communication operator) 120 and transmits a disconnection and MCIM release notification indicating that the set MCIM is released to the communication control apparatus (second communication operator) 120 (685 and 686). The MCIM supply request includes the terminal identification information of the wireless communication apparatus 400.

When the disconnection and MCIM release notification is received (686), the control unit 121 of the communication control apparatus (second communication operator) 120 transmits an MCIM release approval notification indicating that the release of MCIM is approved to the wireless communication apparatus 400 (687 and 688). Also, the wireless communication apparatus specified by the terminal identification information included in the disconnection and MCIM release notification is also assumed not to be a wireless communication apparatus in which MCIM is set. In this case, the control unit 121 of the communication control apparatus (second communication operator) 120 transmits an MCIM release approval notification indicating that the release of MCIM is not approved to the wireless communication apparatus 400 (687 and 688).

When the MCIM release approval notification is received (688), the control unit 430 of the wireless communication apparatus 400 performs a disconnection process of disconnecting the connection with the communication control apparatus (second communication operator) 120 (689 and 690). At the time of the disconnection process, the wireless communication apparatus 400 may notify the communication control apparatus (second communication operator) 120 of the terminal identification information of the wireless communication apparatus 400.

Subsequently, the control unit 430 of the wireless communication apparatus 400 performs an invalidation process of invalidating the set MCIM (691). In the invalidation process, MCIM to be invalidated may be continuously held as invalid MCIM or MCIM itself may be deleted.

Subsequently, the control unit 430 of the wireless communication apparatus 400 performs a connection process of establishing connection with the communication control apparatus (first communication operator) 300 (692 and 693). At the time of the connection process, the wireless communication apparatus 400 may notify the communication control apparatus (first communication operator) 300 of the terminal identification information of the wireless communication apparatus 400.

[Instruction Screen Example when Upload Process is Performed Through User's Manual Operation]

Figure 18:
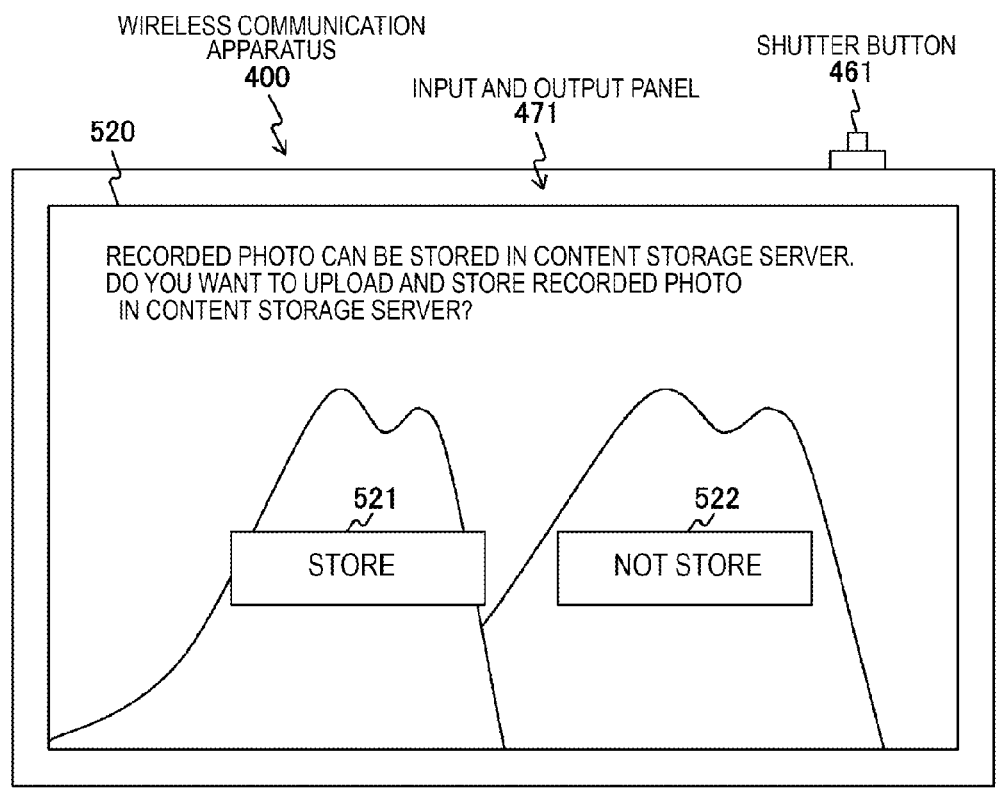
FIG. 18 is a diagram illustrating a display screen example (storage necessity and non-necessity selection screen 520) displayed on the display unit 470 of the wireless communication apparatus 400 according to the first embodiment of the present technology.

FIG. 18 is a diagram illustrating a display screen example (storage necessity and non-necessity selection screen 520) displayed on the display unit 470 of the wireless communication apparatus 400 according to the first embodiment of the present technology.

The storage necessity and non-necessity selection screen 520 is a display screen for selecting whether a photo (image content) photographed using the wireless communication apparatus 400 is stored in the information processing apparatus 200 through a manual operation of the user 60. Also, the storage necessity and non-necessity selection screen 520 is, for example, a display screen (confirmation screen) when an image generated according to a photographing operation (for example, a full push operation of the shutter button 461) is displayed on the display unit 470.

On the storage necessity and non-necessity selection screen 520, a storage button 521 and a non-storage button 522 are provided to overlap an image generated by an imaging unit (not shown).

The storage button 521 and the non-storage button 522 are buttons for instructing the information processing apparatus 200 on whether to store a photo (image content) photographed using the wireless communication apparatus 400.

For example, when the storage button 521 is pressed down on the storage necessity and non-necessity selection screen 520, an MCIM acquisition request is transmitted from the wireless communication apparatus 400 to the communication control apparatus (first communication operator) 300 (622 and 623 shown in FIG. 13). Also, when the non-storage button 522 is pressed down on the storage necessity and non-necessity selection screen 520, processes related to the image content upload process are not performed.

Thus, whenever a predetermined event (for example, photographing or power-off) occurs, necessity and non-necessity of upload may be determined through a user's operation.

[Operation Example of Wireless Communication Apparatus]

Figure 19:
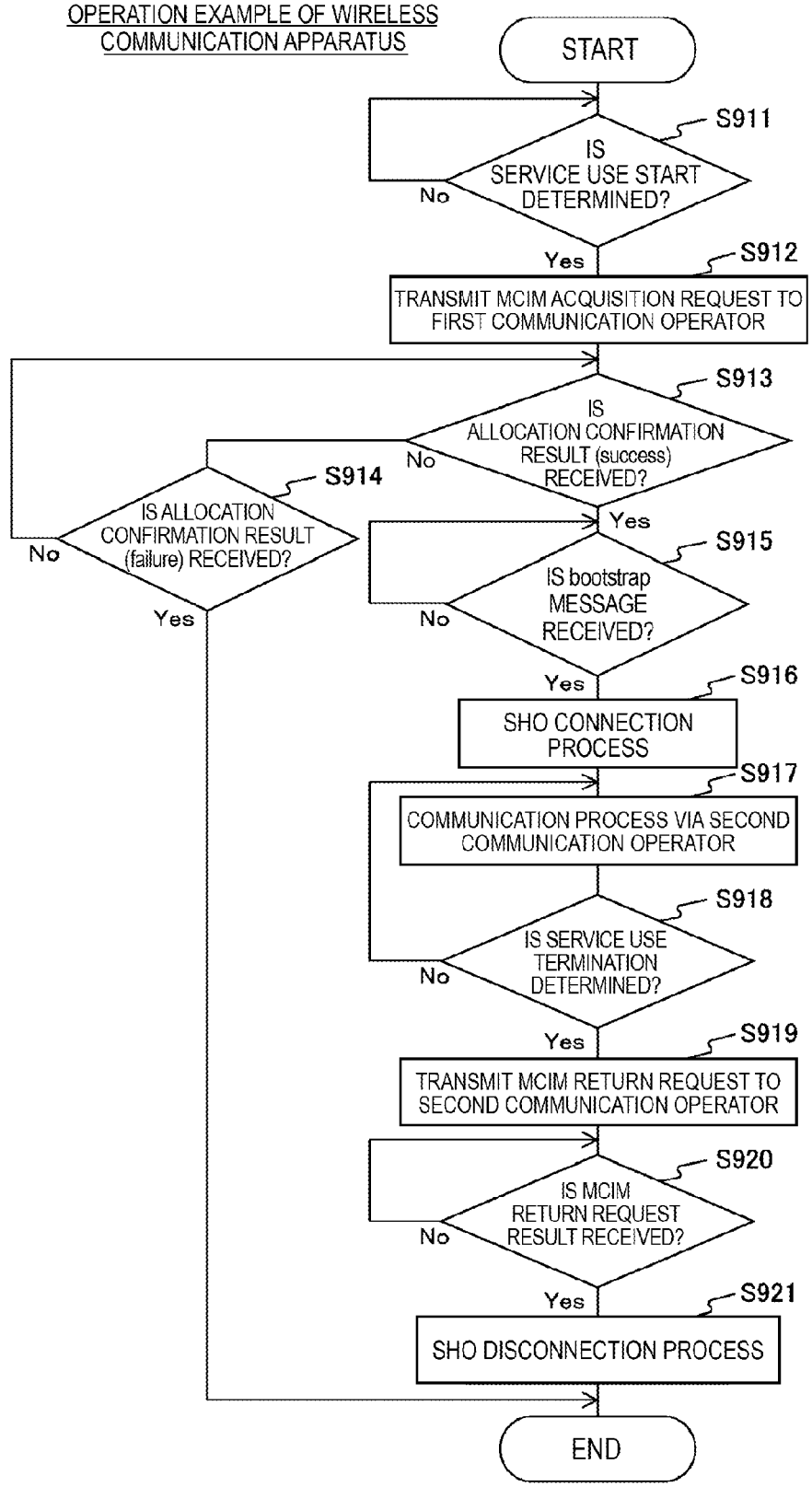
FIG. 19 is a flowchart illustrating an example of a processing order of a communication process by the wireless communication apparatus 400 according to the first embodiment of the present technology.

FIG. 19 is a flowchart illustrating an example of a processing order of a communication process performed by the wireless communication apparatus 400 according to the first embodiment of the present technology. An example in which an image content upload process is performed in the processing order when a predetermined condition is satisfied in the wireless communication apparatus 400 will be described.

First, the control unit 430 determines whether a predetermined condition for starting use of an image content upload service is satisfied (step S911). That is, a service use start determination is performed. When it is determined in the service use start determination that the predetermined condition is not satisfied (step S911), monitoring continues to be performed. Also, step S911 is an example of a determination sequence described in the claims.

When it is determined in the service use start determination that the predetermined condition is satisfied (step S911), the control unit 430 transmits an MCIM acquisition request to the communication control apparatus (first communication operator) 300 (step S912).

Subsequently, the control unit 430 determines whether an allocation confirmation result (success) is received from the communication control apparatus (first communication operator) 300 (step S913). Then, when the allocation confirmation result (success) is not received (step S913), it is determined whether an allocation confirmation result (failure) is received (step S914). When the allocation confirmation result (failure) is not received (step S914), the process returns to step S913. Conversely, when the allocation confirmation result (failure) is received (step S914), the operation of the communication process is terminated.

Conversely, when the allocation confirmation result (success) is received (step S913), the control unit 430 determines whether a Bootstrap message is received from the communication control apparatus (first communication operator) 300 (step S915). When the Bootstrap message is not received (step S915), the monitoring continues to be performed.

When the Bootstrap message is received (step S915), the control unit 430 performs a process (SHO connection process) of connecting to the communication control apparatus (second communication operator) 120 (step S916).

Then, after the wireless communication apparatus 400 is connected to the information processing apparatus 200, the control unit 430 performs a communication process via the communication control apparatus (second communication operator) 120 (step S917). Subsequently, the control unit 430 determines whether the communication process is terminated (step S918). That is, service use termination is determined (step S918). When the communication process is not terminated (step S918), the process returns to step S917.

When the communication process is terminated (step S918), the control unit 430 transmits an MCIM return request to the communication control apparatus (first communication operator) 300 via the communication control apparatus (second communication operator) 120 (step S919).

Subsequently, the control unit 430 determines whether an MCIM return request result is received (step S920). When the MCIM return request result is not received, the monitoring continues to be performed. Conversely, when the MCIM return request result is received (step S920), the control unit 430 disconnects the connection with the communication control apparatus (second communication operator) 120 and performs a process (SHO disconnection process) of release MCIM (step S921). In this way, the wireless communication apparatus 400 returns to the connection state with the communication control apparatus (first communication operator) 300. Also, steps S912 to S921 are examples of a control sequence described in the claims.

Thus, when the side of the communication control apparatus (first communication operator) 300 holds the device management database, the wireless communication apparatus 400 can use the service using MCIM of the service providing company 50 by a trigger from the side of the wireless communication apparatus 400.

The user of the wireless communication apparatus 400 can receive a desired service at a desired timing by a trigger from the side of the wireless communication apparatus 400.

2. Second Embodiment

In the first embodiment of the present technology, the example in which the upload process is performed based on the determination on the side of the wireless communication apparatus (for example, an imaging apparatus) has been described. Here, a case in which a user purchases a periodical (content) such as a magazine using a smartphone or an electronic book display apparatus is assumed. In this case, an online service selling electronic books periodically delivers new content to the information processing apparatus (a smartphone or an electronic book display apparatus) of the user having purchased the periodical (content). In such an online service, acquisition of MCIM and connection with SHO may be performed based on determination on a service provider side.

Accordingly, in a second embodiment of the present technology, an example in which various kinds of services are provided by performing acquisition of MCIM and connection with SHO based on determination of a service providing side will be described. Also, the configuration of a communication system according to the second embodiment of the present technology is substantially the same as that of the first embodiment of the present technology. Therefore, the same reference numerals are given to common constituents to those of the first embodiment of the present technology, and the description thereof will be partially omitted.

[Use Example of Wireless Communication Apparatus]

Figure 20:
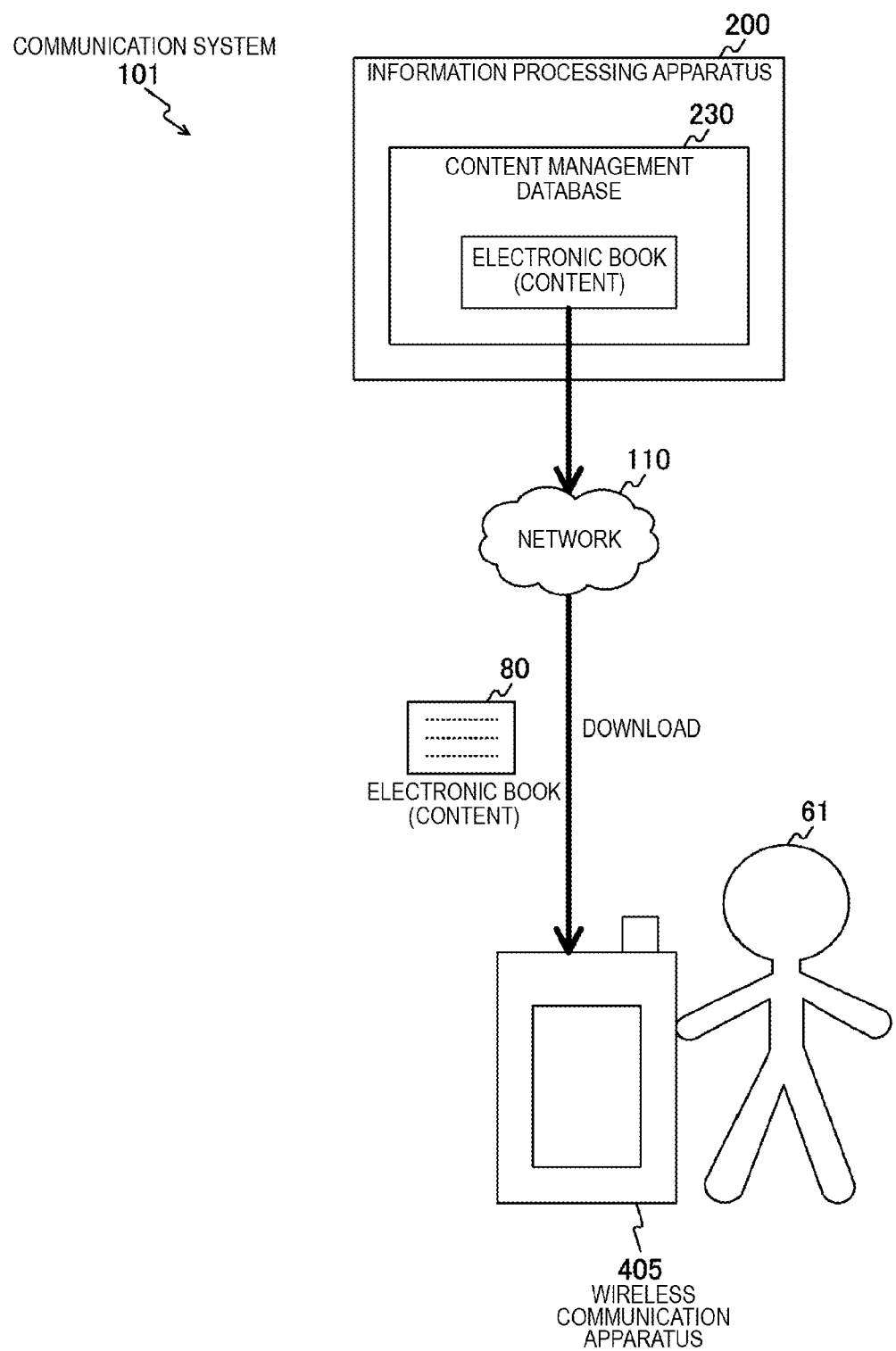
FIG. 20 is a diagram simply illustrating a use example of a wireless communication apparatus 405 according to the first embodiment of the present technology.

FIG. 20 is a diagram simply illustrating a use example of a wireless communication apparatus 405 according to the first embodiment of the present technology.

In FIG. 20, a case in which a wireless communication apparatus 405 is an electronic book display apparatus (for example, a portable display apparatus) having a wireless communication function and is able to use a software downloadable SIM is assumed. Also, since the internal configuration of the wireless communication apparatus 405 is substantially the same as that of the wireless communication apparatus 400 shown in FIG. 8, respective units of the wireless communication apparatus 405 are described below using the same reference numerals as in the wireless communication apparatus 400. Also, an information processing apparatus 200 is assumed to be a content server capable of storing various kinds of content (image content, music content, and electronic book content).

Here, an example in which content (for example, an electronic book) stored in a content management database 230 of the information processing apparatus 200 is downloaded to the wireless communication apparatus 405 will be described.

For example, an electronic book which is a download target (delivery target) is assumed to be a periodical (for example, issued at the end of a month) contracted with a service providing company 50 by a user 61 of the wireless communication apparatus 405. In this case, the information processing apparatus 200 is assumed to be set such that an electronic book (content) is automatically delivered to the wireless communication apparatus 405 at a predetermined timing (for example, the end of a month).

Here, for example, when an electronic book (content) 80 is downloaded from the information processing apparatus 200 to the wireless communication apparatus 405 using wireless communication, it is necessary to set valid MCIM in the wireless communication apparatus 405. However, the wireless communication apparatus 405 (for example, a portable display apparatus) is assumed to connect to a network such as the Internet and perform a communication process relatively infrequently. Therefore, it is not necessary for the wireless communication apparatus 405 (for example, a portable display apparatus) to regularly connect to a network such as the Internet. For example, when a periodical contracted with the service providing company 50 is downloaded, the wireless communication apparatus 405 (for example, a portable display apparatus) is assumed to connect to a network such as the Internet.

That is, many devices such as the wireless communication apparatus 405 (for example, a portable display apparatus) are treated in such a manner that the devices are in a limited connection state or a power-off state at normal times and temporarily use the rights of using MCIM when necessary. In this case, for example, when MCIM can be set only in a case in which a process (communication process) of downloading an electronic book (content) to the wireless communication apparatus 405 is performed, the user 61 may not execute the contract of MCIM for the wireless communication apparatus 405.

Accordingly, in the second embodiment of the present technology, an example in which MCIM is set only when a process (communication process) of downloading an electronic book (content) to the wireless communication apparatus 405 is performed will be described.

[Communication Example when Image Content Upload Process is Performed]

Figure 21:
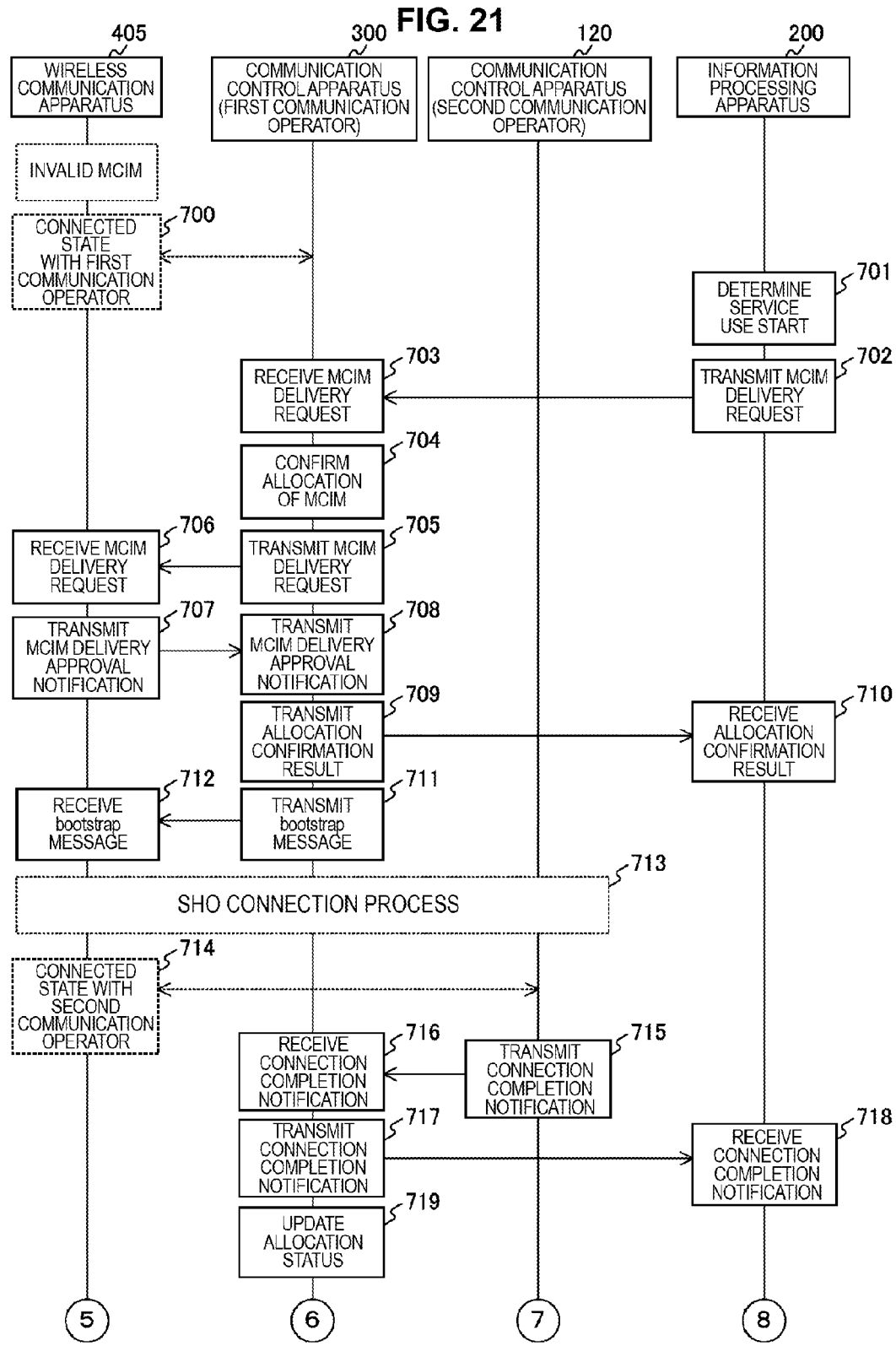
FIG. 21 is a sequence chart showing a communication processing example between respective apparatuses included in the communication system 101 according to the second embodiment of the present technology.
Figure 22:
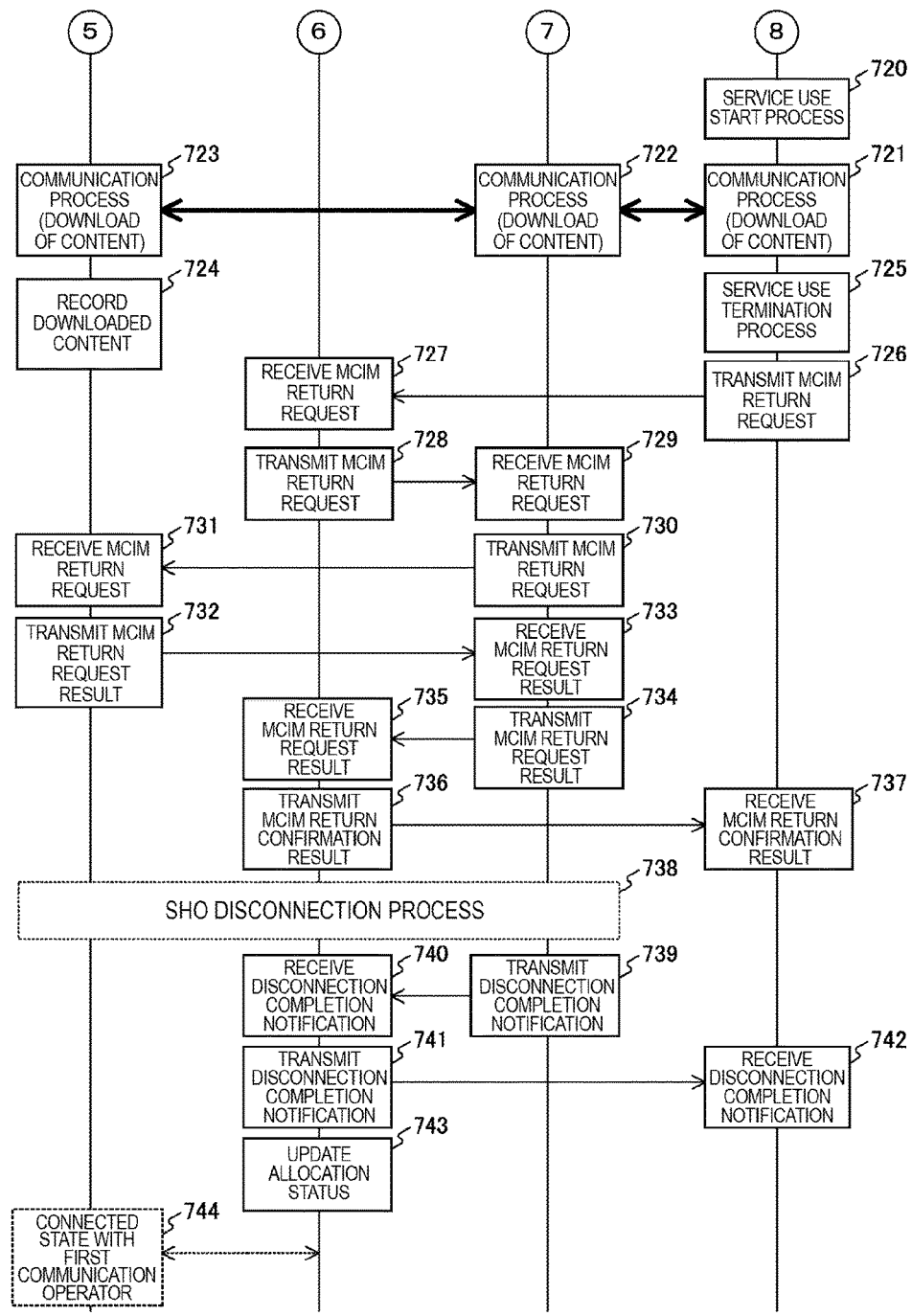
FIG. 22 is a sequence chart showing a communication processing example between respective apparatuses included in the communication system 101 according to the second embodiment of the present technology.

FIGS. 21 and 22 are sequence charts illustrating a communication process example among the respective apparatuses included in a communication system 101 according to the second embodiment of the present technology.

In FIGS. 21 and 22, an example in which the wireless communication apparatus 405 connects to a communication control apparatus (second communication operator) 120 using MCIM contracted by the service providing company 50 when the wireless communication apparatus 405 does not hold MCIM (MCIM by user contract) will be described. In FIGS. 21 and 22, the wireless communication apparatus 405 is assumed to be in a connected state (700) with a communication control apparatus (first communication operator) 300. Also, FIGS. 21 and 22 show an example in which a content download process is performed when a predetermined condition is satisfied in the information processing apparatus 200.

In the second embodiment of the present technology, the user 61 of the wireless communication apparatus 405 is assumed to contract subscription (corresponding to service use registration) of content with the service providing company 50 in advance. Also, as described in the first embodiment of the present technology, the service use registration is assumed to be recorded in the communication control apparatus (first communication operator) 300. Therefore, the communication control apparatus (first communication operator) 300 is assumed to be able to inquire a registered user.

First, a control unit 260 of the information processing apparatus 200 determines whether a predetermined condition for starting use of a content download service is satisfied (701). For example, the predetermined condition can correspond to, for example, a case in which a delivery timing (for example, the end of a month when a download target is a monthly periodical) of content which is a download target arrives. For example, it can be determined whether the predetermined condition is satisfied using the relevant information 246 (for example, delivery at the end of a month) shown in FIG. 4. However, for example, when the number of wireless communication apparatuses of download destinations is large (the number is larger than a given number of MCIMs), the timing at which the predetermined condition is satisfied can be shifted for each wireless communication apparatus in order to shift times at which a download process is performed. Accordingly, the download can be performed sequentially to a plurality of wireless communication apparatuses equal to or greater than the number of MCIMs on the same day (for example, the end of a month), using one MCIM or plurality of MCIMs.

When it is determined in the service use start determination that the predetermined condition is not satisfied (701), the process is terminated without performing subsequent processes.

When it is determined in the service use start determination that the predetermined condition is satisfied (701), the control unit 260 of the information processing apparatus 200 transmits an MCIM delivery request to the communication control apparatus (first communication operator) 300 (702 and 703). The MCIM delivery request is a request made to the communication control apparatus (first communication operator) 300 configured to allocate MCIM to a wireless communication apparatus of a user purchasing content which is a download target. Also, the MCIM delivery request includes terminal identification information of the wireless communication apparatus of a content delivery destination and service identification information of a service related to the content which is a delivery target.

When the MCIM delivery request is received (703), a control unit 320 of the communication control apparatus (first communication operator) 300 confirms whether MCIM can be allocated to the wireless communication apparatus related to the terminal identification information included in the MCIM delivery request (704). Also, since this confirmation process is substantially the same as the confirmation process (624) shown in FIG. 13, the description thereof will be omitted here.

When it is determined through the confirmation process that MCIM is unusable (704), an allocation confirmation result (failure) indicating that MCIM is unusable is transmitted to the information processing apparatus 200. Then, the process is terminated without performing subsequent processes.

Conversely, when it is determined that MCIM is usable (704), the control unit 320 of the communication control apparatus (first communication operator) 300 transmits the MCIM delivery request to the wireless communication apparatus (wireless communication apparatus 405) related to the terminal identification information included in the MCIM delivery request (705 and 706).

When the MCIM delivery request is received (706), a control unit 430 of the wireless communication apparatus 405 transmits an MCIM delivery approval notification (success) as a response to the MCIM delivery request (707 and 708).

Also, when it is determined that MCIM is usable (704), the control unit 320 of the communication control apparatus (first communication operator) 300 transmits an allocation confirmation request (success) as a response to the MCIM delivery request to the information processing apparatus 200 (709 and 710).

Since processes (711 to 719) shown in FIG. 21 correspond to the processes (628 to 636) shown in FIG. 13, respectively, the description thereof will be omitted here.

After the SHO connection process is completed (713), the wireless communication apparatus 405 enters the connected state with the communication control apparatus (second communication operator) 120 (714). Therefore, the wireless communication apparatus 405 connects to the information processing apparatus 200 via the communication control apparatus (second communication operator) 120 and performs a communication process with the information processing apparatus 200 (721 to 723). That is, the wireless communication apparatus enters a state in which a communication service (content download) can be used via a network (for example, the Internet) 110 (721 to 723).

In the connected state (714), the information processing apparatus 200 performs a service use start process (720). For example, the information processing apparatus performs the service use start process of downloading content (for example, an electronic book file) stored in the content management database 230 to the wireless communication apparatus 405 via the communication control apparatus (second communication operator) 120 (720).

Then, after the information processing apparatus 200 connects to the wireless communication apparatus 405, a service providing unit 220 of the information processing apparatus 200 performs a content download process (content delivery process) (721 to 723). For example, as shown in FIG. 20, the service providing unit 220 transmits an electronic book (content) 80 stored in the content management database 230 to the wireless communication apparatus 405 and performs control such that the electronic book is recorded in the memory 440 of the wireless communication apparatus 405 (724).

Here, when a sleep function (for example, a low-power-consumption function) is validly set in the wireless communication apparatus 405, for example, the network connection is also assumed to be disconnected or the process is also assumed to be interrupted. Accordingly, for the download process to reliably succeed, for example, setting of invalidation of the sleep function in the wireless communication apparatus 405 may be performed during the download process.

Subsequently, the control unit 260 of the information processing apparatus 200 determines whether upload of the electronic book (content) is terminated (725). Whether the upload of the electronic book (content) is terminated can be determined using any of the following (1) to (3) as a determination condition.

(1) A case in which download (delivery) of all of the electronic books (content) which are download targets (delivery targets) is completed.

(2) A case in which download (delivery) of an electronic book (content) which is a download target (delivery target) is disabled. For example, since a free capacity of the memory 440 of the wireless communication apparatus 405 is assumed to be less than the size of an electronic book (content) which is a download target (delivery target), the download (delivery) is assumed to be disapproved.

(3) A case in which a user of the wireless communication apparatus 405 gives an instruction to interrupt the download (delivery).

Also, when the control unit 260 determines that the upload of image content is terminated (725), the control unit 260 of the information processing apparatus 200 performs a service use termination process of terminating the download process (725).

After the service use termination process (725), the control unit 260 of the information processing apparatus 200 transmits an MCIM return request to the communication control apparatus (first communication operator) 300 (726 and 727). The MCIM return request is a request for returning MCIM that has been allocated to the wireless communication apparatus 405. Also, the MCIM return request includes the terminal identification information of the wireless communication apparatus of a return source and service identification information of the service received by the wireless communication apparatus of the return source.

When the MCIM return request is received (727), the control unit 320 of the communication control apparatus (first communication operator) 300 confirms whether an MCIM return process is performed for the wireless communication apparatus having transmitted the MCIM return request. Since the confirmation process is the same as the process shown in FIG. 14, the description thereof will be omitted here.

Then, when it is determined through the confirmation process that the MCIM return process is not possible, an MCIM return request result (failure) indicating that the MCIM return process is disapproved is transmitted to the information processing apparatus 200. In this case, the process is terminated without performing subsequent processes.

When it is determined through the confirmation process that the MCIM return process is possible, the control unit 320 of the communication control apparatus (first communication operator) 300 transmits the MCIM return request to the wireless communication apparatus 405 via the communication control apparatus (second communication operator) 120 (728 to 731). The MCIM return request includes the terminal identification information of the wireless communication apparatus of the return source and the service identification information of the service received by the wireless communication apparatus of the return source.

When the MCIM return request is received (731), the control unit 430 of the wireless communication apparatus 405 transmits an MCIM return request result (success) as a response to the MCIM return request to the communication control apparatus (first communication operator) 300 (732 to 735). The MCIM return request result (success) is transmitted via the communication control apparatus (second communication operator) 120 (732 to 735).

Also, when it is determined that the MCIM return process is possible, the control unit 320 of the communication control apparatus (first communication operator) 300 transmits the MCIM return request result (success) indicating that the MCIM return process is possible as a response to the MCIM return request to the information processing apparatus 200 (736 and 737).

Since processes (738 to 744) shown in FIG. 22 correspond to the processes (651 to 657) shown in FIG. 14, the description thereof will be omitted here. Also, when the download process is terminated (724), the fact that the download process is terminated may be displayed on the wireless communication apparatus 405.

[Operation Example of Information Processing Apparatus]

Figure 23:
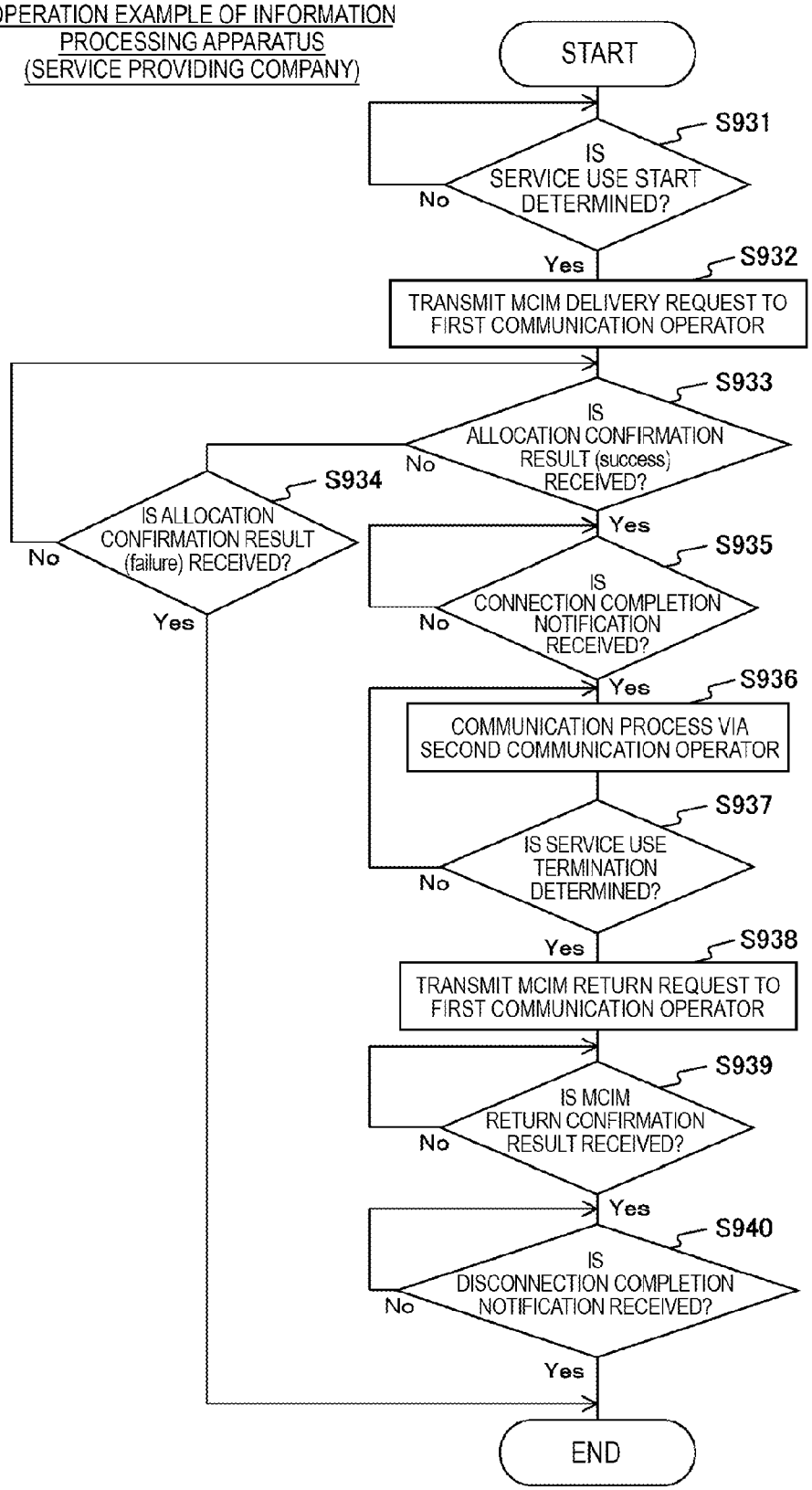
FIG. 23 is a flow chart showing an example of the processing procedure for communication processing by the information processing apparatus 200 according to the second embodiment of the present technology.

FIG. 23 is a flowchart illustrating an example of a processing order of a communication process performed by the information processing apparatus 200 according to the second embodiment of the present technology. The processing order indicates an example in which the information processing apparatus 200 performs a content download process when a predetermined condition is satisfied.

First, the control unit 260 determines whether a predetermined condition for starting use of a content download service is satisfied (step S931). That is, service use start determination is performed (step S931). When it is determined in the service use start determination that the predetermined condition is not satisfied (step S931), monitoring continues to be performed.

Conversely, when the control unit 260 determines that the predetermined condition is satisfied in the service use start determination (step S931), the control unit 260 transmits an MCIM delivery request to the communication control apparatus (first communication operator) 300 (step S932).

Subsequently, the control unit 260 determines whether an allocation confirmation result (success) is received from the communication control apparatus (first communication operator) 300 (step S933). Then, when the allocation confirmation result is not received (step S933), it is determined whether an allocation confirmation result (failure) is received (step S934). When the allocation confirmation result (failure) is not received (step S934), the process returns to step S933. Conversely, when the allocation confirmation result (failure) is received (step S934), the operation of the communication process is terminated.

Conversely, when the allocation confirmation result (success) is received (step S933), the control unit 260 determines whether a connection completion notification is received from the communication control apparatus (first communication operator) 300 (step S935). Then, when the connection completion notification is not received (step S935), the monitoring continues to be performed. Conversely, when the connection completion notification is received (step S935), the wireless communication apparatus 405 is connected to the information processing apparatus 200, and therefore the control unit 260 performs the communication process via the communication control apparatus (second communication operator) 120 (step S936).

Subsequently, the control unit 260 determines whether the communication process is terminated (step S937). That is, service use termination is determined (step S937). When the communication process is not terminated (step S937), the process returns to step S936.

Conversely, when the communication process is terminated (step S937), the control unit 260 transmits an MCIM return request to the communication control apparatus (first communication operator) 300 via the communication control apparatus (second communication operator) 120 (step S938).

Subsequently, the control unit 260 determines whether an MCIM return confirmation result is received (step S939). When the MCIM return confirmation result is not received, the monitoring continues to be performed. Conversely, when the MCIM return confirmation result is received (step S939), the control unit 260 determines whether a disconnection completion notification is received (step S940). When the disconnection completion notification is not received, the monitoring continues to be performed. Conversely, when the disconnection completion notification is received (step S940), the operation of the communication process is terminated.

Thus, when the side of the communication control apparatus (first communication operator) 300 holds the device management database, the wireless communication apparatus 405 can use the service using MCIM of the service providing company 50 by a trigger from the side of the service providing company 50.

The user of the wireless communication apparatus 405 can receive the delivery of new content without operating the wireless communication apparatus 405 by a trigger from the side of the service providing company 50.

3. Third Embodiment

In the first and second embodiments of the present technology, the examples in which the side of the RO holds the device management database have been described. However, a service provider side may hold the device management database.

Accordingly, in a third embodiment of the present technology, an example in which a service provider side holds a device management database will be described. The configuration of a communication system in the third embodiment of the present technology is substantially the same as that in the first embodiment of the present technology. Therefore, the same reference numerals are given to common constituents to those of the first embodiment of the present technology, and the description thereof will be partially omitted.

[Configuration Example of Information Processing Apparatus]

Figure 24:
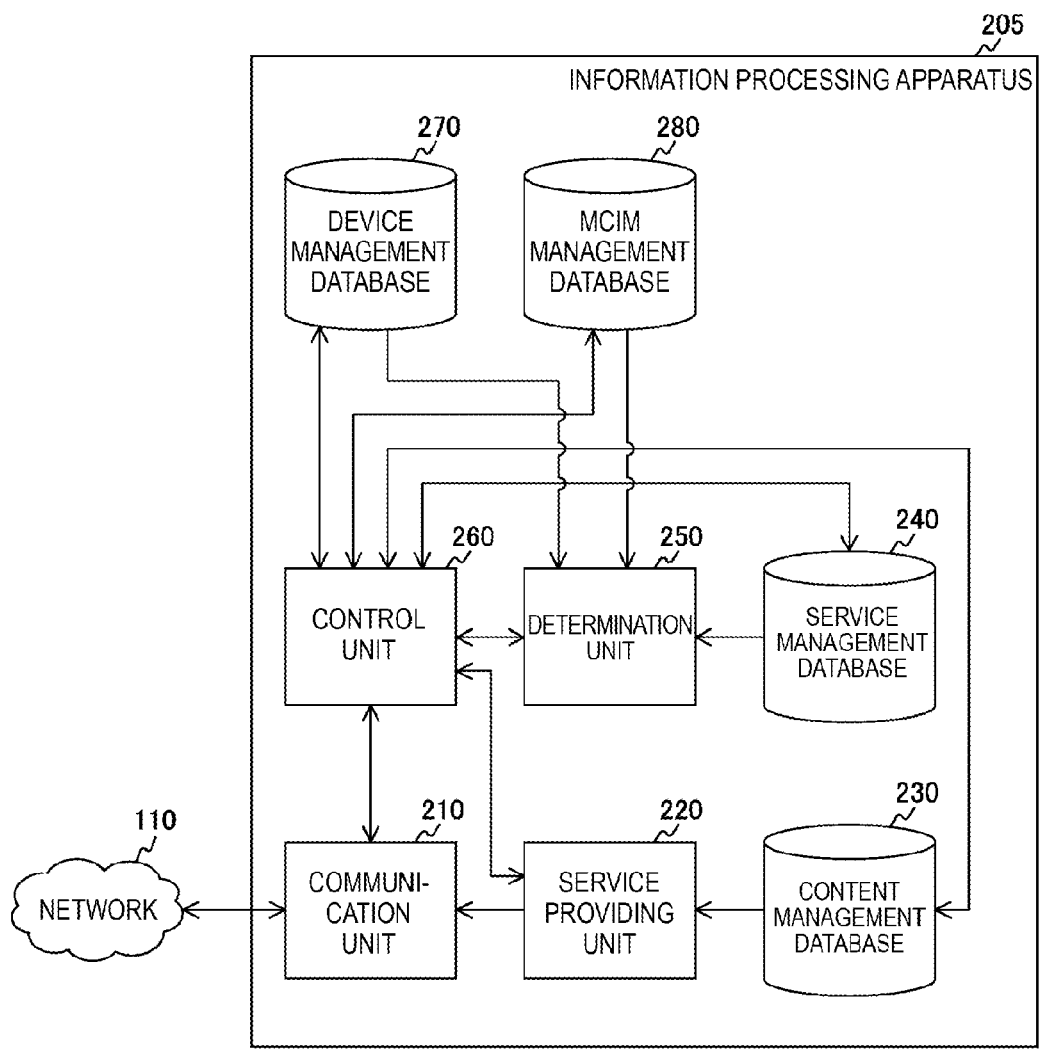
FIG. 24 is a block diagram illustrating a functional configuration example of an information processing apparatus 205 according to a third embodiment of the present technology.

FIG. 24 is a block diagram illustrating a functional configuration example of an information processing apparatus 205 according to the third embodiment of the present technology. Also, the information processing apparatus 205 is a modified example of the information processing apparatus 200 shown in FIG. 3. Therefore, the same names are given to common constituents to those of the information processing apparatus 200 and the description thereof will be partially omitted.

The information processing apparatus 205 includes a device management database 270 and an MCIM management database 280.

The device management database 270 is a database that stores various kinds of information to manage each wireless communication apparatus (device) connected via the network 110. Also, the device management database 270 corresponds to the device management database 330 shown in FIGS. 5 and 6 and its contents are common. Therefore, the detailed description will be omitted here. Also, the device management database may be included in at least one of the communication control apparatus (first communication operator) 300 and the information processing apparatus 205 or may be included in both thereof. However, when the device management database is included in both of the communication control apparatus and the information processing apparatus, registered data may be synchronized.

The MCIM management database 280 is a database that stores various kinds of information to manage MCIM set in each wireless communication apparatus (device) connected via the network 110. Also, the MCIM management database 280 corresponds to the MCIM management database 340 shown in FIGS. 5 and 7 and its contents are common. Therefore, the detailed description will be omitted here.

For example, a determination unit 250 determines that a predetermined condition is satisfied when a wireless communication apparatus 400 is registered in the device management database 270 to receive a specific service. Specifically, the determination unit 250 determines whether the predetermined condition is satisfied based on the device management database 270 that manages the registered wireless communication apparatus and a use status of a connection right (rights of using MCIM) by the wireless communication apparatus for each wireless communication apparatus. Also, the determination unit 250 determines that the predetermined condition is not satisfied when all of the connection rights are used among a given number of connection rights ensured by the service providing company 50.

For example, when a predetermined operation (for example, an operation of purchasing a periodical) is received in the wireless communication apparatus 400 or a predetermined timing (for example, the end of a month) arrives, the determination unit 250 determines that the predetermined condition is satisfied.

For example, when the connection right is set in the wireless communication apparatus 400 and the connection right is released from the wireless communication apparatus 400 in which the connection right is set, the control unit 260 updates a use status related to the wireless communication apparatus 400 in the device management database 270.

For example, when a predetermined condition is satisfied, the control unit 260 sets the connection right (rights of using MCIM) in the wireless communication apparatus 400 and performs control such that the wireless communication apparatus 400 connects to the network 110 based on the connection right to perform a communication process with the information processing apparatus 205. Specifically, the control unit 260 performs a setting request (MCIM acquisition request) made to set the connection right in the wireless communication apparatus 400 to the communication control apparatus (first communication operator) 300. Then, the control unit 260 performs control such that the communication process is performed with the wireless communication apparatus 400 after the wireless communication apparatus 400 connects to the network 110 based on the connection right set in the wireless communication apparatus 400 by the communication control apparatus (second communication operator) 120 in response to the setting request.

[Communication Example when Device Management Database is Registered with Service Providing Company]

Figure 25:
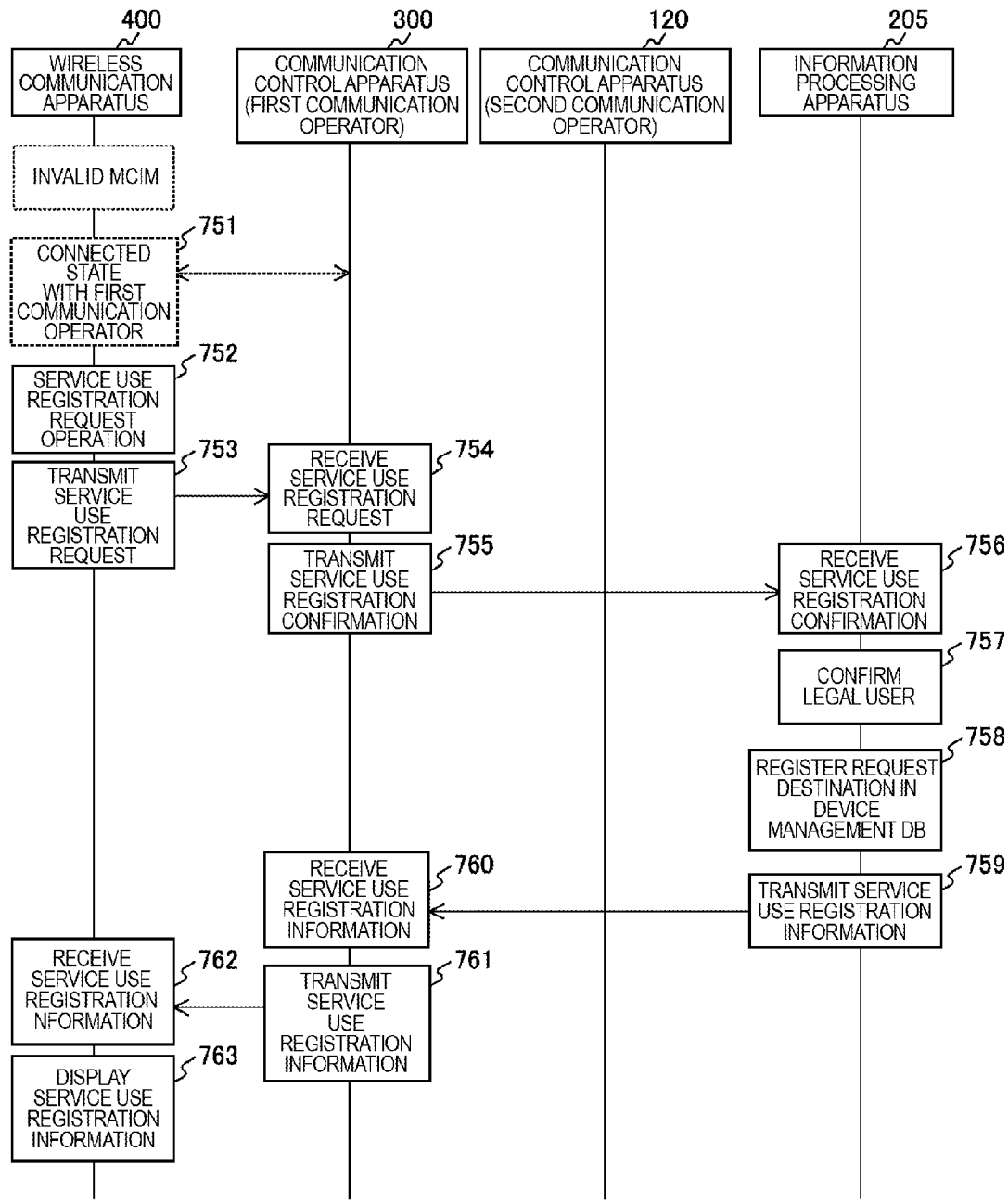
FIG. 25 is a sequence chart illustrating a communication process example among respective apparatuses included in a communication system 100 according to the third embodiment of the present technology.

FIG. 25 is a sequence chart illustrating a communication process example among the respective apparatuses included in the communication system 100 according to the third embodiment of the present technology.

In FIG. 25, an example in which a service contracted between a user of the wireless communication apparatus 400 and the service providing company 50 is registered (initially registered) in the information processing apparatus 205 when the wireless communication apparatus 400 does not hold MCIM will be described. Also, in FIG. 25, the wireless communication apparatus 400 is assumed to be in a connected state (751) with the communication control apparatus (first communication operator) 300. Also, FIG. 25 shows a communication process example when registration information regarding a service (for example, an image content storage service) contracted with the service providing company 50 is registered in the information processing apparatus 205 by operating the wireless communication apparatus 400.

First, a log-in request is made from the wireless communication apparatus 400 to the communication control apparatus (first communication operator) 300 through a user's operation (752). Specifically, the display unit 470 of the wireless communication apparatus 400 is caused to display a display screen for registering the registration information regarding a service (for example, an image content storage service) contracted with the service providing company 50 in the information processing apparatus 205. For example, the registration operation screen 500 (here, a screen in which each input area is blank) shown in FIG. 9 is displayed on the display unit 470 of the wireless communication apparatus 400.

Here, on the registration operation screen 500 shown in FIG. 9, the ID and the password of the service contracted by the user of the wireless communication apparatus 400 are input into the service ID input area 501 and the service password input area 502, respectively (752). After the input operation is performed, the confirmation button 503 is pressed down (752).

Thus, when a service use registration operation is received (752), a service use registration request corresponding to the service use registration operation is transmitted from the wireless communication apparatus 400 to the communication control apparatus (first communication operator) 300 (753 and 754). Since the wireless communication apparatus 400 is in the connected state (751) with the communication control apparatus (first communication operator) 300, as described above, the service use registration request is directly transmitted from the wireless communication apparatus 400 to the communication control apparatus (first communication operator) 300 (753 and 754).

Here, the service use registration request includes information input on the registration operation screen 500 and the terminal identification information of the wireless communication apparatus performing the service use registration request. Information input on the registration operation screen 500 is, for example, the ID and the password of the service.

When the service use registration request is received (754), the control unit 320 of the communication control apparatus (first communication operator) 300 transmits a message of the service use registration confirmation to the information processing apparatus 205 (755 and 756). The service use registration confirmation is a message for confirming whether the wireless communication apparatus transmitting the service use registration request is the wireless communication apparatus of a legal user. Also, the service use registration confirmation includes information (for example, the ID and the password of the service and the terminal identification information of the wireless communication apparatus) included in the received service use registration request.

When the message of the service use registration confirmation is received (756), the control unit 260 of the information processing apparatus 205 performs a confirmation process of confirming whether the wireless communication apparatus related to the terminal identification information included in the service use registration confirmation is a wireless communication apparatus related to possession by the legal user (757). Since the confirmation process is the same as the confirmation process (607) shown in FIG. 10, the description thereof will be omitted here.

Here, when the wireless communication apparatus transmitting the service use registration request is not a wireless communication apparatus related to possession by the legal user, a confirmation result information (failure notification) indicating confirmation failure is transmitted to the communication control apparatus (first communication operator) 300. In this case, the control unit 320 of the communication control apparatus (first communication operator) 300 notifies the wireless communication apparatus (wireless communication apparatus 400) having transmitted the service use registration request that the service use registration may not be performed, as a response to the service use registration request.

Conversely, when the wireless communication apparatus transmitting the service use registration request is a wireless communication apparatus related to possession by the legal user, the control unit 260 of the information processing apparatus 205 performs a registration process of registering the wireless communication apparatus transmitting the service use registration request in the device management database 270 (758). For example, the contents of the device management database 270 are changed, as in the change shown in FIGS. 6(*a*) and 6(*b*).

Subsequently, the control unit 260 of the information processing apparatus 205 transmits service use registration information indicating that the service use registration is completed to the control unit 320 of the communication control apparatus (first communication operator) 300 (759 and 760). Subsequently, the control unit 320 of the communication control apparatus (first communication operator) 300 transmits the service use registration information indicating that the service use registration is completed to the wireless communication apparatus having transmitted the service use registration request (761 and 762).

When the wireless communication apparatus 400 receives the service use registration information (762), the service use registration information is displayed on the display unit 470 of the wireless communication apparatus 400 (763). For example, in response to the service use registration request, a registration result notification screen for notifying of the completion of the service use registration is displayed as the service use registration information (763).

By performing the registration process in this way, the wireless communication apparatus 400 is registered in the device management database 270 held by the information processing apparatus 205. Therefore, in the wireless communication apparatus 400, the use of MCIM is admitted.

[Communication Example when Image Content Upload Process is Performed]

Figure 26:
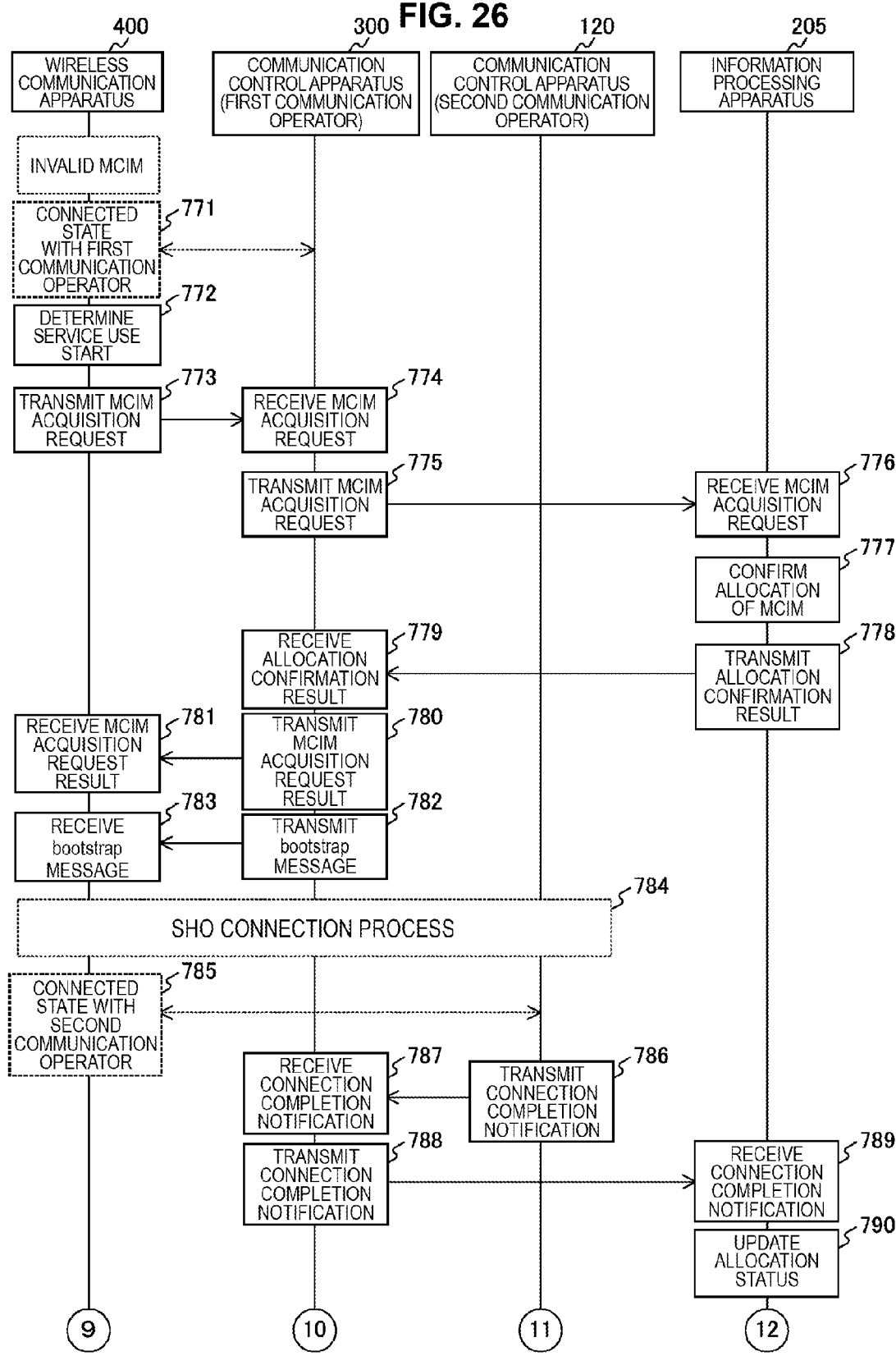
FIG. 26 is a sequence chart illustrating a communication process example among the respective apparatuses included in the communication system 100 according to the third embodiment of the present technology.
Figure 27:
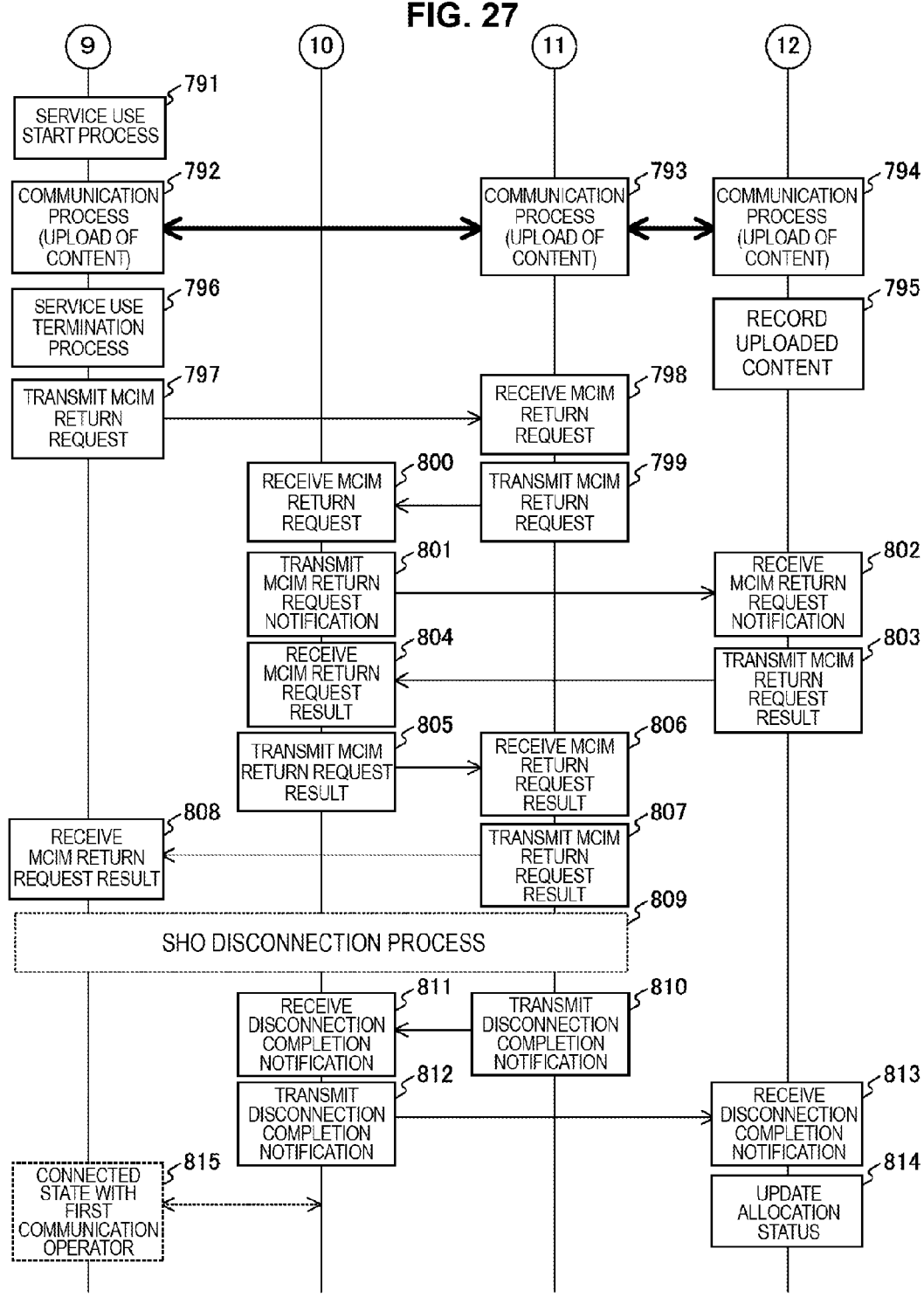
FIG. 27 is a sequence chart illustrating a communication process example among the respective apparatuses included in the communication system 100 according to the third embodiment of the present technology.

FIGS. 26 and 27 are sequence charts illustrating a communication process example among the respective apparatuses included in the communication system 100 according to the third embodiment of the present technology. Also, since the sequence charts shown in FIGS. 26 and 27 are modified examples of FIGS. 13 and 14, the description of the common portions to those of FIGS. 13 and 14 will be partially omitted. Also, in FIGS. 26 and 27, an example in which a service provider side holds the device management database will be described.

Since processes (772 to 774) shown in FIG. 26 correspond to the processes (621 to 623) shown in FIG. 13, the description thereof will be omitted here.

When the MCIM acquisition request is received (774), the control unit 320 of the communication control apparatus (first communication operator) 300 transmits an MCIM acquisition request notification for notifying of the transmission of the MCIM acquisition request to the information processing apparatus 205 (775 and 776). The MCIM acquisition request notification includes information (for example, terminal identification information and service identification information) included in the MCIM acquisition request.

When the MCIM acquisition request notification is received (776), the control unit 260 of the information processing apparatus 205 confirms whether MCIM can be allocated to the wireless communication apparatus having transmitted the MCIM acquisition request (777). The confirmation process is different in that the control unit 260 of the information processing apparatus 205 performs the confirmation process instead of the control unit 320 of the communication control apparatus (first communication operator) 300. However, since the remaining processes correspond to those of (624) shown in FIG. 13, the description thereof will be omitted here.

When it is determined through the confirmation process that MCIM is unusable (777), the control unit 260 of the information processing apparatus 205 transmits an allocation confirmation result (failure) indicating that MCIM is unusable to the communication control apparatus (first communication operator) 300 (778 and 779). In this case, the control unit 320 of the communication control apparatus (first communication operator) 300 transmits an MCIM acquisition request result (failure) as a response to the MCIM acquisition request to the wireless communication apparatus having transmitted the MCIM acquisition request (780 and 781). Then, the process is terminated without performing subsequent processes.

When it is determined through the confirmation process that MCIM is usable (777), the control unit 260 of the information processing apparatus 205 transmits an allocation confirmation result (success) indicating that MCIM is usable to the communication control apparatus (first communication operator) 300 (778 and 779). When the allocation confirmation result (success) is received (779), the control unit 320 of the communication control apparatus (first communication operator) 300 transmits an MCIM acquisition request result (success) to the wireless communication apparatus having transmitted the MCIM acquisition request (780 and 781). The MCIM acquisition request result (success) is transmitted as a response to the MCIM acquisition request.

When the allocation confirmation result (success) is received (779), the control unit 320 of the communication control apparatus (first communication operator) 300 transmits a Bootstrap message to the wireless communication apparatus 400 (782 and 783).

Since processes (782 to 789) shown in FIG. 26 correspond to the processes (628 to 635) shown in FIG. 13, the description thereof will be omitted here.

When a connection completion notification is received (789), the control unit 260 of the information processing apparatus 205 records the fact that MCIM is newly allocated to the wireless communication apparatus 400 in each database and updates each database (790). The database update process is different in that the control unit 260 of the information processing apparatus 205 performs the database update process instead of the control unit 320 of the communication control apparatus (first communication operator) 300. However, since the remaining processes correspond to those (636) shown in FIG. 26, the description thereof will be omitted here.

Since processes (791 to 800) shown in FIG. 27 correspond to the processes (637 to 646) shown in FIG. 14, the description thereof will be omitted here.

When an MCIM return request is received (800), the control unit 320 of the communication control apparatus (first communication operator) 300 transmits an MCIM return request notification to the information processing apparatus 205 (801 and 802). The MCIM return request notification includes service identification information and terminal identification information.

When an MCIM return request notification is received (802), the control unit 260 of the information processing apparatus 205 confirms whether an MCIM return process is performed for the wireless communication apparatus transmitting the MCIM return request. Since the confirmation process corresponds to the confirmation process (646 and 647) shown in FIG. 14, the description thereof will be omitted here.

Also, when it determined through the confirmation process that the MCIM return process is not possible, an MCIM return request result (failure) indicating that the MCIM return process is not possible is transmitted to the wireless communication apparatus (803 to 808). In this case, the fact that the MCIM return process is not possible may be displayed. Then, the process is terminated without performing subsequent processes.

When it is determined through the confirmation process that the MCIM return process is possible, the control unit 260 of the information processing apparatus 205 transmits an MCIM return request result (success) indicating that the MCIM return process is possible to the wireless communication apparatus 400 (803 to 808).

Since processes (809 to 813) shown in FIG. 27 correspond to the processes (651 to 655) shown in FIG. 14, the description thereof will be omitted here.

When a disconnection completion notification is received (813), the control unit 260 of the information processing apparatus 205 records the fact that MCIM is released from the wireless communication apparatus 400 in each database and updates each database (814). The database update process is different in that the control unit 260 of the information processing apparatus 205 performs the database update process instead of the control unit 320 of the communication control apparatus (first communication operator) 300. However, since the remaining processes correspond to those (656) shown in FIG. 14, the description thereof will be omitted here.

In this way, the wireless communication apparatus 400 returns to the connected state with the communication control apparatus (first communication operator) 300 (815).

Thus, when the side of the service providing company 50 holds the device management database, the wireless communication apparatus 400 can use the service using MCIM of the service providing company 50 by a trigger from the side of the wireless communication apparatus 400.

Also, since the service providing company 50 holds the device management database, it can be determined whether MCIM is usable within the service providing company 50 in a closed manner. Therefore, the communication control apparatus (first communication operator) 300 may not be involved in a service of the service providing company 50, and thus may simply relay a message between the wireless communication apparatus 400 and the service providing company 50. Also, due to independence with regard to services, non-necessity of a change (or a relatively easy change) in the communication control apparatus (first communication operator) 300 can be achieved even when various services are delivered.

4. Fourth Embodiment

In the third embodiment of the present technology, the example in which the upload process is performed based on the determination of the side of a wireless communication apparatus (for example, an imaging apparatus) has been described. As described in the second embodiment of the present technology, the acquisition of MCIM and the connection to an SHO may be performed based on the determination of a service provider side.

Accordingly, in a fourth embodiment of the present technology, an example in which various kinds of services are provided by performing acquisition of MCIM and connection to an SHO based on determination of a service provider side will be described. Also, the configuration of a communication system according to the fourth embodiment of the present technology is substantially the same as that of the second embodiment of the present technology. Therefore, the same reference numerals are given to common constituents to those of the second embodiment of the present technology, and the description thereof will be partially omitted.

[Communication Example when Image Content Upload Process is Performed]

Figure 28:
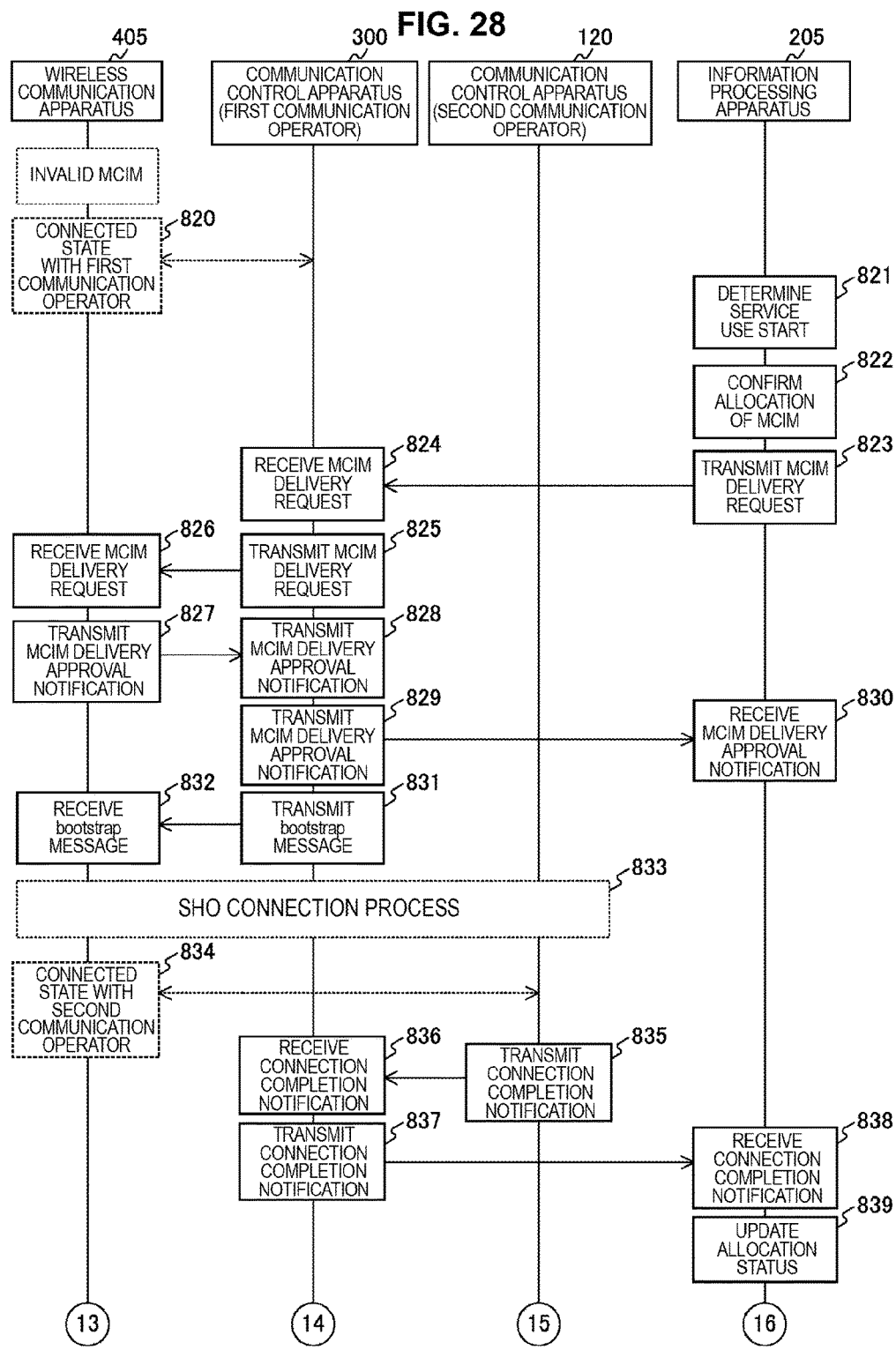
FIG. 28 is a sequence chart illustrating a communication process example among respective apparatuses included in a communication system 101 according to a fourth embodiment of the present technology.

FIGS. 28 and 29 are sequence charts illustrating a communication process example among the respective apparatuses included in a communication system 101 according to the fourth embodiment of the present technology. Since the sequence chart shown in FIGS. 28 and 29 is a modified example of that in FIGS. 21, 22, 26, and 27, the description of common portions to those of FIGS. 21, 22, 26, and 27 will be partially omitted. In FIGS. 28 and 29, an example in which a service provider side holds a device management database will be described.

First, a control unit 260 of the information processing apparatus 205 determines whether a predetermined condition for starting use of a content download service is satisfied (821). Since the determination process corresponds to the determination process (701) shown in FIG. 21, the description thereof will be omitted here.

When it is determined in the service use start determination that the predetermined condition is satisfied (821), the control unit 260 of the information processing apparatus 205 confirms whether MCIM can be allocated to the wireless communication apparatus for which the predetermined condition is determined to be satisfied (822). Also, since the confirmation process is substantially the same as the confirmation process (777) shown in FIG. 26, the description thereof will be omitted here.

Also, when it is determined through the confirmation process that MCIM is unusable (822), the process is terminated without performing subsequent processes. In this case, for example, measures to perform the MCIM allocation confirmation again, for example, after a given time passes may be taken.

When it is determined through the confirmation process that MCIM is usable (822), the control unit 260 of the information processing apparatus 205 transmits an MCIM delivery request to the communication control apparatus (first communication operator) 300 (823 and 824). The MCIM delivery request includes service identification information and terminal identification information.

When the MCIM delivery request is received (824), the control unit 320 of the communication control apparatus (first communication operator) 300 transmits the MCIM delivery request to the wireless communication apparatus 405 related to the terminal identification information included in the MCIM delivery request (825 and 826).

When the MCIM delivery request is received (826), a control unit 430 of the wireless communication apparatus 405 transmits an MCIM delivery approval notification (success) as a response to the MCIM delivery request (827 and 828).

When the MCIM delivery approval notification (success) is received (828), the control unit 320 of the communication control apparatus (first communication operator) 300 transmits the MCIM delivery approval notification (success) to the information processing apparatus 205 (829 and 830). The MCIM delivery approval notification (success) is transmitted as a response to the MCIM delivery request.

Since processes (831 to 839) shown in FIG. 28 correspond to the processes (782 to 790) shown in FIG. 26, the description thereof will be omitted here.

Since processes (840 to 862) shown in FIG. 29 correspond to the processes (720 to 742) shown in FIG. 22, the description thereof will be omitted here.

When a disconnection completion notification is received (862), the control unit 260 of the information processing apparatus 205 records the fact that MCIM is released from the wireless communication apparatus 405 in each database and updates each database (863). Since the database update process corresponds to the process (814) shown in FIG. 27, the description thereof will be omitted here.

In this way, the wireless communication apparatus 405 returns to the connected state with the communication control apparatus (first communication operator) 300 (864).

Thus, when the side of the service providing company 50 holds the device management database, the wireless communication apparatus 405 can use the service using MCIM of the service providing company 50 by a trigger from the side of the service providing company 50.

5. Modified Example

As described above, an RO and an SHO are logical roles, and each of the RO and the SHO may be operated by the same communication operator. In this case, the communication operator generates two kinds of contract authentication information other than PCID and MCIM, and thereby can realize the same mechanisms as the first to the fourth embodiments of the present technology.

As the contract authentication information other than PCID and MCIM, the communication operator is assumed to generate, for example, two kinds of IMSI (International Mobile Subscriber Identify). Here, description will be made by referring to the two kinds of IMSI as first IMSI and second IMSI.

The first IMSI is assumed to be, for example, contract authentication information for a connection for exchanging limited information, and the second IMSI is assumed to be contract authentication information for performing general communication.

In this case, the first IMSI corresponds to PCID, and the second IMSI corresponds to MCIM. Also, a wireless communication apparatus is assumed to have held the first IMSI in advance. Then, using the held first IMSI, it is possible to connect to a communication operator and acquire the second IMSI.

Therefore, in this embodiment of the present technology, a user can download (or validate) contract authentication information contracted to a service provider and easily acquire a network connection right using the contract authentication information. However, this example is not limited to the configuration of a communication system described above (for example, see Non-Patent Literature 1), and can be applied to other communication systems.

Embodiments of the present technology have been described with an example of integrally constituted information processing apparatuses (the communication control apparatuses 120 and 30, the information processing apparatus 200, and the like). However, the embodiments of the present technology can also be applied to an information processing system in which respective parts of these information processing apparatuses (for example, the control unit 260 and the determination unit 250) are constituted of a plurality of apparatuses.

In addition, the embodiments of the present technology can be applied to portable wireless communication apparatuses (for example, a terminal apparatus dedicated to data communication) and fixed wireless communication apparatuses. For example, the embodiments of the present technology can be applied to wireless communication apparatuses intended to collect data of vending machines, and wireless communication apparatuses installed in elevators, automobiles, and electronics (for example, home appliances, game machines, digital photo frames).

Further, the embodiments of the present technology have been described by taking, as network connection rights (connection rights), rights of using MCIM as an example. However, the embodiments of the present technology can also be applied to connection rights to connect to a predetermined network based on other information (for example, USIM (Universal Subscriber Identity Module)).

Thus, according to an embodiment of the present technology, public wireless connection can be realized using contract authentication information (contract authentication information of a specific dedicated user) contracted by another person. That is, a communication system in which a service subscriber can easily use the contract authentication information contracted with a communication operator by a service provider can be realized using a software downloadable SIM. In this case, the service provider can manage wireless communication apparatuses of service subscribers in units of services and permits only registered wireless communication apparatus to use the contract authentication information in the units of services.

Here, in general, when a user uses a communication service, the user uses the communication service using a communication operator with which the user contracts in advance. However, since the user himself or herself is assumed to make the contract with the communication operator, a contract (for example, a contract such as a free dial) made by the service provider may not be used by the user.

On the other hand, in an embodiment of the present technology, even a user who does not contract MCIM of the communication control apparatus (second communication operator) 120 can easily receive various kinds of communication services of the service providing company 50. Specifically, a user performing use registration in a service provided by the service providing company 50 can receive the service using MCIM of the service providing company 50. That is, even when a user who does not contract MCIM of the communication control apparatus (second communication operator) 120 uses the wireless communication apparatuses 400 and 405 holding no MCIM, the user can easily receive various kinds of communication services of the service providing company 50.

Also, when the service providing company 50 contracts a given number of MCIMs as a whole with the second communication operator and registers registered users in the device management database, MCIM allocation management and use status can easily be understood.

Thus, in an embodiment of the present technology, the contract authentication information contracted by the service provider can be configured to be used only by users who the service provider permits to use the contract authentication information. Also, users completing service registration can use services for which the service registration is completed without using contract authentication information of the users themselves. That is, communication services preferred by users can easily be received.

Also, the above-described embodiments are intended only to show examples realizing the present technology, and matters according to the embodiments and specific inventive matters within the scope of claims have a correspondence relation. Likewise, specific inventive matters within the scope of claims, and matters according to the embodiments of the present technology, to which the same names as the specific inventive matters are assigned, have a correspondence relation. However, the present technology is not limited to the embodiments, and the embodiments may also be modified in various forms without departing from the scope and spirit of the present technology.

Also, the processing procedures described in the above-mentioned embodiments may be methods including a series of these steps, and may also include a program for executing a series of these steps on a computer or a recording medium storing the program. As the recording medium, for example, a Compact Disc (CD), Minidisc (MD), a Digital Versatile Disc (DVD), a memory card, a Blu-ray Disc (trademark), or the like may be used.

Additionally, the present technology may also be configured as below.

(1)

An information processing apparatus including:

a determination unit configured to determine whether a predetermined condition for performing a communication process related to a specific service provided by a service provider between an information processing system related to the service provider and a wireless communication apparatus is satisfied; and a control unit configured to perform control when the predetermined condition is satisfied in a manner that a connection right of connecting to a predetermined network using wireless communication is set in the wireless communication apparatus, the wireless communication apparatus connects to the network based on the set connection right, and the communication process is performed with the information processing system.

(2)

The information processing apparatus according to (1), wherein, when the wireless communication apparatus is registered to receive the specific service, the determination unit determines that the predetermined condition is satisfied.

(3)

The information processing apparatus according to (2), wherein the connection right is a right of connecting to a base station operated by a communication operator contracted with the service provider based on contract authentication information for connecting to the base station and a given number of connection rights are ensured by the service provider, and wherein the determination unit determines whether the predetermined condition is satisfied, based on a database configured to manage a use status of the connection right by the registered wireless communication apparatus for each wireless communication apparatus.

(4)

The information processing apparatus according to (3), wherein, when all of the given number of connection rights are used, the determination unit determines that the predetermined condition is not satisfied.

(5)

The information processing apparatus according to (3) or (4), wherein the control unit updates the use status related to each wireless communication apparatus in the database when the connection right is set in the wireless communication apparatus and the connection right is released from the wireless communication apparatus in which the connection right is set.

(6)

The information processing apparatus according to any one of (3) to (5), wherein the database is included in at least one of an RO (registration operator) and the information processing system.

(7)

The information processing apparatus according to (1), wherein the information processing apparatus is the wireless communication apparatus, wherein, when an operation unit receives a predetermined operation or a predetermined timing arrives, the determination unit determines that the predetermined condition is satisfied, and wherein, when the predetermined condition is satisfied, the control unit performs control in a manner that a setting request made to set the connection right in the wireless communication apparatus is performed to an RO, and the communication process is performed with the information processing system after connection to the network based on the connection right set by an SHO (Selected Home Operator) in response to the setting request.

(8)

The information processing apparatus according to (7), wherein, when the connection right is set in the wireless communication apparatus and the wireless communication apparatus is connected to the network, the RO notifies the information processing system that the connection right is set in the wireless communication apparatus and the wireless communication apparatus is connected to the network.

(9)

The information processing apparatus according to (7) or (8), wherein, when the connection right set in the wireless communication apparatus is invalidated, the RO notifies the information processing system that the connection right is invalidated.

(10)

The information processing apparatus according to (1), wherein the information processing apparatus is the information processing system, wherein, when a predetermined operation is received in the wireless communication apparatus or a predetermined timing arrives, the determination unit determines that the predetermined condition is satisfied, and wherein, when the predetermined condition is satisfied, the control unit performs control in a manner that a setting request made to set the connection right in the wireless communication apparatus is performed to an RO, the wireless communication apparatus is connected to the network based on the connection right set in the wireless communication apparatus by an SHO in response to the setting request, and the communication process is subsequently performed with the wireless communication apparatus.

(11)

The information processing apparatus according to any one of (1) to (10), wherein the connection right includes a limitation in a manner that only the communication process is performed between the information processing system and the wireless communication apparatus.

(12)

The information processing apparatus according to any one of (1) to (11), wherein the determination unit determines whether a predetermined condition for invalidating the set connection right is satisfied, and wherein, when it is determined that the predetermined condition for invalidation is satisfied, the control unit performs control for invalidating the connection right set in the wireless communication apparatus.

(13)

The information processing apparatus according to any one of (1) to (12), wherein, when the communication process performed between the information processing system and the wireless communication apparatus is terminated, the control unit performs control in a manner that an invalidation process of invalidating the connection right set in the wireless communication apparatus is performed.

(14)

The information processing apparatus according to any one of (1) to (13), wherein the connection right is a right of connecting to a base station operated by a communication operator contracted with the service provider based on contract authentication information for connecting to the base station, and wherein the wireless communication apparatus is a wireless communication apparatus that is able to download and use the contract authentication information.

(15)

A communication system including:

an information processing system configured to perform a communication process related to a specific service provided by a service provider;

a wireless communication apparatus configured to perform wireless communication;

a determination unit configured to determine whether a predetermined condition for performing the communication process between the information processing system and the wireless communication apparatus is satisfied; and a control unit configured to perform control when the predetermined condition is satisfied in a manner that a connection right of connecting to a predetermined network using wireless communication is set in the wireless communication apparatus, the wireless communication apparatus connects to the network based on the set connection right, and the communication process is performed with the information processing system.

(16)

A method of controlling an information processing apparatus, including:

a determination sequence of determining whether a predetermined condition for performing a communication process related to a specific service provided by a service provider between an information processing system related to the service provider and a wireless communication apparatus is satisfied; and a control sequence of performing control when the predetermined condition is satisfied in a manner that a connection right of connecting to a predetermined network using wireless communication is set in the wireless communication apparatus, the wireless communication apparatus connects to the network based on the set connection right, and the communication process is performed with the information processing system.

REFERENCE SIGNS LIST 10, 100, 101 communication system
21, 31, 122, 301 base station
40, 110 network
120 communication control apparatus (second communication operator)
121, 260, 320, 430 control unit
200, 205 information processing apparatus
210, 310 communication unit
220 service providing unit
230 content management database
240 service management database
250 determination unit
270, 330 device management database
280, 340 MCIM management database
300 communication control apparatus (first communication operator)
400, 405 wireless communication apparatus
411 antenna
412 antenna shared unit
421 modulation unit
422 demodulation unit
431 bus
440 memory
450 MCIM information storage unit
460 operation unit
461 shutter button
470 display unit
471 input and output panel
480 position information acquisition unit
491 microphone
492 speaker

The invention claimed is:

1. An information processing apparatus, comprising:
circuitry configured to:
determine that a first condition for a communication process related to a specific service is satisfied,
wherein the communication process related to the specific service, provided by a service provider, is between an information processing system related to the service provider and a wireless communication apparatus of a plurality of wireless communication apparatuses, and
wherein the first condition is determined as satisfied based on a set time at which a free storage of the wireless communication apparatus is less than a threshold value;
set a connection right in the wireless communication apparatus based on the determination that the first condition is satisfied;
connect the wireless communication apparatus to a communication network based on the set connection right; and
control communication between the wireless communication apparatus and the information processing system.

2. The information processing apparatus according to claim 1, wherein, based on the wireless communication apparatus that is registered to receive the specific service, the circuitry is further configured to determine that the first condition is satisfied.

3. The information processing apparatus according to claim 2,
wherein the connection right is a right to connect to a base station operated by a communication operator,
wherein the communication operator is contracted with the service provider based on contract authentication information and a number of connection rights that are ensured by the service provider, wherein the contract authentication information is to connect to the base station, and
wherein the circuitry is further configured to determine that the first condition is satisfied, based on a database, wherein the database is configured to manage a use status of the connection right by the registered wireless communication apparatus for each wireless communication apparatus of the plurality of wireless communication apparatuses.

4. The information processing apparatus according to claim 3, wherein, based on the number of connection rights, the circuitry is further configured to determine that the first condition is unsatisfied.

5. The information processing apparatus according to claim 3, wherein based on the connection right that is set in the wireless communication apparatus and the connection right that is released from the wireless communication apparatus in which the connection right is set, the circuitry is further configured to update in the database, the use status related to each wireless communication apparatus of the plurality of wireless communication apparatuses.

6. The information processing apparatus according to claim 3, wherein the database is included in at least one of an RO (registration operator) or the information processing system.

7. The information processing apparatus according to claim 1,
wherein the information processing apparatus is the wireless communication apparatus,
wherein, based on at least one of an operation received by the circuitry or an arrival of the set time, the circuitry is further configured to determine that the first condition is satisfied, and
wherein, based on the determination that the first condition is satisfied, the circuitry is further configured to:
control transmission of a setting request to set the connection right in the wireless communication apparatus to an RO (Registration Operator), and
control communication of the wireless communication apparatus with the information processing system after connection to the communication network based on the connection right set by an SHO (Selected Home Operator).

8. The information processing apparatus according to claim 7, wherein, based on the connection right that is set in the wireless communication apparatus and the wireless communication apparatus that is connected to the communication network, the RO is configured to notify the information processing system that the connection right is set in the wireless communication apparatus and the wireless communication apparatus is connected to the communication network.

9. The information processing apparatus according to claim 7, wherein, based on the connection right that is set in the wireless communication apparatus is invalidated, the RO is configured to notify the information processing system that the connection right is invalidated.

10. The information processing apparatus according to claim 1,
wherein the information processing apparatus is the information processing system,
wherein, based on at least one of an operation received by the wireless communication apparatus or an arrival of the set time, the circuitry is further configured to determine that the first condition is satisfied, and
wherein, based on the determination that the first condition is satisfied, the circuitry is further configured to:
control transmission of a setting request to set the connection right in the wireless communication apparatus to an RO (Registration Operator),
connect the wireless communication apparatus to the communication network based on the connection right set in the wireless communication apparatus by an SHO (Selected Home Operator).

11. The information processing apparatus according to claim 1, wherein the connection right comprises a limitation associated with the communication process that is established between the information processing system and the wireless communication apparatus.

12. The information processing apparatus according to claim 1,
wherein the circuitry is further configured to determine that a second condition is satisfied, wherein the second condition is configured to invalidate the set connection right, and
wherein, based on a first determination that the second condition is satisfied, the circuitry is further configured to control an invalidation process to invalidate the connection right set in the wireless communication apparatus.

13. The information processing apparatus according to claim 1, wherein, based on a termination of the communication process between the information processing system and the wireless communication apparatus, the circuitry is further configured to control an invalidation process, wherein the invalidation process is to invalidate the connection right set in the wireless communication apparatus.

14. The information processing apparatus according to claim 1,
wherein the connection right is a right to connect to a base station operated by a communication operator, wherein the communication operator is contracted with the service provider based on contract authentication information to connect to the base station, and
wherein the wireless communication apparatus downloads the contract authentication information.

15. The information processing apparatus according to claim 1, wherein the first condition is related to timing information related to the specific service provided by the service provider and an operation state of the wireless communication apparatus.

16. A communication system, comprising:
an information processing system configured for a communication process related to a specific service provided by a service provider; and
a wireless communication apparatus configured for wireless communication, wherein the wireless communication apparatus comprises circuitry configured to:
determine that a condition for the communication process is satisfied,
wherein the communication process related to the specific service is provided between the information processing system and the wireless communication apparatus, and
wherein the condition is determined as satisfied based on a set time at which a free storage of the wireless communication apparatus is less than a threshold value;
set a connection right in the wireless communication apparatus based on the determination that the condition is satisfied;
connect the wireless communication apparatus to a communication network based on the set connection right; and
control communication between the wireless communication apparatus and the information processing system.

17. A method of controlling an information processing apparatus, the method comprising:
determining that a condition for a communication process related to a specific service is satisfied,
wherein the communication process related to the specific service, provided by a service provider, is between an information processing system related to the service provider and a wireless communication apparatus, and
wherein the condition is determined as satisfied based on a set time at which a free storage of the wireless communication apparatus is less than a threshold value;
setting a connection right in the wireless communication apparatus based on the determination that the condition is satisfied;
connecting the wireless communication apparatus to a communication network based on the set connection right; and
controlling communication between the wireless communication apparatus and the information processing system.

* * * * *